(12) United States Patent
Hultgren et al.

(10) Patent No.: US 12,472,168 B2
(45) Date of Patent: *Nov. 18, 2025

(54) RING-FUSED THIAZOLINO 2-PYRIDONES, METHODS FOR PREPARATION THEREOF AND THEIR USE IN THE TREATMENT AND/OR PREVENTION OF A DISEASE INVOLVING GRAM-POSITIVE BACTERIA

(71) Applicants: Quretech Bio AB, Umeå (SE); Washington University in St. Louis, St. Louis, MO (US)

(72) Inventors: Scott Hultgren, Town and Country, MO (US); Jerome S. Pinkner, St. Louis, MO (US); Michael Gordon Caparon, Jr., Chesterfield, MO (US); Ana Lidia Flores Mireles, St. Louis, MO (US); Fredrik Almqvist, Umeå (SE); Pardeep Singh, Umeå (SE); Anders Lindgren, Umeå (SE); Aaron James Leonard Lynch, Webster Grove, MO (US)

(73) Assignees: Quretech Bio AB, Umeå (SE); Washington University in St. Louis, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,865

(22) Filed: Nov. 9, 2022

(65) Prior Publication Data

US 2023/0233536 A1    Jul. 27, 2023

Related U.S. Application Data

(63) Continuation of application No. 16/619,133, filed as application No. PCT/EP2018/065681 on Jun. 13, 2018, now abandoned.

(60) Provisional application No. 62/518,680, filed on Jun. 13, 2017.

(51) Int. Cl.
| | |
|---|---|
| *A61P 31/04* | (2006.01) |
| *A61K 9/00* | (2006.01) |
| *A61K 31/431* | (2006.01) |
| *A61K 31/4365* | (2006.01) |
| *A61K 31/4439* | (2006.01) |
| *A61K 31/5377* | (2006.01) |
| *A61K 31/7036* | (2006.01) |
| *A61K 38/12* | (2006.01) |
| *A61K 38/14* | (2006.01) |
| *A61L 27/34* | (2006.01) |
| *A61L 27/54* | (2006.01) |
| *A61L 29/08* | (2006.01) |
| *A61L 29/16* | (2006.01) |
| *C07D 233/56* | (2006.01) |
| *C07D 513/04* | (2006.01) |

(52) U.S. Cl.
CPC ........ *A61K 31/4365* (2013.01); *A61K 9/0024* (2013.01); *A61K 31/431* (2013.01); *A61K 31/4439* (2013.01); *A61K 31/5377* (2013.01); *A61K 31/7036* (2013.01); *A61K 38/12* (2013.01); *A61K 38/14* (2013.01); *A61L 27/34* (2013.01); *A61L 27/54* (2013.01); *A61L 29/085* (2013.01); *A61L 29/16* (2013.01); *A61P 31/04* (2018.01); *C07D 233/56* (2013.01); *C07D 513/04* (2013.01)

(58) Field of Classification Search
CPC ..... A61P 31/04; C07D 513/04; C07D 233/56; A61K 31/4365; A61K 31/431; A61K 31/4439; A61K 31/5377; A61K 31/7036
See application file for complete search history.

(56) References Cited

U.S. PATENT DOCUMENTS

| | | | |
|---|---|---|---|
| 8,937,167 B2 | 1/2015 | Janetka et al. | |
| 10,945,999 B2 * | 3/2021 | Stallings | ............ A61K 31/4365 |
| 11,129,816 B2 * | 9/2021 | Stallings | ................ A61K 31/00 |
| 2014/0057926 A1 * | 2/2014 | Oost | ........................ A61P 31/00 546/261 |
| 2023/0115208 A1 * | 4/2023 | Stallings | ................. A61P 31/06 514/301 |

FOREIGN PATENT DOCUMENTS

| | | | |
|---|---|---|---|
| EP | | 0675127 A1 | 10/1995 |
| WO | WO 2014/185853 A1 | | 11/2014 |

(Continued)

OTHER PUBLICATIONS

Bengtsson, Christoffer, et al. "Design, synthesis and evaluation of triazole functionalized ring-fused 2-pyridones as antibacterial agents." European journal of medicinal chemistry 54 (2012): 637-646. (Year: 2012).*
International Search Report and Written Opinion were mailed on Aug. 13, 2018 by the International Searching Authority for International Application No. PCT/EP2018/065681, filed on Jun. 13, 2018 and published as WO 2018/229141 on Dec. 20, 2018 (Applicant—Quretech Bio Ab) (11 pages).
Andersson et al., "Modulation of Curli Assembly and Pellicle Biofilm Formation by Chemical and Protein Chaperones" Chemistry and Biology 20, 1245-1254, (2013).

(Continued)

*Primary Examiner* — Abigail Vanhorn
(74) *Attorney, Agent, or Firm* — Ballard Spahr LLP

(57) ABSTRACT

The present disclosure provides a compound of Formula I, or a pharmaceutically acceptable salt thereof.

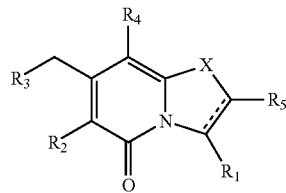

Formula I

16 Claims, 12 Drawing Sheets

(56) References Cited

FOREIGN PATENT DOCUMENTS

| WO | WO 2016/075296 A1 | 5/2016 |
| WO | WO 2017/017631 A2 | 2/2017 |
| WO | WO 2017/175182 A1 | 10/2017 |

OTHER PUBLICATIONS

Chorell et al., "Design and Synthesis of C-2 Substituted Thiazolo and Dihydrothiazolo Ring-Fused 2-Pyridones: Pilicides with Increased Antivirulence Activity", J. Med. Chem. (2010), 53, 5690-5695.

Chorell et al., "Mapping pilicide anti-virulence effect in *Escheridia coli*, a comprehensive structure-activity study", Bioorganic & Medicinal Chemistry 20 (2012) 3128-3142.

Bengtsson, Christoffer, et al. "Design, Synthesis, and evaluation of triazole functionalized ring-fused 2-pyridones as antibacterial agents." European Journal of Medicinal Chemistry 54, (2012) 637-646.

Dictionary of Chemistry and Chemical Engineering, Editorial Board of Dictionary of Chemistry and Chemical Engineering, Chemical Industry Press, 1st Edition (Jan. 31, 2003), p. 1070.

Good et al., Journal of Medicinal Chemistry, 2016, 59, pp. 2094-2108.

Good et al., Journal of Medicinal Chemistry, 2017, vol. 60, pp. 9393-9399.

Nye et al., PNAS, 2022, vol. 119, No. 43 pp. 1-10.

Nye et al., Supplementary Information, PNAS, 2022, vol. 119, No. 43 pp. 1-10.

\* cited by examiner

RING-FUSED THIAZOLINO 2-PYRIDONES, METHODS FOR PREPARATION THEREOF AND THEIR USE IN THE TREATMENT AND/OR PREVENTION OF A DISEASE INVOLVING GRAM-POSITIVE BACTERIA

CROSS-REFERENCE TO RELATED APPLICATIONS

This application is a continuation of U.S. patent application Ser. No. 16/619,133, filed Dec. 4, 2019, which is a U.S. National Phase Application of International Application No. PCT/EP2018/065681, filed Jun. 13, 2018, which claims the benefit to U.S. Provisional Application No. 62/518,680, filed Jun. 13, 2017, each of which are hereby incorporated by reference in their entirety.

STATEMENT REGARDING FEDERALLY SPONSORED RESEARCH

This invention was made with government support under grant numbers AI048689 and DK051406 awarded by the National Institutes of Health. The government has certain rights in the invention.

TECHNICAL FIELD

The present disclosure concerns novel ring-fused thiazolino 2-pyridones, methods for preparation thereof as well as their use in the treatment and/or prevention of a disease involving gram-positive bacteria. Further, the disclosure concerns a combination of a ring-fused thiazolino 2-pyridone and a drug against a disease involving gram-positive bacteria.

BACKGROUND

Infections and/or diseases that resist treatment with currently available drugs is an increasing problem and a serious threat to public health. Many of these infections and/or diseases involve gram-positive bacteria such as *Staphylococcus aureus*, Methicillin-resistant *Staphylococcus aureus* (MRSA), Vancomycin-Resistant Enterococci (VRE), *Enterococcus faecalis* (*E. faecalis*), *Enterococcus faecium*, Vancomycin-Intermediate *Staphylococcus aureus* (VISA), Vancomycin-Resistant *Staphylococcus aureus* (VRSA), *Clostridium difficile* (*C. difficile*), *Clostridium tetani*, *Streptococcus pyogenes* and *Staphylococcus saphyticus* and *Bacillus subtilis*.

The term gram-positive originates from a laboratory staining technique named after the Danish scientist Hans Christian Gram. In this staining technique, bacteria are divided into groups of gram-positive bacteria and gram-negative bacteria depending on their ability to take up crystal violet stain. The Gram staining differentiates bacteria by the chemical and physical properties of their cell walls by detecting peptidoglycan, which is present in the cell wall of Gram-positive bacteria. Gram-positive bacteria retain the crystal violet dye, and thus are stained violet, while the Gram-negative bacteria do not. The Gram stain is almost always the first step in the preliminary identification of a bacterial organism. While Gram staining is a valuable diagnostic tool in both clinical and research settings, not all bacteria can be definitively classified by this technique. For instance, tuberculosis bacteria are neither gram-positive or gram-negative.

In addition to being classified by their staining in the Gram staining technique, bacteria may be further classified by their shape. For instance, the shapes include Cocci and Bacilli. Cocci have a spherical shape and can be either *Staphylococcus* (appearing like a bunch of grapes) or *Streptococcus* (forming a chain). Bacilli have a rod shape and can be either spore forming or non spore forming.

Examples of infection and/or disease involving gram-positive bacteria include urinary tract infection (UTI), catheter associated urinary tract infection, central line associated bloodstream infection (CLABSI), pneumonia, wound associated infection, surgical site infection, bacterial endocarditis, and tetanus. An important reason for the increase of these infections and/or diseases appears to be the increasing number of healthcare-associated infections (HCAI), i.e. infections acquired in or in connection with a health-care setting such as a hospital. For instance, the use of catheters and other intravascular devices frequently lead to diseases and/or infections involving gram-positive bacteria such as *Staphylococcus aureus*. The World Health Organization has reported that hundreds of millions of patients are affected by healthcare-associated infections worldwide each year, leading to significant mortality and financial losses for health systems. Thus, healthcare-associated infections are a widespread and significant problem that needs to be addressed.

WO 2014/185852 discloses substituted ring-fused 2-pyridones which are shown to reduce the infectivity of *Chlamydia*. However, the bacteria involved in *Chlamydia* are gram-negative.

WO2016075296 discloses ring-fused thiazolino 2-pyridones and use thereof in the treatment of a *Chlamydia* infection. However, the bacteria involved in *Chlamydia* are gram-negative.

PCT/IB2017/051999 discloses ring-fused thiazolino 2-pyridones and use thereof in the treatment of tuberculosis. However, the bacteria involved in are neither gram-positive nor gram-negative.

Many of the diseases and/or infections involving gram-positive bacteria are severe and/or drug-resistant making them a serious threat to public health. Therefore, there is a need for alternative and/or improved treatments of infections and/or diseases involving gram-positive bacteria.

It is an object of the present disclosure to provide compounds useful in the treatment and/or prevention of infections and/or diseases involving gram-positive bacteria. Further, it is an object of the present disclosure to provide compounds that may be used in combination with current therapeutic agents such as vancomycin to improve treatment and/or prevention of infections and/or diseases involving gram-positive bacteria.

SUMMARY

There is provided a compound of Formula I:

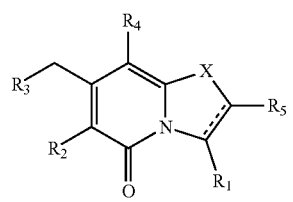

Formula I or a pharmaceutically acceptable salt thereof, wherein:

R₁ is selected from the group consisting of:
a) C(O)OH,
b) tetrazolyl,
c) C(O)NHSO₂R₆,
d) NH₂,
e) H, f) 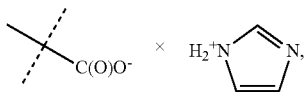

g) 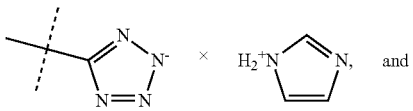

h) 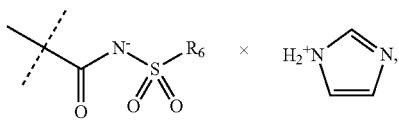

R₂ is selected from the group consisting of:
a) H,
b) Cl, F, Br, or I,
c) CH₂OH,
d) $C_1$-$C_4$alkyl, and
e) $NZ_1Z_2$, R₃ is selected from the group consisting of:
a) 1-naphtyl, 2-naphtyl, 1-naphtyloxy, 9-anthryl and 9-anthryloxy each independently substituted with 0, 1, 2 or 3 substituents selected from the group consisting of methyl, fluoro, chloro, bromo, cyano and methoxy,
b) $C_1$-$C_4$alkyl substituted with 0, 1, 2, 3 or 4 fluoro,
c) phenyl substituted with 0, 1, 2 or 3 substituents independently selected from the group consisting of methyl, fluoro, chloro, cyano and trifluoromethyl,
d) aminophenyl substituted with 0, 1, 2 or 3 substituents independently selected from the group consisting of methyl, fluoro, chloro and trifluoromethyl
e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-naphth-5-yl, R₄ is selected from the group consisting of:
a) $C_1$-$C_4$alkyl substituted with 0, 1, 2, 3 or 4 fluoro;
b) $C_3$-$C_6$cycloalkyl,
c) $C_1$-$C_4$alkoxy substituted with 0, 1, 2, 3 or 4 fluoro,
d) $C_3$-$C_6$cycloalkoxy,
e) a 3-, 4-, 5-, or 6-membered heterocycle,
f) $NZ_1Z_2$,
g) $CH_2NZ_1Z_2$,
i) C(O)OH, and
j) C(O)H, R₅ is selected from the group consisting of:

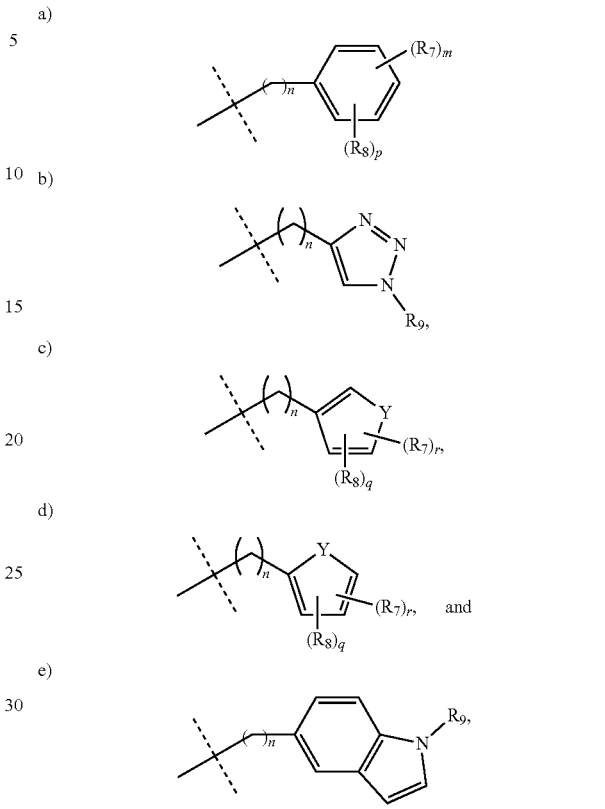

and in the above definitions:
R₆ is $C_1$-$C_4$alkyl or phenyl,
R₇ is selected from the group consisting of F, Cl, Br, and $C_1$-$C_4$alkyl,
R₈ is selected from the group consisting of OH, $C_1$-$C_{10}$alkoxy, $C_1$-$C_{10}$alkenoxy, $C_1$-$C_{10}$alkynoxy and $O(CH_2)_2OCH_3$, or
R₇ and R₈ together form $O(CH_2)_2O$,
R₉ represents $C_1$-$C_{10}$ alkyl,
R₁₀ represents $C_1$-$C_4$alkyl,
R₁₁ represents $C_1$-$C_4$alkyl, or
R₁₀ and R₁₁ together form $CH_2(CH_2)_mCH_2$,
Y is O, S or N,
Z₁ and Z₂ each independently represents hydrogen, methyl, $CH_3S(O)_2$, $C(O)OR_{10}$, $C(O)NR_{10}R_{11}$ or $C(O)R_{10}$, or Z₁ and Z₂ together form $CH_2CH_2CH_2CH_2$, $CH_2CH_2CH_2$, or $CH_2CH_2CH_2CH_2CH_2$,
n is 0 or 1,
m is 0 or 1,
p is 0, 1 or 2,
q is 0 or 1,
r is 1, and
X is S, SO or $SO_2$, with the proviso that the compound of Formula I is not:
8-Benzyl-5-cyclopropyl-4-[(1-naphthyl)methyl]-2-oxo-7-thia-1-azabicyclo[4.3.0]nona-3,5,8-triene-9-carboxylic acid,
5-Cyclopropyl-4-[(1-naphthyl)methyl]-2-oxo-8-phenyl-7-thia-1-azabicyclo[4.3.0]nona-3,5,8-triene-9-carboxylic acid,
5-Cyclopropyl-4-[(1-naphthyl)methyl]-2-oxo-8-(m-tolyl)-7-thia-1-azabicyclo[4.3.0]nona-3,5,8-triene-9-carboxylic acid, 5-Cyclopropyl-4-[(1-naphthyl)methyl]-2-oxo-8-(p-tolyl)-7-thia-1-azabicyclo[4.3.0]nona-3,5,8-triene-9-carboxylic acid, or 5-Cyclopropyl-8-(1,4-dioxa-2,3-dihydronaphth-6-yl)-4-[(1-naphthyl)methyl]-2-oxo-7-thia-1-azabicyclo[4.3.0]nona-3,5,8-triene-9-carboxylic acid.

There is also provided a pharmaceutical composition comprising a compound of Formula I as described herein, or a pharmaceutically acceptable salt thereof, in admixture with a pharmaceutically acceptable adjuvant, carrier or excipient.

Further, the present disclosure provides a compound of Formula as described herein, or a pharmaceutically acceptable salt thereof, for use as a medicament in therapy.

There is also provided a compound of Formula I or Formula IV as described herein, or a pharmaceutically acceptable salt thereof, for use in the treatment and/or prevention of a disease involving gram-positive bacteria.

There is also provided use of a compound of Formula I or Formula IV as described herein, or a pharmaceutically acceptable salt thereof, for the manufacture of a medicament for the treatment and/or prevention of a disease involving gram-positive bacteria.

There is also provided a method for treatment and/or prevention of a disease involving gram-positive bacteria comprising administering to a mammal, such as a human or an animal, in need thereof an effective amount of a compound of Formula I or Formula IV as described herein, or a pharmaceutically acceptable salt thereof.

Further, there is provided a combination comprising:
(i) a composition comprising or consisting of a drug against a disease involving gram-positive bacteria, or a pharmaceutically acceptable salt of said drug, and
(ii) a composition comprising or consisting of a compound of Formula IV:

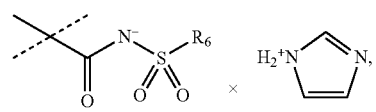

Formula IV or a pharmaceutically acceptable salt thereof, wherein:
$R_1$ is selected from the group consisting of:
a) C(O)OH,
b) tetrazolyl,
c) C(O)NHSO$_2$R$_6$,
d) NH$_2$,
e) H, f)
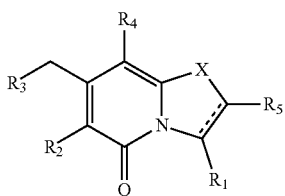

g)
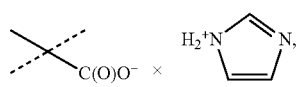

h)
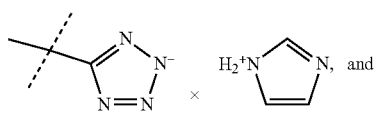

$R_2$ is selected from the group consisting of:
a) H,
b) Cl, F, Br, or I,
c) CH$_2$OH,
d) C$_1$-C$_4$alkyl, and
e) NZ$_1$Z$_2$, $R_3$ is selected from the group consisting of:
a) 1-naphtyl, 2-naphtyl, 1-naphtyloxy, 9-anthryl and 9-anthryloxy each independently substituted with 0, 1, 2 or 3 substituents selected from the group consisting of methyl, fluoro, chloro, bromo, cyano and methoxy,
b) C$_1$-C$_4$alkyl substituted with 0, 1, 2, 3 or 4 fluoro,
c) phenyl substituted with 0, 1, 2 or 3 substituents independently selected from the group consisting of methyl, fluoro, chloro, cyano and trifluoromethyl,
d) aminophenyl substituted with 0, 1, 2 or 3 substituents independently selected from the group consisting of methyl, fluoro, chloro and trifluoromethyl,
e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-naphth-5-yl, $R_4$ is selected from the group consisting of:
a) C$_1$-C$_4$alkyl substituted with 0, 1, 2, 3 or 4 fluoro;
b) C$_3$-C$_6$cycloalkyl,
c) C$_1$-C$_4$alkoxy substituted with 0, 1, 2, 3 or 4 fluoro,
d) C$_3$-C$_6$cycloalkoxy,
e) a 3-, 4-, 5-, or 6-membered heterocycle,
f) NZ$_1$Z$_2$,
g) CH$_2$NZ$_1$Z$_2$,
i) C(O)OH,
j) C(O)H,
k) 3-(trifluoromethyl)phenyl, and
l) benzo[d][1,3]dioxol-5-yl, $R_5$ is selected from the group consisting of:

a)
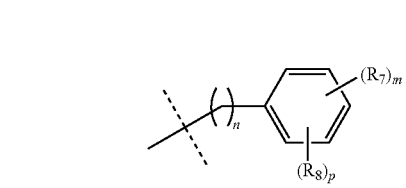

b)
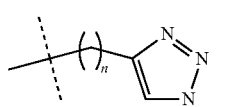

c)
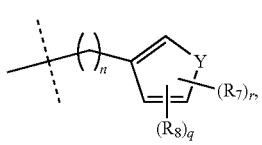

-continued d)

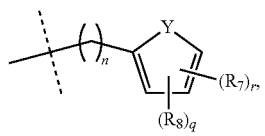

e)

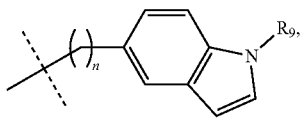

and
f) H,
and in the above definitions:
$R_6$ is $C_1$-$C_4$alkyl or phenyl,
$R_7$ is selected from the group consisting of F, Cl, Br, and $C_1$-$C_4$alkyl,
$R_8$ is selected from the group consisting of OH, $C_1$-$C_{10}$alkoxy, $C_1$-$C_{10}$alkenoxy, $C_1$-$C_{10}$alkynoxy and $O(CH_2)_2OCH_3$, or
$R_7$ and $R_8$ together form $O(CH_2)O$,
$R_9$ is selected from the group consisting of H and $C_1$-$C_{10}$ alkyl,
$R_{10}$ represents $C_1$-$C_4$alkyl,
$R_{11}$ represents $C_1$-$C_4$alkyl, or
$R_{10}$ and $R_{11}$ together form $CH_2(CH_2)_mCH_2$,
Y is O, S or N,
$Z_1$ and $Z_2$ each independently represents hydrogen, methyl, $CH_3S(O)_2$, $C(O)OR_{10}$, $C(O)NR_{10}R_{11}$ or $C(O)R_{10}$, or $Z_1$ and $Z_2$ together form $CH_2CH_2CH_2CH_2$, $CH_2CH_2CH_2$, or $CH_2CH_2CH_2CH_2CH_2$,
n is 0 or 1,
m is 0 or 1,
p is 0, 1 or 2,
q is 0 or 1,
r is 0 or 1, and
X is S, SO or $SO_2$.

There is also described a combination as described herein for use as a medicament in therapy.

There is also provided a combination as described herein for use in the treatment and/or prevention of a disease involving gram-positive bacteria.

There is also provided use of a combination as described herein for the manufacture of a medicament for the treatment and/or prevention of a disease involving gram-positive bacteria.

There is also provided a method for treatment and/or prevention of a disease involving gram-positive bacteria comprising administering to a mammal, such as a human or an animal, in need thereof an effective amount of a combination as described herein

Figure 1A:
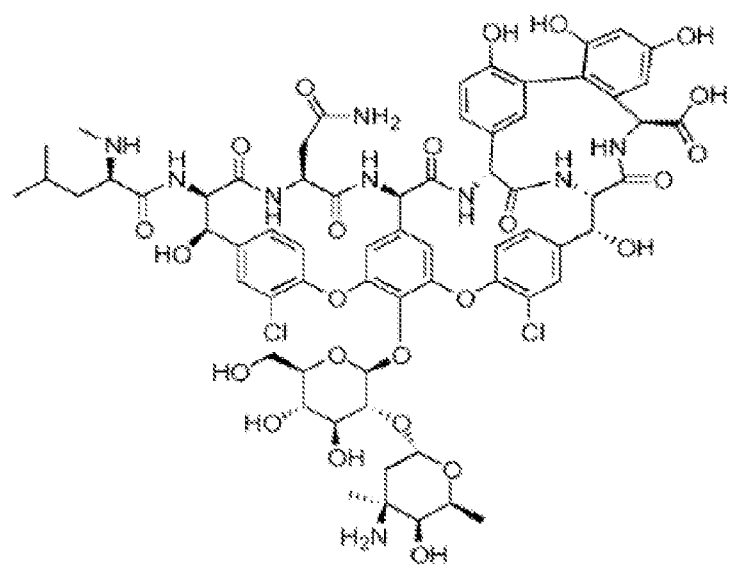
FIG. 1A shows the chemical structure of vancomycin.
Figure 1B:
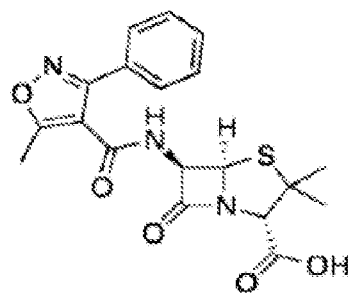
FIG. 1B shows the chemical structure of oxacillin.
Figure 2A:
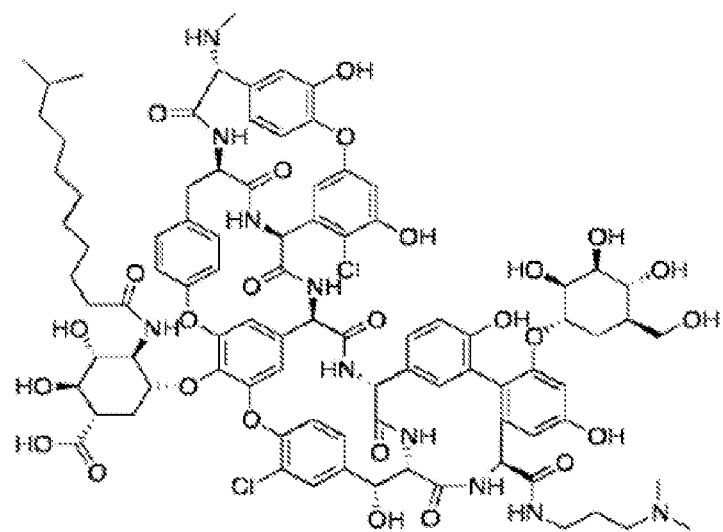
FIG. 2A shows the chemical structure of dalbavancin.
Figure 2B:
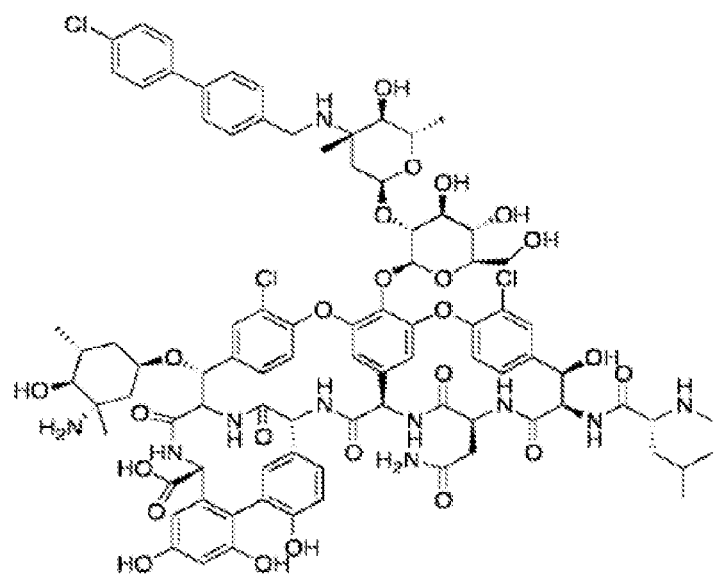
FIG. 2B shows the chemical structure of oritavancin.
Figure 3A:
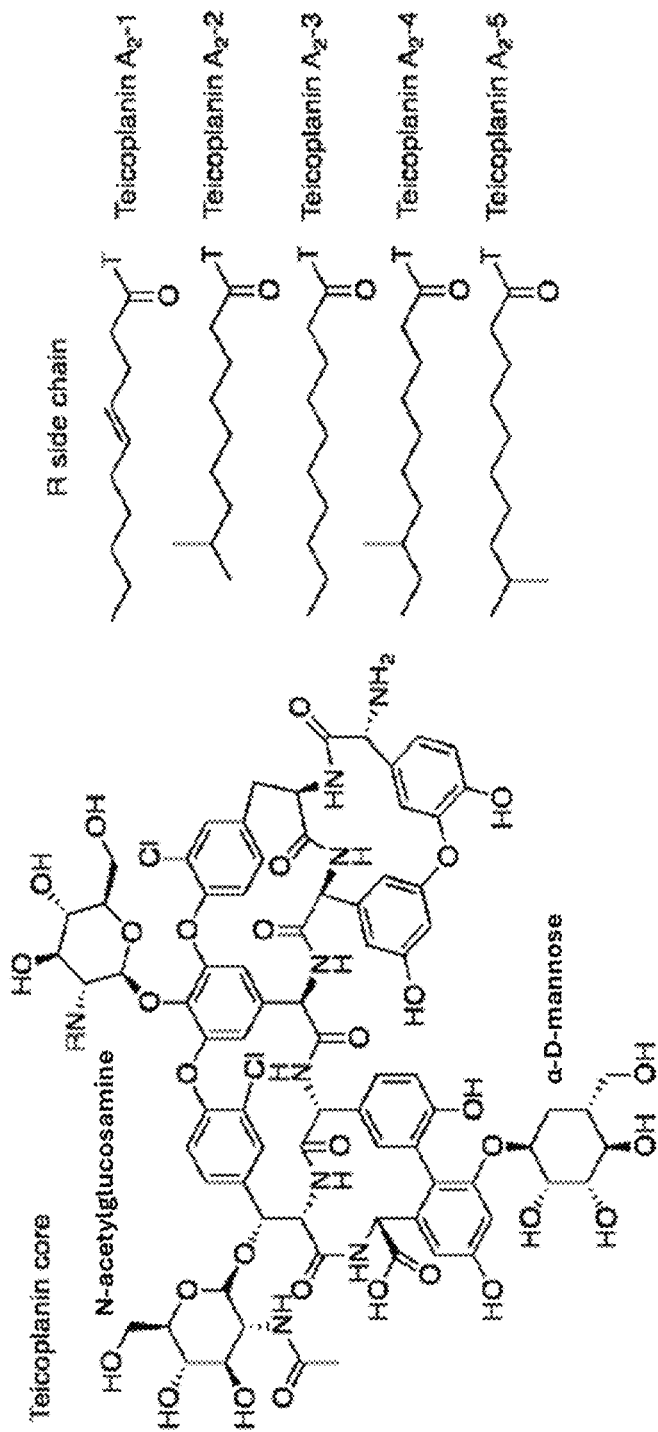
FIG. 3A shows the chemical structure of teicoplanin.
Figure 3B:
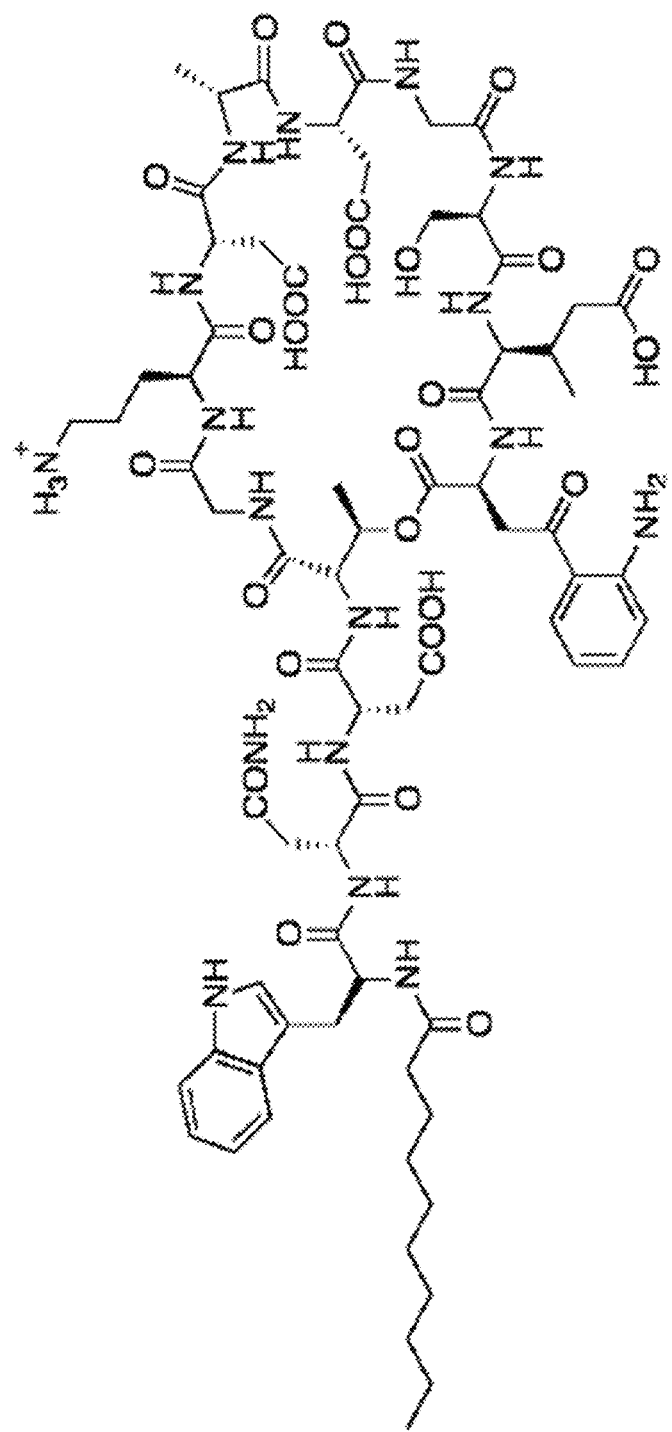
FIG. 3B shows the chemical structure of daptomycin.
Figure 4A:
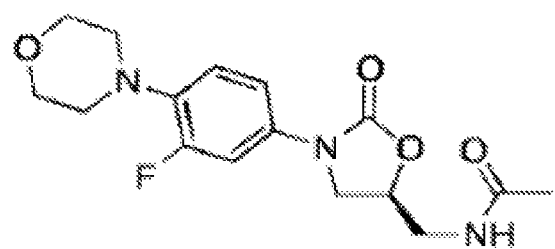
FIG. 4A shows the chemical structure of linezolid.
Figure 4B:
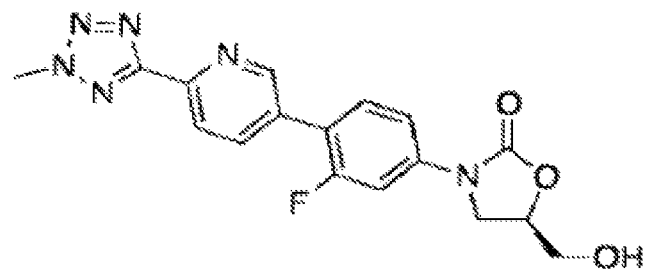
FIG. 4B shows the chemical structure of tedizolid.
Figure 5:
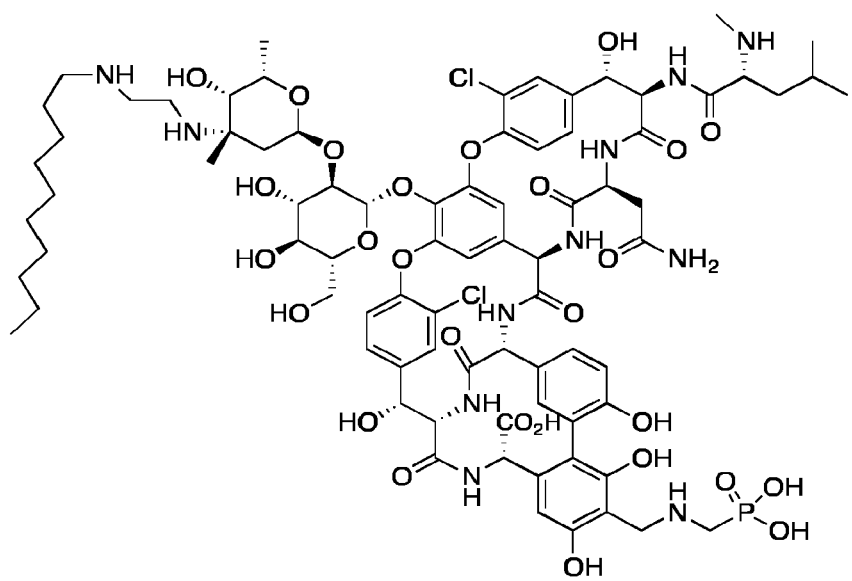
FIG. 5 shows the chemical structure of telavancin.
Figure 6:
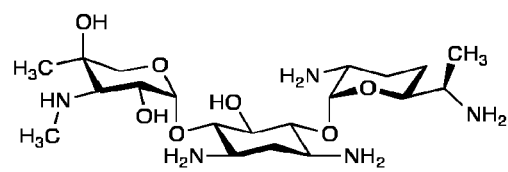
FIG. 6 shows the chemical structure of gentamicin.

The chemical structures depicted in FIGS. 1-6 have not been drawn with the program Chem Doodle.

DETAILED DESCRIPTION

The present disclosure provides a compound of Formula I:

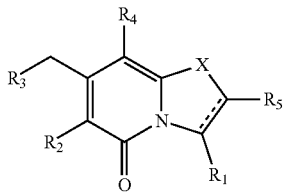

Formula I or a pharmaceutically acceptable salt thereof,
wherein:
$R_1$ is selected from the group consisting of:
a) C(O)OH,
b) tetrazolyl,
c) C(O)NHSO_2R_6,
d) NH_2,
e) H, f)

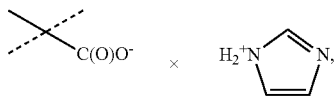

g)

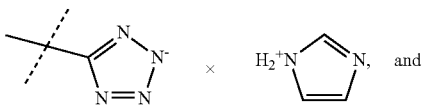

h)

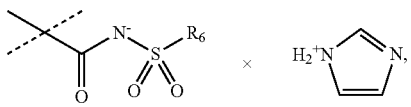

c)

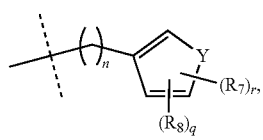

d)

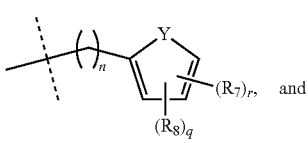

e)

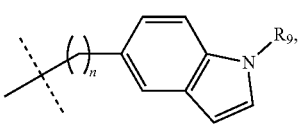

and in the above definitions:

$R_6$ is $C_1$-$C_4$alkyl or phenyl, $R_7$ is selected from the group consisting of F, Cl, Br, and $C_1$-$C_4$alkyl, $R_8$ is selected from the group consisting of OH, $C_1$-$C_{10}$alkoxy, $C_1$-$C_{10}$alkenoxy, $C_1$-$C_{10}$alkynoxy and $O(CH_2)_2OCH_3$, or $R_7$ and $R_8$ together form $O(CH_2)_2O$, $R_9$ represents $C_1$-$C_{10}$ alkyl, $R_{10}$ represents $C_1$-$C_4$alkyl, $R_{11}$ represents $C_1$-$C_4$alkyl, or $R_{10}$ and $R_{11}$ together form $CH_2(CH_2)_mCH_2$, Y is O, S or N, $Z_1$ and $Z_2$ each independently represents hydrogen, methyl, $CH_3S(O)_2$, $C(O)OR_{10}$, $C(O)NR_{10}R_{11}$ or $C(O)R_{10}$, or $Z_1$ and $Z_2$ together form $CH_2CH_2CH_2CH_2$, $CH_2CH_2NCH_2$, or $CH_2CH_2CH_2CH_2CH_2$, n is 0 or 1, m is 0 or 1, p is 0, 1 or 2, q is 0 or 1, r is 1, and X is S, SO or $SO_2$, with the proviso that the compound of Formula I is not:

8-Benzyl-5-cyclopropyl-4-[(1-naphthyl)methyl]-2-oxo-7-thia-1-azabicyclo[4.3.0]nona-3,5,8-triene-9-carboxylic acid, 5-Cyclopropyl-4-[(1-naphthyl)methyl]-2-oxo-8-phenyl-7-thia-1-azabicyclo[4.3.0]nona-3,5,8-triene-9-carboxylic acid, 5-Cyclopropyl-4-[(1-naphthyl)methyl]-2-oxo-8-(m-tolyl)-7-thia-1-azabicyclo[4.3.0]nona-3,5,8-triene-9-carboxylic acid, 5-Cyclopropyl-4-[(1-naphthyl)methyl]-2-oxo-8-(p-tolyl)-7-thia-1-azabicyclo[4.3.0]nona-3,5,8-triene-9-carboxylic acid, or 5-Cyclopropyl-8-(1,4-dioxa-2,3-dihydronaphth-6-yl)-4-[(1-naphthyl)methyl]-2-oxo-7-thia-1-azabicyclo[4.3.0]nona-3,5,8-triene-9-carboxylic acid.

$R_2$ is selected from the group consisting of:
a) H,
b) Cl, F, Br, or I,
c) $CH_2OH$,
d) $C_1$-$C_4$alkyl, and
e) $NZ_1Z_2$, $R_3$ is selected from the group consisting of:
a) 1-naphtyl, 2-naphtyl, 1-naphtyloxy, 9-anthryl and 9-anthryloxy each independently substituted with 0, 1, 2 or 3 substituents selected from the group consisting of methyl, fluoro, chloro, bromo, cyano and methoxy,
b) $C_1$-$C_4$alkyl substituted with 0, 1, 2, 3 or 4 fluoro,
c) phenyl substituted with 0, 1, 2 or 3 substituents independently selected from the group consisting of methyl, fluoro, chloro, cyano and trifluoromethyl,
d) aminophenyl substituted with 0, 1, 2 or 3 substituents independently selected from the group consisting of methyl, fluoro, chloro and trifluoromethyl
e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-naphth-5-yl, $R_4$ is selected from the group consisting of:
a) $C_1$-$C_4$alkyl substituted with 0, 1, 2, 3 or 4 fluoro;
b) $C_3$-$C_6$cycloalkyl,
c) $C_1$-$C_4$alkoxy substituted with 0, 1, 2, 3 or 4 fluoro,
d) $C_3$-$C_6$cycloalkoxy,
e) a 3-, 4-, 5-, or 6-membered heterocycle,
f) $NZ_1Z_2$,
g) $CH_2NZ_1Z_2$,
i) $C(O)OH$, and
j) $C(O)H$, $R_5$ is selected from the group consisting of:

a)

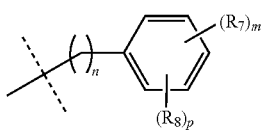

b)

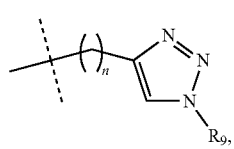

The term "$C_1$-$C_4$alkyl" denotes a straight or branched, saturated or unsaturated alkyl group of one to four carbon atoms. Examples of "$C_1$-$C_4$alkyl" include, but are not limited to, methyl, ethyl, vinyl, allyl, n-propyl, isopropyl, n-butyl, sec-butyl, iso-butyl and tert-butyl.

The term "$C_1$-$C_4$alkoxy" denotes a $C_1$-$C_4$alkyl group as described herein which is linked to an oxygen atom.

Examples of "$C_1$-$C_4$alkoxy" include, but are not limited to, methoxy, ethoxy, n-propoxy, iso-propoxy and butoxy.

The term "$C_1$-$C_{10}$alkoxy" denotes a $C_1$-$C_{10}$alkyl group which is linked to an oxygen atom. The $C_1$-$C_{10}$alkyl group may be straight, branched and/or include a cycloalkyl group. The Examples of "$C_1$-$C_{10}$alkoxy" include, but are not limited to, methoxy, ethoxy, n-propoxy, cyclopropylmethoxy, iso-propoxy, butoxy, pentoxy, hexoxy, pentoxy, octoxy, nonony, and decoxy.

The term "$C_3$-$C_6$cycloalkyl" denotes a saturated or unsaturated non-aromatic monocyclic ring composed of three, four, five or six carbon atoms. Examples of "$C_3$-$C_6$cycloalkyl" include, but are not limited to, cyclopropyl, cyclobutyl, cyclopentyl and cyclohexyl.

The term "$C_3$-$C_6$cycloalkoxy" denotes a saturated or unsaturated non-aromatic monocyclic ring composed of three, four, five or six carbon atoms which is linked to an oxygen atom. Examples of "$C_3$-$C_6$cycloalkoxy" include, but are not limited to, cyclopropyloxy, cyclopropoxymethylene, cyclobutyloxy, cyclobutyloxymethylene, cyclopentyloxy, cyclopentyloxymethylene, cyclohexyloxy and cyclohexyloxymethylene.

The term "$C_1$-$C_{10}$alkenoxy" denotes a $C_1$-$C_{10}$alkenyl group which is linked to an oxygen atom. The $C_1$-$C_{10}$alkenyl group may be straight or branched. The Examples of $C_1$-$C_{10}$alkenoxy include, but are not limited to, allyloxy, 5-hexenyloxy or 4-methyl-3-pentenyloxy, (E)-2-heptenyloxy, (E)-2-hexenyloxy, (E)-2-pentenyloxy, (E)-2-butenyloxy, (Z)-2-heptenyloxy, (Z)-2-hexenyloxy and (Z)-2-pentenyloxy.

The term "$C_1$-$C_{10}$alkynoxy" denotes a $C_1$-$C_{10}$alkynyl group which is linked to an oxygen atom. The $C_1$-$C_{10}$alkynyl group may be straight or branched. The Examples of $C_1$-$C_{10}$alkynoxy include, but are not limited to, 5-hexynyloxy, (Z)-2-Butenyloxy 2-heptynyloxy, 2-hexynyloxy, 2-pentynyloxy, 2-butynyloxy, 3-heptynyloxy, 3-hexynyloxy, 3-pentynyloxy, 3-butynyloxy, 4-heptynyloxy, 4-hexynyloxy and 4-pentynyloxy.

The term "3-membered heterocycle" denotes a 3-membered saturated or unsaturated heterocycle. Examples of a 3-membered saturated heterocycle include, but are not limited to, aziridine, oxirane and thiirane. Examples of 3-membered unsaturated heterocycles include, but are not limited to, azirine, oxirene and thiirene.

The term "4-membered heterocycle" denotes a 4-membered saturated or unsaturated heterocycle. Examples of a 4-membered heterocycle include, but are not limited to, azetidine, oxethane and thietane.

The term "5-membered heterocycle" denotes a 5-membered saturated or unsaturated heterocycle. Examples of a 5-membered heterocycles include, but are not limited to pyrrolidine, tetrahydrofurane, thiolane, pyrrole, furane, thiophene, imidazolidine, pyrazolidine, pxazolidine, isoxazolidine, thiazolidine, isothiazolidine, dioxolane, dithiolane, imidazole, pyrazole, oxazole, isoxazole, thiazole, and isothiazole.

The term "6-membered heterocycle" denotes a 6-membered saturated or unsaturated heterocycle. Examples of a 6-membered heterocycles include, but are not limited to piperidine, pyridine, piperazine, morpholine, and thiomorpholine.

The drug against a disease involving gram-positive bacteria is to be understood as a drug that counteracts gram-positive bacteria. The against a disease involving gram-positive bacteria may reduce, substantially eliminate or eradicate gram-positive bacteria. The drug against a disease involving gram-positive bacteria may also be denominated a drug to treat a disease involving gram-positive bacteria.

The term infection intends a condition wherein gram-positive bacteria have entered into a mammal such as a human. The term disease is understood to be an abnormal condition of a part, organ, or system of a mammal such as a human resulting from various causes, such as infection, inflammation, environmental factors, or genetic defect, and characterized by an identifiable group of signs, symptoms, or both. The skilled person understands that there is an overlap of the terms. In this document, the term disease is understood to encompass both disease and infection. Thus, when the term disease is used it may intend disease and/or infection.

The compound of Formula I may be a compound of Formula II or Formula III:

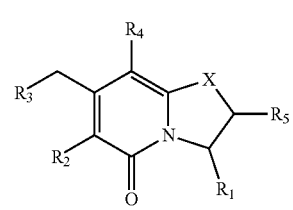

Formula II

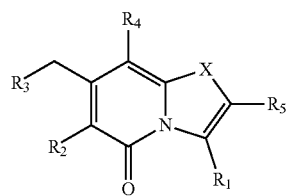

Formula III wherein $R_1$, $R_2$, $R_3$, $R_4$, $R_5$ and X are as defined for the compound of Formula I, or a pharmaceutically acceptable salt thereof.

The compound of Formula I may be a compound of Formula IIa, Formula IIb, Formula IIc and/or Formula IId:

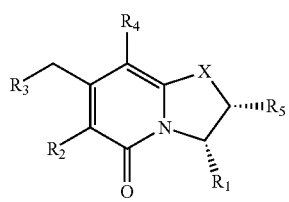

Formula IIa

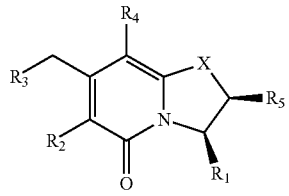

Formula IIb

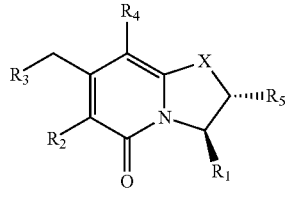

Formula IIc

-continued

Formula IId

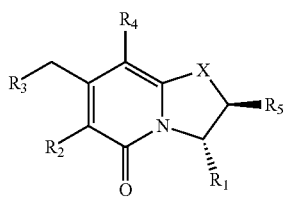

wherein

R$_1$, R$_2$, R$_3$, R$_4$, R$_5$ and X are as defined for the compound of Formula I, or a pharmaceutically acceptable salt thereof.

Further values of wherein R$_1$, R$_2$, R$_3$, R$_4$, R$_5$, n, m, p, q, r and X will now follow. It will be appreciated that these values may be applied to any compound of Formula I, Formula II or Formula III of the present disclosure.

R$_1$ may be C(O)OH or tetrazolyl.

In a further example, R$_1$ is a combination C(O)OH, tetrazolyl or C(O)NHSO$_2$R$_6$ with imidazole. Thus, R$_1$ may be selected from:

f)

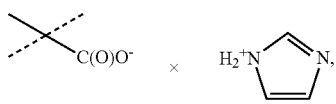

g)

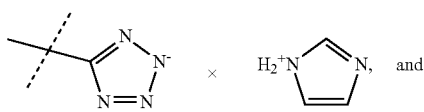
and h)

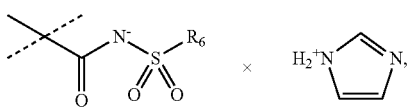

wherein R$_6$ is as defined herein.

R$_2$ may be H.

R$_3$ may be 1-naphtyl, 9-anthryl or trifluoromethylphenyl.

R$_4$ may be selected from:

C$_3$-C$_6$cycloalkyl,

C$_1$-C$_4$alkoxy substituted with 0, 1, 2, 3 or 4 fluoro, or

NZ$_1$Z$_2$, wherein Z$_1$ and Z$_2$ are as defined herein. For instance, R$_4$ may be cyclopropyl or methoxy.

X may be S or SO.

R$_5$ may be:

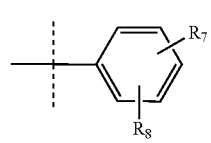

wherein R$_7$ and R$_8$ are as defined herein. For instance, R$_5$ may be:

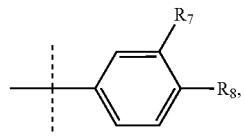

wherein R$_7$ and R$_8$ are as defined herein. In an example, R$_7$ may be H or methyl and/or R$_8$ is selected form the group consisting of methoxy, ethoxy, propoxy, butoxy, pentoxy, hexoxy, heptoxy, 4-hydroxy-3-methyl-phenyl, 4-methoxy-3-methyl-phenyl, 4-ethoxy-3-methyl-phenyl, 4-propoxy-3-methyl-phenyl, 4-butoxy-3-methyl-phenyl, 4-pentoxy-3-methyl-phenyl, 4-hexoxy-3-methyl-phenyl, 4-heptoxy-3-methyl-phenyl, 4-Butoxyphenyl, 4-pentyloxyphenyl, 4-(2-methoxyethoxy)-3-methyl-phenyl, 4-alloxy-3-methyl-phenyl, 5-Hexynyloxy-3-methyl-phenyl, 4-Isohexyloxy-3-methyl-phenyl, 4-(4'-methyl)-3'-pentenyloxy)-3-methyl-phenyl, 4-(5'-Hexenyloxy)-3-methyl-phenyl and 1-Hexyl-1H-1,2,3-triazol-4-yl.

The compound of Formula I described herein may be selected from Examples 1-27, 41-47, 49 and 50 of Table 1 of this document.

For instance, the compound of Formula I described herein may be selected from:

5-Methoxy-4-[(1-naphthyl)methyl]-2-oxo-8-(4-propoxy-3-methyl-phenyl)-7-thia-1-azabicyclo[4.3.0]nona-3,5,8-triene-9-carboxylic acid, 8-(4-Butoxy-3-methyl-phenyl)-5-methoxy-4-[(1-naphthyl)methyl]-2-oxo-7-thia-1-azabicyclo[4.3.0]nona-3,5,8-triene-9-carboxylic acid, 5-Methoxy-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid, 8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Methoxy-8-[4-(2-methoxyethoxy)-3-methyl-phenyl]-4-[(1-naphthyl)methyl]-2-oxo-7-thia-1-azabicyclo[4.3.0]nona-3,5,8-triene-9-carboxylic acid, 8-[4-(Allyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-[4-(5-Hexynyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Methoxy-8-[4-(4-methyl-3-pentenyloxy)-3-methyl-phenyl]-4-[(1-naphthyl)methyl]-2-oxo-7-thia-1-azabicyclo[4.3.0]nona-3,5,8-triene-9-carboxylic acid, 8-[4-(5-Hexenyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-(1-Hexyl-1H-1,2,3-triazol-4-yl)-5-methoxy-4-[(1-naphthyl)methyl]-2-oxo-7-thia-1-azabicyclo[4.3.0]nona-3,5,8-triene-9-carboxylic acid, 8-(p-Butoxyphenyl)-5-cyclopropyl-4-[(1-naphthyl)methyl]-2-oxo-7-thia-1-azabicyclo[4.3.0]nona-3,5,8-triene-9-carboxylic acid, 5-Cyclopropyl-4-[(1-naphthyl)methyl]-2-oxo-8-[p-(pentyloxy)phenyl]-7-thia-1-azabicyclo[4.3.0]nona-3,5,8-triene-9-carboxylic acid, 5-Cyclopropyl-8-(4-methoxy-3-methyl-phenyl)-4-[(1-naphthyl)methyl]-2-oxo-7-thia-1-azabicyclo[4.3.0]nona-3,5,8-triene-9-carboxylic acid, 5-Cyclopropyl-8-(4-ethoxy-3-methyl-phenyl)-4-[(1-naphthyl)methyl]-2-oxo-7-thia-1-azabicyclo[4.3.0]nona-3,5,8-triene-9-carboxylic acid, 5-Cyclopropyl-4-[(1-naphthyl)methyl]-2-oxo-8-(4-propoxy-3-methyl-phenyl)-7-thia-1-azabicyclo[4.3.0]nona-3,5,8-triene-9-carboxylic acid, 8-(4-Butoxy-3-methyl-phenyl)-5-cyclopropyl-4-[(1-naphthyl)methyl]-2-oxo-7-thia-1-azabicyclo[4.3.0]nona-3,5,8-triene-9-carboxylic acid, 5-Cyclopropyl-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid, 5-Cyclopropyl-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid, 5-Cyclopropyl-8-[4-(heptyloxy)-3-methyl-phenyl]-4-[(1-naphthyl)methyl]-2-oxo-7-thia-1-azabicyclo[4.3.0]nona-3,5,8-triene-9-carboxylic acid, 5-Cyclopropyl-8-[4-(2-methoxyethoxy)-3-methyl-phenyl]-4-[(1-naphthyl)methyl]-2-oxo-7-thia-1-azabicyclo[4.3.0]nona-3,5,8-triene-9-carboxylic acid, 8-(4-Butoxy-3-methyl-phenyl)-5-cyclopropyl-2-oxo-4-{[m-(trifluoromethyl)phenyl]methyl}-7-thia-1-azabicyclo[4.3.0]nona-3,5,8-triene-9-carboxylic acid, 8-[4-(Cyclopropylmethoxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Amino-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid, 8-[4-(Hexyloxy)-3-methyl-phenyl]-5-methoxy-4-[(1-naphtyl)methyl]-2-oxo-7-thia-1-azabicyclo[4.3.0]nona-3,5,8-triene-9-carboxylic acid imidazole salt, 8-(1-Hexyl-1H-1,2,3-triazol-4-yl)-5-methoxy-4-[(1-naphtyl)methyl]-2-oxo-7-thia-1-azabicyclo[4,3,0]nona-3,5,8-triene-9-carboxylic acid imidazole salt, 5-Cyclopropyl-8-(4-hydroxytolyl)-4-[(1-naphtyl)methyl]-2-oxo-7-thia-1-azabicyclo[4,3,0]nona-3,5,8-triene-9-carboxylic acid, 8-(dimethylamino)-2-(3-methyl-4-(pentyloxy)phenyl)-7-(naphtalen-1ylmethyl)-5-oxo-thiazolo[3,2,a]pyridine-3-carboxylic acid, 8-(dimethylamino)-2-(4-(hexyloxy)-3-methylphenyl)-7-(naphthalen-1-ylmethyl)-5-oxo-thiazolo[3,2-a]pyridine-3-carboxylic, 8-(dimethylamino)-2-(4-(heptyloxy)-3-methylphenyl)-7-(naphtalen-1-ylmethyl)-5-oxo-thiazolo[3,2,a]pyridine-3-carbocylic acid, 8-(dimethylamino)-2-(3-methyl-4-((4-methylpentyl)oxy)phenyl)-7-(naphtalen-1ylmethyl)-5-oxo-thiazolo[3,2,a]pyridine-3-carboxylic acid, 8-amino-2-(3-methyl-4-(pentyloxyphenyl)-7-naphtalen-1ylmethyl)-5-oxo-thiazolo[3,2,a]pyridine-3-carboxylic acid, 8-amino-2-(4-(hexyloxy)-3-methylphenyl)-7-(naphtalen-1-ylmethyl)-5-oxo-thiazolo[3,2,a]pyridine-3-caraboxylic acid, 8-amino-2-(4-(heptyloxy)-3-methylphenyl)-7-8naphtalen-1-ylmethyl)-5-oxo-thiazolo[3,2,a]pyridine-3-carboxyic acid, 7-(anthracen-9-ylmethyl)-8-methoxy-2-(3-methyl-4-(pentyloxy)phenyl)-5-oxo-thiazolo[3,2,a]pyridine-3-carboxylic acid, or 1H-imidazol-1-ium 8-methoxy-2-(3-methyl-4 ((4-methylpentyl)oxy)phenyl)-7-(naphtalen-1-ylmethyl)-5-oxo-thiazolo[3,2-a]pyridine-3-carboxylate, a pharmaceutically acceptable salt of any of the foregoing compounds.

Further, the compound of Formula I as described herein may be selected from:

8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Methoxy-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid, 5-Methoxy-4-[(1-naphthyl)methyl]-2-oxo-8-(4-propoxy-3-methyl-phenyl)-7-thia-1-azabicyclo[4.3.0]nona-3,5,8-triene-9-carboxylic acid, 8-(4-Butoxy-3-methyl-phenyl)-5-methoxy-4-[(1-naphthyl)methyl]-2-oxo-7-thia-1-azabicyclo[4.3.0]nona-3,5,8-triene-9-carboxylic acid, 5-Cyclopropyl-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid, 8-(4-Butoxy-3-methyl-phenyl)-5-cyclopropyl-4-[(1-naphthyl)methyl]-2-oxo-7-thia-1-azabicyclo[4.3.0]nona-3,5,8-triene-9-carboxylic acid, 5-Cyclopropyl-4-[(1-naphthyl)methyl]-2-oxo-8-(4-propoxy-3-methyl-phenyl)-7-thia-1-azabicyclo[4.3.0]nona-3,5,8-triene-9-carboxylic acid, 5-Cyclopropyl-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid, 8-[4-(Cyclopropylmethoxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-(4-Butoxy-3-methyl-phenyl)-5-cyclopropyl-2-oxo-4-{[m-(trifluoromethyl)phenyl]methyl}-7-thia-1-azabicyclo[4.3.0]nona-3,5,8-triene-9-carboxylic acid, or 1H-imidazol-1-ium 8-methoxy-2-(3-methyl-4 ((4-methylpentyl)oxy)phenyl)-7-(naphtalen-1-ylmethyl)-5-oxo-thiazolo[3,2-a]pyridine-3-carboxylate, a pharmaceutically acceptable salt of any of the foregoing compounds.

Further, the compound of Formula I as described herein may be selected from:

8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Methoxy-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid, 5-Methoxy-4-[(1-naphthyl)methyl]-2-oxo-8-(4-propoxy-3-methyl-phenyl)-7-thia-1-azabicyclo[4.3.0]nona-3,5,8-triene-9-carboxylic acid, 5-Cyclopropyl-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid, 8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-(4-Butoxy-3-methyl-phenyl)-5-cyclopropyl-2-oxo-4-{[m-(trifluoromethyl)phenyl]methyl}-7-thia-1-azabicyclo[4.3.0]nona-3,5,8-triene-9-carboxylic acid, or a pharmaceutically acceptable salt of any of the foregoing compounds.

There is also provided a compound of Formula I as described, wherein:
- $R_1$ is selected from the group consisting of carboxylic acid and 1H-imidazol-1-ium carboxylate,
- $R_2$ is hydrogen,
- $R_3$ is selected from the group consisting of naphthalen-1-yl, 3-(trifluoromethyl)phenyl, anthracen-9-yl and naphthalen-1-yloxy,
- $R_4$ is selected from the group consisting of: cyclopropyl, methoxy, amino, dimethylamino, 3-(trifluoromethyl)phenyl, benzo[d][1,3]dioxol-5-yl, and carboxylic acid, and
- $R_5$ is selected from the group consisting of 4-(hexyloxy)-3-methylphenyl, 3-methyl-4-propoxyphenyl, 4-(heptyloxy)-3-methylphenyl, 4-methoxy-3-methylphenyl, 4-ethoxy-3-methylphenyl, 3-methyl-4-(pentyloxy)phenyl, 4-butoxy-3-methylphenyl, 4-(pentyloxy)phenyl, 4-butoxyphenyl, 1-hexyl-1H-1,2,3-triazol-4-yl, 4-(2-methoxyethoxy)-3-methylphenyl, 4-hydroxy-3-methylphenyl, 4-(allyloxy)-3-methylphenyl, 4-(hex-5-yn-1-yloxy)-3-methylphenyl, 3-methyl-4-((4-methylpentyl)oxy)phenyl, 3-methyl-4-((4-methylpent-3-en-1-yl)oxy)phenyl, 4-(hex-5-en-1-yloxy)-3-methylphenyl, 4-(cyclopropylmethoxy)-3-methylphenyl, benzyl, phenyl, 2-(m-tolyl), 2-(p-tolyl), and 2,3-dihydrobenzo[b][1,4]dioxin-6-yl, or a pharmaceutically acceptable salt thereof.

Further, there is provided a compound of Formula I as described herein for use as a medicament in therapy.

There is also provided a compound of Formula I or Formula IV as described herein for use in the treatment and/or prevention of a disease involving gram-positive bacteria. The gram-positive bacteria may be selected from the group consisting of *Staphylococcus aureus*, Methicillin-resistant *Staphylococcus aureus* (MRSA), Vancomycin-Resistant Enterococci (VRE), *Enterococcus faecalis* (*E. faecalis*), *Enterococcus faecium*, Vancomycin-Intermediate *Staphylococcus aureus* (VISA), Vancomycin-Resistant *Staphylococcus aureus* (VRSA), *Clostridium difficile* (*C. difficile*), *Clostridium tetani, Streptococcus pyogenes, Staphylococcus saphyticus, Bacillus subtilis* and any combination thereof. The disease may be a healthcare-associated infection. Examples of the disease, which may or may not be healthcare-associated, include diseases selected from the group consisting of urinary tract infection (UTI), catheter associated urinary tract infection, central line associated bloodstream infection (CLABSI), pneumonia, wound associated infection, surgical site infection, bacterial endocarditis, tetanus and any combination thereof. The central line associated bloodstream infection may be bacteremia or sepsis. Further, the disease may be drug-resistant such as resistant to drugs frequently used to treat diseases involving gram-positive bacteria.

There is also provided a use of a compound of Formula I or Formula IV as described herein for use in the manufacture of a medicament for the treatment and/or prevention of a disease involving gram-positive bacteria. The gram-positive bacteria may be selected from the group consisting of *Staphylococcus aureus*, Methicillin-resistant *Staphylococcus aureus* (MRSA), Vancomycin-Resistant Enterococci (VRE), *Enterococcus faecalis* (*E. faecalis*), *Enterococcus faecium*, Vancomycin-Intermediate *Staphylococcus aureus* (VISA), Vancomycin-Resistant *Staphylococcus aureus* (VRSA), *Clostridium difficile* (*C. difficile*), *Clostridium tetani, Streptococcus pyogenes, Staphylococcus saphyticus, Bacillus subtilis* and any combination thereof. The disease may be a healthcare-associated infection. Examples of the disease, which may or may not be healthcare-associated, include diseases selected from the group consisting of urinary tract infection (UTI), catheter associated urinary tract infection, central line associated bloodstream infection (CLABSI), pneumonia, wound associated infection, surgical site infection, bacterial endocarditis, tetanus and any combination thereof. The central line associated bloodstream infection may be bacteremia or sepsis. Further, the disease may be drug-resistant such as resistant to drugs frequently used to treat diseases involving gram-positive bacteria.

There is also a method for treatment and/or prevention of a disease involving gram-positive bacteria comprising administering to a mammal, such as a human or an animal, in need thereof an effective amount of a compound of Formula I or Formula IV as described herein. The gram-positive bacteria may be selected from the group consisting of *Staphylococcus aureus*, Methicillin-resistant *Staphylococcus aureus* (MRSA), Vancomycin-Resistant Enterococci (VRE), *Enterococcus faecalis* (*E. faecalis*), *Enterococcus faecium*, Vancomycin-Intermediate *Staphylococcus aureus* (VISA), Vancomycin-Resistant *Staphylococcus aureus* (VRSA), *Clostridium difficile* (*C. difficile*), *Clostridium tetani, Streptococcus pyogenes, Staphylococcus saphyticus, Bacillus subtilis* and any combination thereof. The disease may be a healthcare-associated infection. Examples of the disease, which may or may not be healthcare-associated, include diseases selected from the group consisting of urinary tract infection (UTI), catheter associated urinary tract infection, central line associated bloodstream infection (CLABSI), pneumonia, wound associated infection, surgical site infection, bacterial endocarditis, tetanus and any combination thereof. The central line associated bloodstream infection may be bacteremia or sepsis. Further, the disease may be drug-resistant such as resistant to drugs frequently used to treat diseases involving gram-positive bacteria.

The compound of Formula I may be provided in admixture with a pharmaceutically acceptable adjuvant, carrier or excipient thereby forming a pharmaceutical composition. Thus, the present disclosure provides a pharmaceutical composition comprising a compound of Formula I as described herein, or a pharmaceutically acceptable salt thereof, in admixture with a pharmaceutically acceptable adjuvant, carrier or excipient.

The compounds of the present disclosure may possess bactericidal activity against gram-positive bacteria. Additionally or alternatively, the compounds of the present disclosure may sensitize gram-positive bacteria to treatment with a drug against gram-positive bacteria. In the latter case, the gram-positive bacteria may be affected to a little extent or no extent by treatment with the compounds of the present disclosure alone or by treatment by the drug against gram-positive bacteria alone. However, when a combination of the compounds of the present disclosure and a drug against gram-positive bacteria as described herein is used a significant bactericidal effect is achieved.

Thus, there is provided a compound as disclosed herein for use in sensitizing gram-positive bacteria to treatment with a drug against a disease involving gram-positive bacteria. There is also provided a use of a compound as described herein for the manufacture of a medicament for sensitizing gram-positive bacteria to treatment with a drug against a disease involving gram-positive bacteria. There is also provided a method for sensitizing gram-positive bacteria to treatment with a drug against a disease involving gram-positive bacteria, said method comprising administering to a patient such as a human or an animal in need thereof an effective amount of a compound as described herein.

The compound of Formula I or Formula IV as described herein may be provided in combination with a drug against a disease involving gram-positive bacteria. The combination may be provided in admixture with a pharmaceutically acceptable adjuvant, carrier or excipient thereby forming a pharmaceutical composition. It is believed that this combination will provide an alternative and/or improved way of treating a disease involving gram-positive bacteria. This alternative and/or improved way may involve lowering the dose of the drug compared to use of the drug alone when treating the disease involving gram-positive bacteria. Alternatively or additionally, this alternative and/or improved way may mitigate or at least partly overcome problems associated with drug-resistance.

Thus, there is provided a combination comprising:
(i) a composition comprising or consisting of a drug against a disease involving gram-positive bacteria, or a pharmaceutically acceptable salt of said drug, and
(ii) a composition comprising or consisting of a compound of Formula IV:

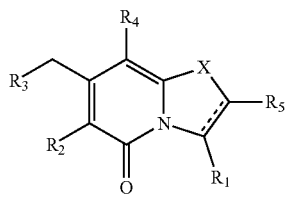

Formula IV or a pharmaceutically acceptable salt thereof,
wherein:
$R_1$ is selected from the group consisting of:
a) C(O)OH,
b) tetrazolyl,
c) C(O)NHSO$_2$R$_6$,
d) NH$_2$,
e) H, f)
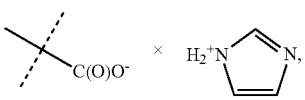

g)
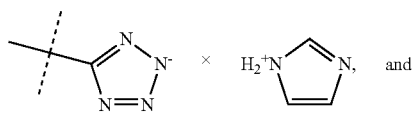
and h)
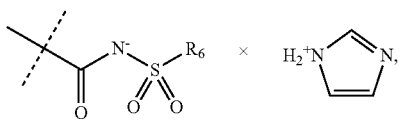

$R_2$ is selected from the group consisting of:
a) H,
b) Cl, F, Br or I,
c) CH$_2$OH,
d) $C_1$-$C_4$alkyl, and
e) NZ$_1$Z$_2$, $R_3$ is selected from the group consisting of:
a) 1-naphtyl, 2-naphtyl, 1-naphtyloxy, 9-anthryl and 9-anthryloxy each independently substituted with 0, 1, 2 or 3 substituents selected from the group consisting of methyl, fluoro, chloro, bromo, cyano and methoxy,
b) $C_1$-$C_4$alkyl substituted with 0, 1, 2, 3 or 4 fluoro,
c) phenyl substituted with 0, 1, 2 or 3 substituents independently selected from the group consisting of methyl, fluoro, chloro, cyano and trifluoromethyl,
d) aminophenyl substituted with 0, 1, 2 or 3 substituents independently selected from the group consisting of methyl, fluoro, chloro and trifluoromethyl
e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-naphth-5-yl, $R_4$ is selected from the group consisting of:
a) $C_1$-$C_4$alkyl substituted with 0, 1, 2, 3 or 4 fluoro;
b) $C_3$-$C_6$cycloalkyl,
c) $C_1$-$C_4$alkoxy substituted with 0, 1, 2, 3 or 4 fluoro,
d) $C_3$-$C_6$cycloalkoxy,
e) a 3-, 4-, 5-, or 6-membered heterocycle,
f) NZ$_1$Z$_2$,
g) CH$_2$NZ$_1$Z$_2$,
i) C(O)OH,
j) C(O)H,
k) 3-(trifluoromethyl)phenyl, and
l) benzo[d][1,3]dioxol-5-yl, $R_5$ is selected from the group consisting of:

(a)
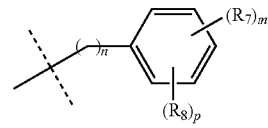

(b)
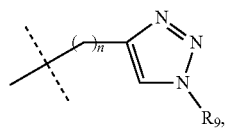

(c)
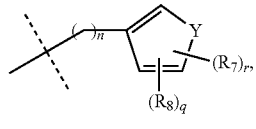

(d)
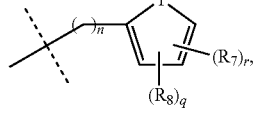

(e)
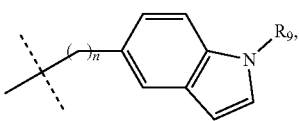

and
f) H,
and in the above definitions:
$R_6$ is $C_1$-$C_4$alkyl or phenyl, $R_7$ is selected from the group consisting of F, Cl, Br, and $C_1$-$C_4$alkyl, $R_8$ is selected from the group consisting of OH, $C_1$-$C_{10}$alkoxy, $C_1$-$C_{10}$alkenoxy, $C_1$-$C_{10}$alkynoxy and $O(CH_2)_2OCH_3$, or $R_7$ and $R_8$ together form $O(CH)_2O$, $R_9$ is selected from the group consisting of H and $C_1$-$C_{10}$ alkyl, $R_{10}$ represents $C_1$-$C_4$alkyl, $R_{11}$ represents $C_1$-$C_4$alkyl, or $R_{10}$ and $R_{11}$ together form $CH_2(CH_2)_mCH_2$, Y is O, S or N, $Z_1$ and $Z_2$ each independently represents hydrogen, methyl, $CH_3S(O)_2$, $C(O)OR_{10}$, $C(O)NR_{10}R_{11}$ or $C(O)R_{10}$, or $Z_1$ and $Z_2$ together form $CH_2CH_2CH_2CH_2$, $CH_2CH_2CH_2$, or $CH_2CH_2CH_2CH_2CH_2$, n is 0 or 1, m is 0 or 1, p is 0, 1 or 2, q is 0 or 1, r is 0 or 1, and X is S, SO or $SO_2$.

Further, there is provided a combination as described herein wherein the compound of Formula IV is as described herein except that $R_5$ is not hydrogen (H).

The compound of Formula IV may be a compound of Formula IVa or Formula IVb:

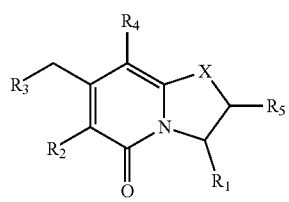

Formula IVa

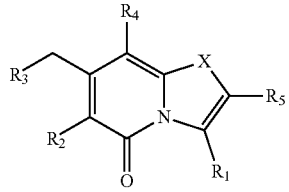

Formula IVb wherein $R_1$, $R_2$, $R_3$, $R_4$, $R_5$ and X are as described herein for the compound of Formula IV.

In an example, the compound of Formula IV may be selected from Examples 28-39, 40 and 48 of Table 1 of this document.

For instance, the compound of Formula IV may be selected from:

8-Benzyl-5-cyclopropyl-4-[(1-naphthyl)methyl]-2-oxo-7-thia-1-azabicyclo[4.3.0]nona-3,5,8-triene-9-carboxylic acid, 5-Cyclopropyl-4-[(1-naphthyl)methyl]-2-oxo-8-phenyl-7-thia-1-azabicyclo[4.3.0]nona-3,5,8-triene-9-carboxylic acid, 5-Cyclopropyl-4-[(1-naphthyl)methyl]-2-oxo-8-(m-tolyl)-7-thia-1-azabicyclo[4.3.0]nona-3,5,8-triene-9-carboxylic acid, 5-Cyclopropyl-4-[(1-naphthyl)methyl]-2-oxo-8-(p-tolyl)-7-thia-1-azabicyclo[4.3.0]nona-3,5,8-triene-9-carboxylic acid, 5-Cyclopropyl-8-(1H-indol-5-yl)-4-[(1-naphthyl)methyl]-2-oxo-7-thia-1-azabicyclo[4.3.0]nona-3,5,8-triene-9-carboxylic acid, 5-Cyclopropyl-8-(1,4-dioxa-2,3-dihydronaphth-6-yl)-4-[(1-naphthyl)methyl]-2-oxo-7-thia-1-azabicyclo[4.3.0]nona-3,5,8-triene-9-carboxylic acid, 5-Cyclopropyl-4-[(1-naphthyl)methyl]-2-oxo-8-(3-thienyl)-7-thia-1-azabicyclo[4.3.0]nona-3,5,8-triene-9-carboxylic acid, 5-Cyclopropyl-8-(2-furyl)-4-[(1-naphthyl)methyl]-2-oxo-7-thia-1-azabicyclo[4.3.0]nona-3,5,8-triene-9-carboxylic acid, 5-Cyclopropyl-8-(3-furyl)-4-[(1-naphthyl)methyl]-2-oxo-7-thia-1-azabicyclo[4.3.0]nona-3,5,8-triene-9-carboxylic acid, 6-[(9-Anthryl)methyl]-4-oxo-7-[m-(trifluoromethyl)phenyl]-1-thia-3a-aza-3-indancarboxylic acid, 6-[(Naphtyl)methyl]-4-oxo-7-[m-(trifluoromethyl)phenyl]-1-thia-3a-aza-3-indancarboxylic acid, 6-[(Naphtyloxy)methyl]-4-oxo-2-phenyl-7-(1,3-Dioxa-5-indanyl)-1-thia-3a-aza-3indancarboxylic acid, (R)-7-(naphtalen-1-ylmethyl)-5-oxo-2,3-dihydro-tiazolo[3,2,a]pyridine-3,8-dicarboxylic acid, or 7-(anthracen-9-ylmethyl)-8-methoxy-5-oxo-2,3-dihydro-thiazolo[3,2,a]pyridine-3-carboxylic acid, a pharmaceutically acceptable salt of any one of the foregoing compounds.

In a further example, the compound described herein may be selected from:

5-Cyclopropyl-4-[(1-naphthyl)methyl]-2-oxo-8-(m-tolyl)-7-thia-1-azabicyclo[4.3.0]nona-3,5,8-triene-9-carboxylic acid, 6-[(9-Anthryl)methyl]-4-oxo-7-[m-(trifluoromethyl)phenyl]-1-thia-3a-aza-3-indancarboxylic acid, 8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Methoxy-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid, 5-Methoxy-4-[(1-naphthyl)methyl]-2-oxo-8-(4-propoxy-3-methyl-phenyl)-7-thia-1-azabicyclo[4.3.0]nona-3,5,8-triene-9-carboxylic acid, 5-Cyclopropyl-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid, 8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-(4-Butoxy-3-methyl-phenyl)-5-cyclopropyl-2-oxo-4-{[m-(trifluoromethyl)phenyl]methyl}-7-thia-1-azabicyclo[4.3.0]nona-3,5,8-triene-9-carboxylic acid, or a pharmaceutically acceptable salt of any of the foregoing compounds.

For instance, the compound of Formula IV may be a compound of Formula I as described herein.

The combination described herein may be provided as a single composition.

Alternatively, the combination may be provided as a kit of parts.

The combination described herein may further comprise instructions for use. For instance, the instructions for use may include instructions for separate, sequential or simultaneous use of (i) and (ii) of the combination as described herein.

The drug of the combination described herein may be an antibiotic such as an antibiotic selected from the group consisting of glycopeptide antibiotics, lipoglycopeptide antibiotics, lipopeptide antibiotics, penicillin antibiotics, oxazolidinone antibiotics, aminoglycoside antibiotics and any combination thereof. The glycopeptide antibiotics may be a semisynthetic glycopeptide antibiotics. The glycopeptide antibiotics may be vancomycin and/or teicoplanin. The lipoglycopeptide antibiotics may be telavancin. The lipopeptide antibiotics may be daptomycin. The penicillin antibiotics may be oxacillin. The oxazolidinone antibiotics may be linezolide and/or teidizolide. The semisynthetic antibiotics may be orbactiv. The aminoglycoside antibiotics may be gentamicin, tobramycin, amikacin, streptomycin, neomycin, and/or paromomycin.

It will be appreciated that teicoplanin is a mixture of several compounds, namely five major compounds (named teicoplanin $A_2$-1 through $A_2$-5) and four minor (named teicoplanin $R_S$-1 through $R_S$-4). All teicoplanins share a same glycopeptide core, termed teicoplanin $A_{3-1}$—a fused ring structure to which two carbohydrates (mannose and N-acetylglucosamine) are attached. The major and minor components also contain a third carbohydrate moiety—β-D-glucosamine—and differ only by the length and conformation of a side-chain attached to it. The present disclosure encompasses all teicoplanin mixtures.

For instance, the drug of the combination described herein may be selected from the group consisting of vancomycin, oxacillin, dalbavancin, oritavancin, teicoplanin, daptomycin, linezolid, tedizolid, telavancin, gentamicin, tobramycin, amikacin, streptomycin, neomycin, and paromomycin and any combination thereof. In an example, the drug may be vancomycin, oxacillin and/or gentamicin.

The chemical structures of vancomycin, oxacillin, dalbavancin, oritavancin, teicoplanin, daptomycin, linezolid, tedizolid, telavancin, gentamicin are as described in the figures of this document.

It will be appreciated that the drug against a disease involving gram-positive bacteria as described herein may or may not also be a drug against tuberculosis bacteria such as rifampin and/or linezolid.

There is also provided a combination as described herein for use as a medicament in therapy.

There is also provided a combination as described herein for use in the treatment and/or prevention of a disease involving gram-positive bacteria. The gram-positive bacteria may be selected from the group consisting of *Staphylococcus aureus*, Methicillin-resistant *Staphylococcus aureus* (MRSA), Vancomycin-Resistant Enterococci (VRE), *Enterococcus faecalis (E. faecalis)*, *Enterococcus faecium*, Vancomycin-Intermediate *Staphylococcus aureus* (VISA), Vancomycin-Resistant *Staphylococcus aureus* (VRSA), *Clostridium difficile (C. difficile)*, *Clostridium tetani*, *Streptococcus pyogenes*, *Staphylococcus saphyticus*, *Bacillus subtilis* and any combination thereof. The disease may be a healthcare-associated infection. Examples of the disease, which may or may not be healthcare-associated, include diseases selected from the group consisting of urinary tract infection (UTI), catheter associated urinary tract infection, central line associated bloodstream infection (CLABSI), pneumonia, wound associated infection, surgical site infection, bacterial endocarditis, tetanus and any combination thereof. The central line associated bloodstream infection may be bacteremia or sepsis. Further, the disease may be drug-resistant such as resistant to drugs frequently used to treat diseases involving gram-positive bacteria.

There is also provided a use of a combination as described herein for the manufacture of a medicament for the treatment and/or prevention of a disease involving gram-positive bacteria. The gram-positive bacteria may be selected from the group consisting of *Staphylococcus aureus*, Methicillin-resistant *Staphylococcus aureus* (MRSA), Vancomycin-Resistant Enterococci (VRE), *Enterococcus faecalis (E. faecalis)*, *Enterococcus faecium*, Vancomycin-Intermediate *Staphylococcus aureus* (VISA), Vancomycin-Resistant *Staphylococcus aureus* (VRSA), *Clostridium difficile (C. difficile)*, *Clostridium tetani*, *Streptococcus pyogenes*, *Staphylococcus saphyticus*, *Bacillus subtilis* and any combination thereof. The disease may be a healthcare-associated infection. Examples of the disease, which may or may not be healthcare-associated, include diseases selected from the group consisting of urinary tract infection (UTI), catheter associated urinary tract infection, central line associated bloodstream infection (CLABSI), pneumonia, wound associated infection, surgical site infection, bacterial endocarditis, tetanus and any combination thereof. The central line associated bloodstream infection may be bacteremia or sepsis. Further, the disease may be drug-resistant such as resistant to drugs frequently used to treat diseases involving gram-positive bacteria.

There is also provided a method for treatment and/or prevention of a disease involving gram-positive bacteria comprising administering to a mammal, such as a human or an animal, in need thereof an effective amount of a combination as described herein. The gram-positive bacteria may be selected from the group consisting of *Staphylococcus aureus*, Methicillin-resistant *Staphylococcus aureus* (MRSA), Vancomycin-Resistant Enterococci (VRE), *Enterococcus faecalis (E. faecalis)*, *Enterococcus faecium*, Vancomycin-Intermediate *Staphylococcus aureus* (VISA), Vancomycin-Resistant *Staphylococcus aureus* (VRSA), *Clostridium difficile (C. difficile)*, *Clostridium tetani*, *Streptococcus pyogenes*, *Staphylococcus saphyticus*, *Bacillus subtilis* and any combination thereof. The disease may be a healthcare-associated infection. Examples of the disease, which may or may not be healthcare-associated, include diseases selected from the group consisting of urinary tract infection (UTI), catheter associated urinary tract infection, central line associated bloodstream infection (CLABSI), pneumonia, wound associated infection, surgical site infection, bacterial endocarditis, tetanus and any combination thereof. The central line associated bloodstream infection may be bacteremia or sepsis. Further, the disease may be drug-resistant such as resistant to drugs frequently used to treat diseases involving gram-positive bacteria.

The present disclosure provides an article treated with a compound as described herein or a combination as described herein. The article may be a medical device or a cosmetic device. Thus, there is also provided a medical device or cosmetic device such as an implant treated with a compound as described herein or a combination as described herein. The medical device or cosmetic device may be a catheter or an implant such as a dental implant, cochlear implant, breast implant, nose prosthesis, heart valve, pacemaker, ocular prosthesis or an injectable filler.

Further, the present disclosure provides the following compounds:
(R)-7-(naphtalen-1-ylmethyl)-5-oxo-2,3-dihydro-tiazolo[3,2,a]pyridine-3,8-dicarboxylic acid, or
7-(anthracen-9-ylmethyl)-8-methoxy-5-oxo-2,3-dihydro-thiazolo[3,2,a]pyridine-3-carboxylic acid, or a pharmaceutically acceptable salt of any of the foregoing compounds.

Salts

The compounds of the present disclosure may be provided as a pharmaceutically acceptable salt. A suitable pharmaceutically acceptable salt of a compound of the present disclosure may be, for example, a base-addition salt of a compound of the present disclosure which is sufficiently acidic, for example, a metal salt, for example, lithium, sodium, potassium, calcium, magnesium, zinc or aluminum, an ammonium salt, a salt with an organic base which affords a physiologically acceptable cation, which includes quaternary ammonium hydroxides, for example methylamine, ethylamine, diethylamine, trimethylamine, tert-butylamine, triethylamine, dibenzylamine, N,N-dibenzylethylamine, cyclohexylethylamine, tris-(2-hydroxyethyl)amine, hydroxyethyl diethylamine, (1R, 2S)-2-hydroxyinden-1-amine, morpholine, N-methylpiperidine, N-ethylpiperidine, imidazole, piperazine, methylpiperazine, adamantylamine, choline hydroxide, tetrabutylammonium hydroxide, tris-(hydroxymethyl)methylamine hydroxide, L-arginine, N-methyl D-glucamine, lysine or arginine.

In an example, there is provided an imidazole salt of the compounds of the present disclosure such as a compound of the present disclosure wherein $R_1$ is C(O)OH, tetrazolyl or C(O)NHSO$_2$R$_6$. It will be appreciated that the imidazole salt is a combination of a compound of the present disclosure and imidazole.

As described herein, proton transfer may occur between the active pharmaceutical ingredient such as the compounds described herein and the counter ion of the salt. The proton transfer may take place to a varying extent.

For instance, when the $R_1$ group of the compounds described herein is C(O)OH it may combine with imidazole to form a salt which may be depicted as shown below:

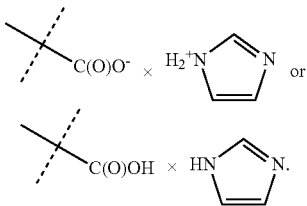

In a further example, when the $R_1$ group of the compounds described herein is tetrazolyl it may combine with imidazole to form a salt which may be depicted as shown below:

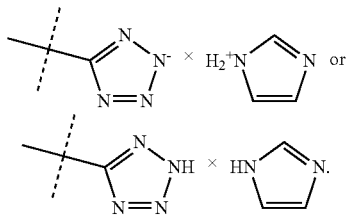

In still a further example, when the $R_1$ group of the compounds described herein is C(O)NHSO$_2$R$_6$ it may combine with imidazole to form a salt which may be depicted as shown below:

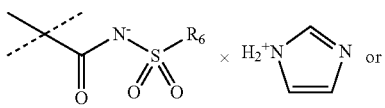

-continued

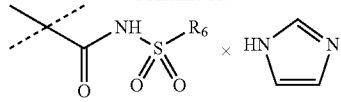

It will be appreciated that the imidazole salts of the compounds described herein wherein $R_1$ is C(O)OH, tetrazolyl or C(O)NHSO$_2$R$_6$ may be depicted as shown above regardless of the extent of proton transfer.

Solvates or Hydrates

Certain compounds of the present disclosure may exist as solvates or hydrates. It is to be understood that the present disclosure encompasses all such solvates or hydrates. Compounds of the present disclosure may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present disclosure, whether radioactive or not, are intended to be encompassed within the scope of the present disclosure.

Co-Crystals

In a salt, proton transfer may occur between the active pharmaceutical ingredient and the counter ion of the salt. However, in some cases there is no or only partial proton transfer and the solid is therefore not a true salt. It is accepted that the proton transfer is in fact a continuum, and can change with temperature, and therefore the point at which a salt is better described as a "co-crystal" may be subjective. The term "co-crystal" as used herein refers to multicomponent system in which there exists a host molecule or molecules (active pharmaceutical ingredient) and a guest (or co-former) molecule or molecules. The guest or co-former molecule is defined as existing as a solid at room temperature in order to distinguish the co-crystal from solvates. However, a co-crystal may itself form solvates.

In a co-crystal there is generally predominance for interaction through non-ionic forces, such as hydrogen bonding. It will be appreciated that all co-crystals are included within the scope of the compounds described herein.

Polymorphs

Compounds of the present disclosure may exist in a continuum of solid states ranging from fully amorphous to fully crystalline. Thus, it is to be understood that all polymorphs, such as mixtures of different polymorphs, are included within the scope of the compounds described herein.

Prodrugs

In addition, compounds of the present disclosure may be administered in the form of a prodrug. A prodrug is a compound which may have little or no pharmacological activity itself, but when such compound is administered into or onto the body of a patient, it is converted into a compound of Formula II. The prodrug may contain a metabolically or chemically labile acyl function such as a carboxylate ester or carbamate.

Methods of Preparation

Compounds of the present disclosure may be prepared as described in WO 2014/185833 and/or in schemes 1 to 4 below. In schemes 1 to 4, R may be an alkyl group and Ar may be an aryl such as phenyl. The aryl may optionally be substituted with one or more alkyl groups such as a methyl group. The compounds may also be prepared as described for structurally related compounds. The reactions may be carried out as in standard procedures or as described in the experimental section of this document. The sulfide of the compounds of Formula I or Formula IV may be oxidized with the aid of meta-chloroperoxybenzoic acid (mCPBA) to sulphoxide and sulphone, respectively.
Scheme 1
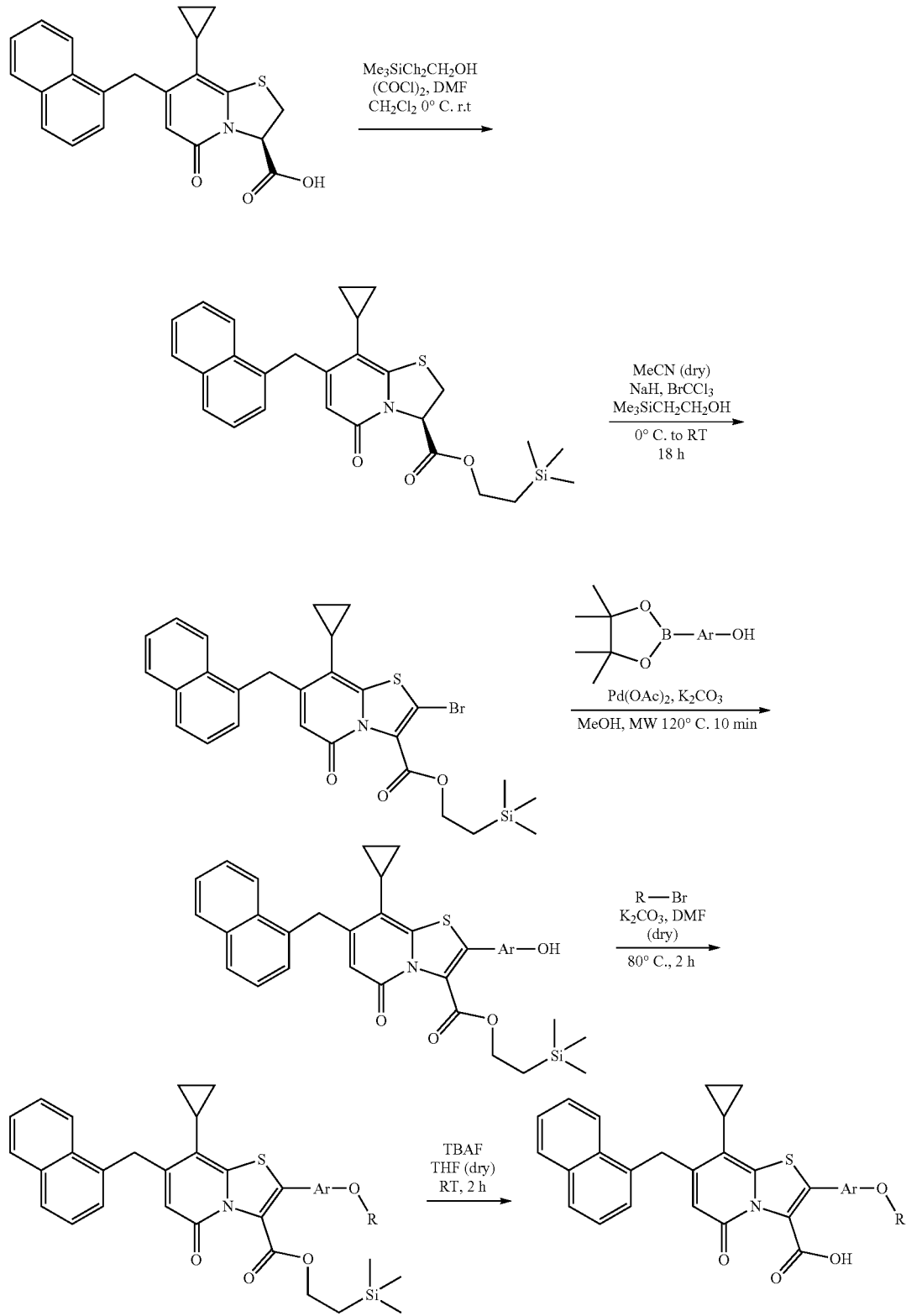

Scheme 2
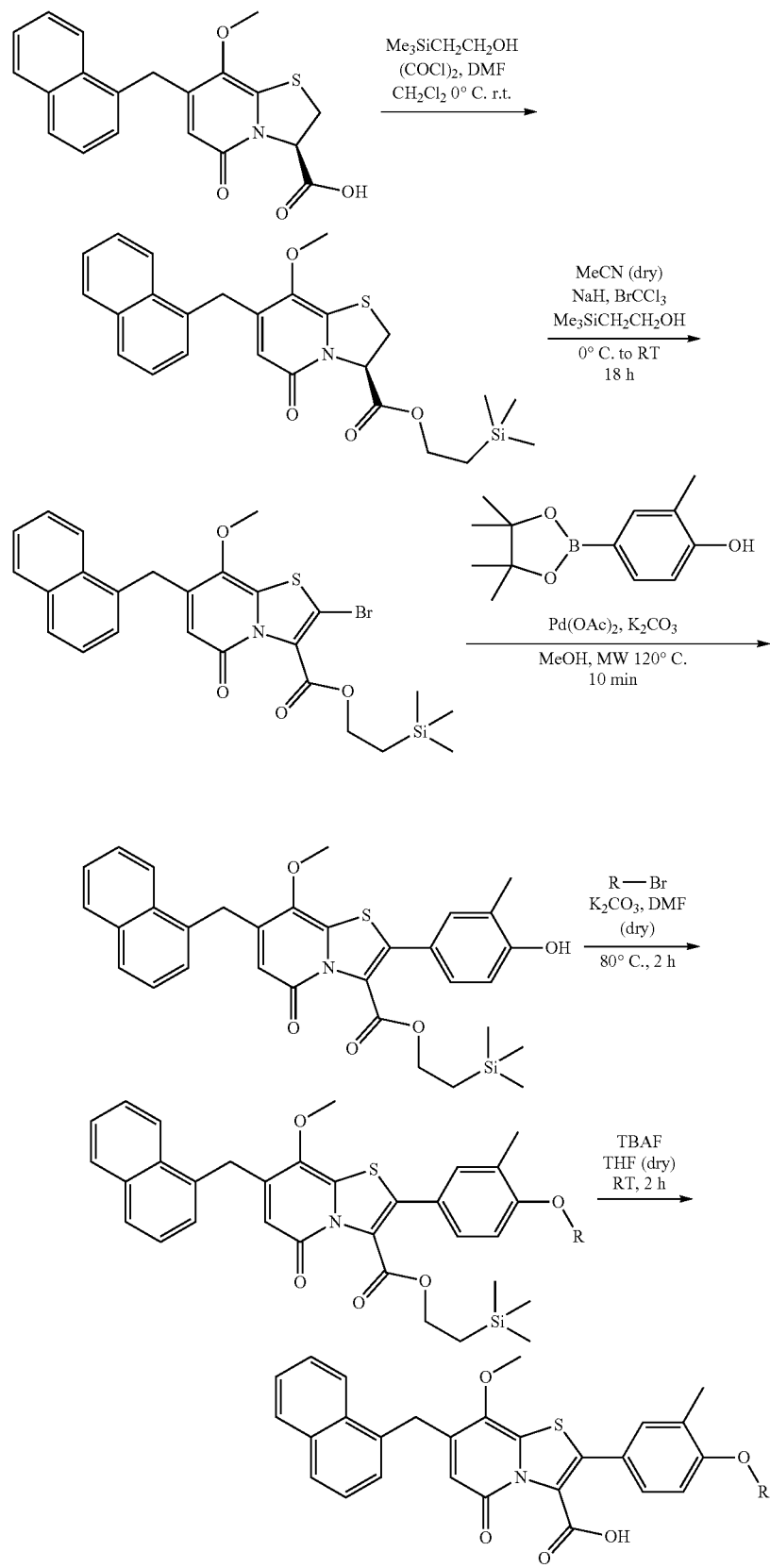

Scheme 3
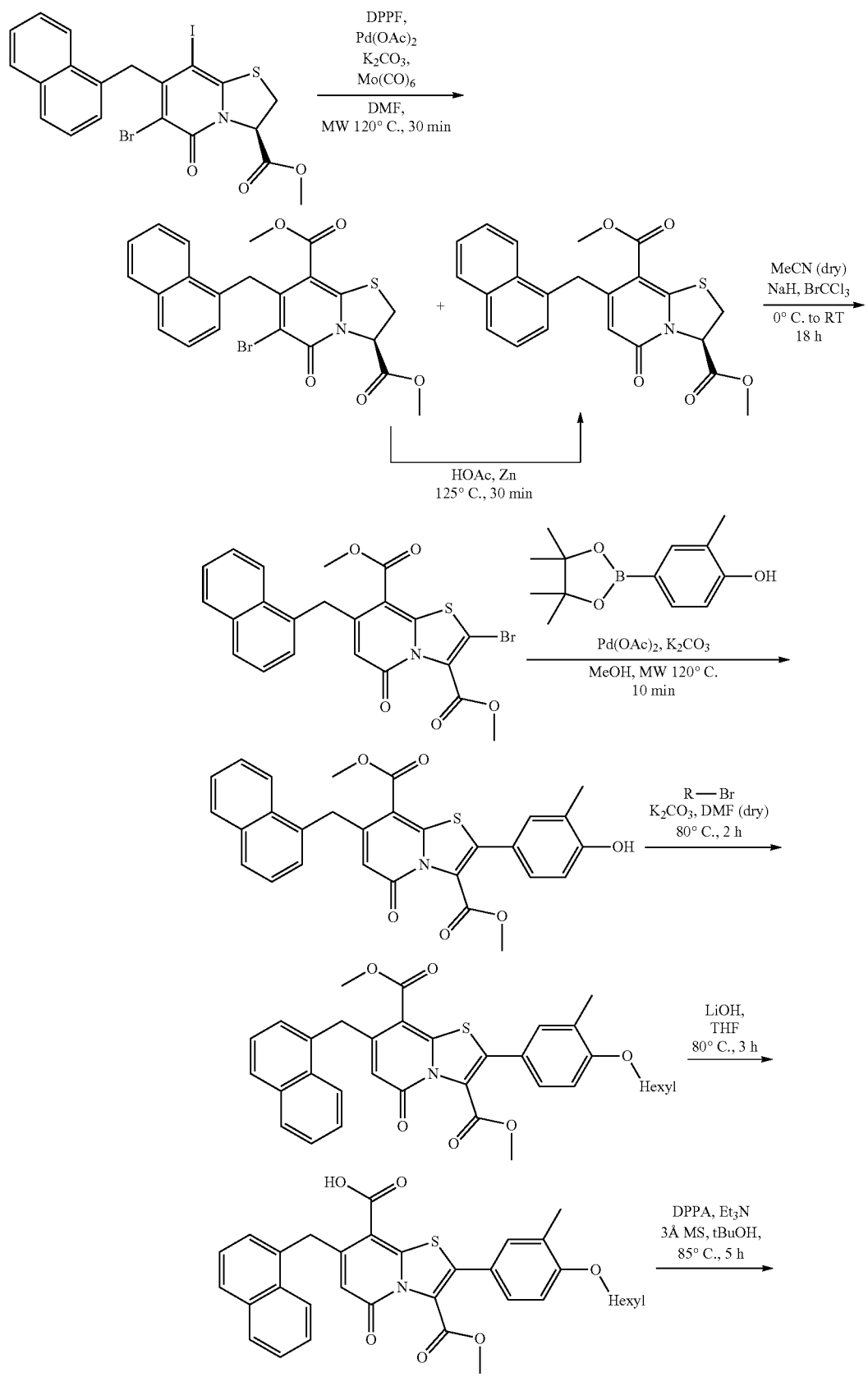

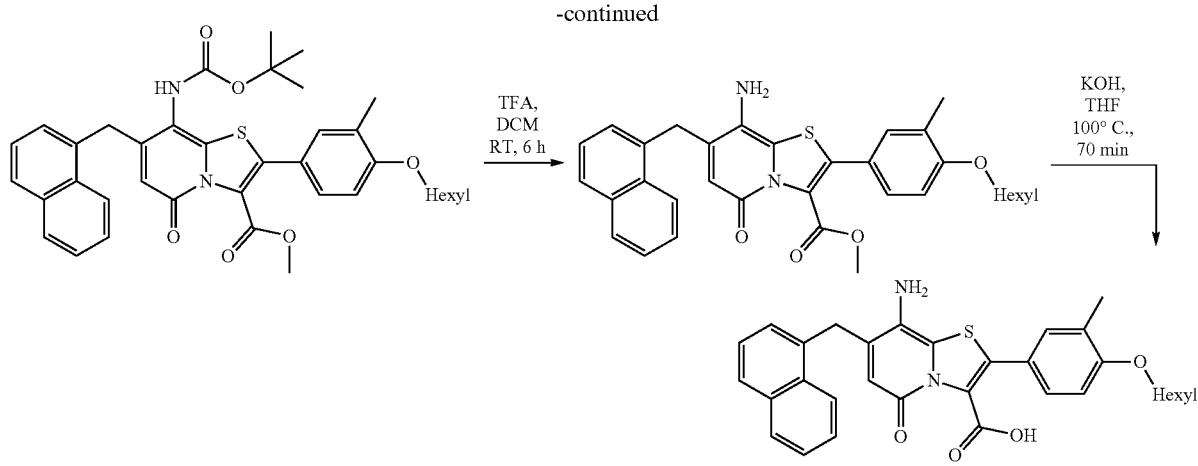
Scheme 4
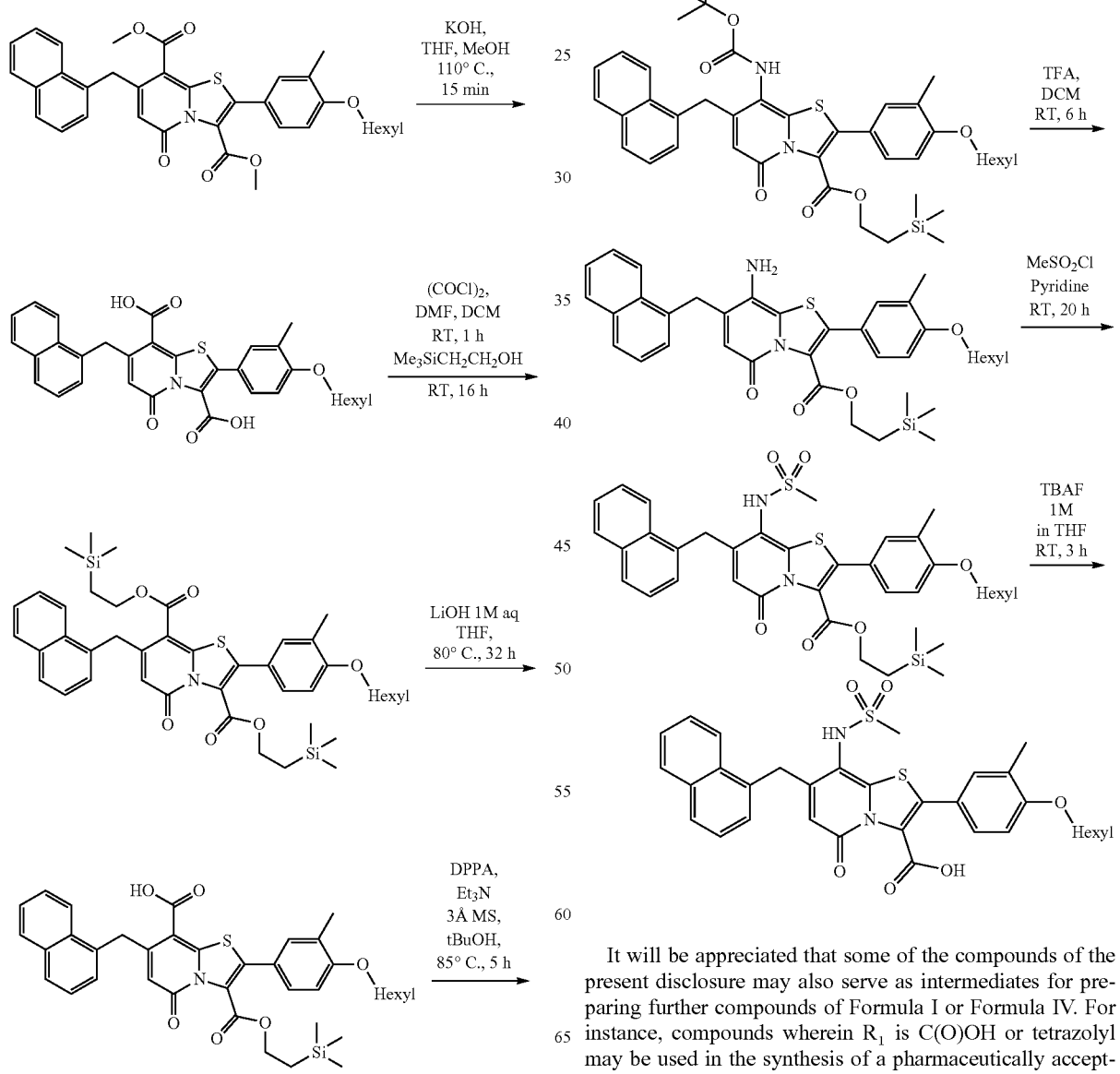
It will be appreciated that some of the compounds of the present disclosure may also serve as intermediates for preparing further compounds of Formula I or Formula IV. For instance, compounds wherein $R_1$ is C(O)OH or tetrazolyl may be used in the synthesis of a pharmaceutically acceptable salt of a compound of Formula I or Formula IV as described herein. In a further example, when $R_8$ is OH it may be transformed into an alkoxy group.

The disclosure is further illustrated by the following non-limitative Examples.

EXAMPLES

Abbreviations

BHI Brain Heart Infusion plates supplied from Fischer Scientific
calcd. calculated
CAUTI Catheter-Associated Urinary Tract Infection
*C. difficile Clostridium difficile*
CLABSI central line associated bloodstream infection
DCM dichloromethane
DMF dimethylformamide
DMSO dimethylsulphoxide
EA Ethyl Acetate
EtOAc Ethyl Acetate
ESI-TOF Electrospray Ionization Time of Flight Mass Spectroscopy
Gen Gentamicin
HCAI HealthCare-Associated Infection
HRMS High Resolution Mass Spectroscopy
IR infrared
MBC Minimum Bactericidal Concentration
MIC Minimum Inhibitory Concentration
ml milliliter
MRSA Methicillin-resistant *Staphylococcus aureus*
MW microwave
NMR Nuclear Magnetic Resonance
nd no data
nm nanometer
ns not statistically different
OD Optical density
$OD_{600}$ Optical density at 600 nm
PBS Phosphate-Buffered Saline buffer
ppm part per million
Van Vancomycin
VISA Vancomycin-Intermediate *Staphylococcus aureus*
VRE Vancomycin-Resistant Enterococci
VRSA Vancomycin-Resistant *Staphylococcus aureus*
TBAF tetra-n-butylammonium fluoride
TFA trifluoroacetic acid
THF tetrahydrofurane
TLC Thin Layer Chromatography
TMS trimethylsilyl
UTI urinary tract infection
μl microliter
LOD Bacterial limit of detection In this document, unless otherwise stated, the naming and the drawing of the chemical compounds and radicals have been made using the program Chem Doodle version 7.0.1 or version 7.0.2, or the program ChemDraw Ultra 12.0.2.1076. If the name and drawing are inconsistent, the chemical structure shall be considered to be correct.

Chemistry

General

Unless otherwise stated, all reagents and solvents were used as received from commercial suppliers. Microwave reactions were performed in sealed vessels using a Biotage® Initiator microwave synthesizer; temperatures were monitored by an internal IR probe. Automated flash column chromatography was performed using a Biotage® Isolera One system and purchased pre-packed silica gel cartridges (Biotage® SNAP Cartridge, KP-Sil). $^1$H- and $^{13}$C-NMR spectra were recorded, depending on instrument availability, on a Bruker Avance III 400 MHz spectrometer with a BBO-F/H Smartprobe™, a Bruker Avance III HD 600 MHz spectrometer with a CP BBO-H/F, 5 mm cryoprobe at 298 K. All spectrometers were operated by Topspin 3.5.7. Resonances are given in ppm relative to TMS, and calibrated to solvent residual signals (CDCl$_3$: $\delta_H$=7.26 ppm; $\delta_C$=77.16 ppm. (CD$_3$)$_2$SO: $\delta_H$=2.50 ppm; $\delta_C$=39.51 ppm. CD$_3$OD $\delta_H$=3.31 ppm; $\delta_C$=49.00 ppm). The following abbreviations are used to indicate splitting patterns: s=singlet; d=doublet; dd=double doublet; t=triplet; m=multiplet; bs=broad singlet. HRMS was performed on a mass spectrometer with ESI-TOF (ES+).

Synthesis of Compounds

The compounds of the Examples were synthesized in accordance or analogy with

Schemes 1-4 disclosed herein. For instance, the compounds of the Examples were synthesized as follows.

(3R)-7-Cyclopropyl-6-[(1-naphthyl)methyl]-4-oxo-1-thia-3a-aza-3-indancarboxylic acid and (3R)-7-Methoxy-6-[(1-naphthyl)methyl]-4-oxo-1-thia-3a-aza-3-indancarboxylic acid was prepared according to WO2016075296.

(3R)-7-Cyclopropyl-6-[(1-naphthyl)methyl]-4-oxo-1-thia-3a-aza-3-indancarboxylic acid (17.42 mmol) was suspended in dichloromethane (190 ml) and cooled to 0° C. Oxalyl chloride (19.16 mmol, 1.70 ml) and dimethylformamide (19.16 mmol, 1.50 ml) were added at 0° C. The mixture was then stirred at room temperature for 12 minutes. 2-(trimethylsilyl) ethanol (49.53 mmol, 7.10 ml) was added slowly and the reaction was stirred for 3 hours. Completion of the reaction was confirmed by TLC. The reaction mixture was then diluted with DCM, washed with NaHCO$_3$ (saturated, aqueous), dried (Na$_2$SO$_4$) and concentrated until about 200 ml dichloromethane remained. The organic layer was washed with water and the aqueous layer was extracted with DCM. The organic layers were combined, dried with Na$_2$SO$_4$ and concentrated. Crude product was purified on silica gel (ethyl acetate: heptane 1:1) to give TMS-ethyl ester.

NaH (3.06 mmol) was added slowly to a solution of the TMS-ethyl ester (1.70 mmol) in dry acetonitrile (15 ml) at 0° C. After 10 minutes, BrCCl$_3$ (5.11 mmol) was added dropwise. After stirring for 30 minutes, the reaction mixture was allowed to reach room temperature and stirred for further 30 minutes. 2-(TMS) ethanol (3.40 mmol) was added dropwise, and stirring was continued overnight. After completion reaction was quenched with an aqueous solution of 6 wt % KHSO$_4$ (10 ml), diluted with H$_2$O (10 ml) and acidified with 1 M HCl (10 ml). Aqueous layer extracted with EtOAc (20 ml×3), combined organic layers were washed with brine, dried over anhydrous sodium sulphate and evaporated under reduced pressure to yield crude brominated product which was purified by flash column chromatography (Biotage, 100 g column) eluting with 10-60% EtOAc in heptane.

A microwave vial was charged with bromo compound (0.90 mmol), added MeOH (6 ml) and degassed with nitrogen for 10 minutes. Boronic ester (1.44 mmol), K$_2$CO$_3$ (1.62 mmol) and Pd(OAc)$_2$ (0.09 mmol) were added. The microwave vial was sealed and the reaction mixture heated under MWI at 120° C. for 10 minutes. Diluted with dichloromethane (30 ml) and acidified with 1N HCl. Organic layer was separated, dried over anhydrous sodium sulphate and evaporated to yield crude aryl alcohol product which was purified by flash column chromatography (Biotage 100 g column) eluting with 0-100% EtOAc in heptane.

Aryl alcohol compound (0.27 mmol) was dissolved in dry DMF (2 ml). Added K$_2$CO$_3$ (1.11 mmol) and alkyl bromide (1.11 mmol). Reaction mixture was stirred under heating at 80° C. for 2 hours. Cooled to room temperature and added EtOAc (10 ml). Washed with brine (10 ml×4) 4. Organic layer dried over anhydrous Na$_2$SO$_4$ and evaporated under reduced pressure to yield crude silyl ester product which was used in next step without further purification.

Silyl Ester (0.23 mmol) was dissolved in dry THF (4 ml) and added TBAF (0.47 mmol). Reaction mixture was stirred at room temperature for 2 hours. Added H$_2$O and extracted with EtOAc (10 ml×2). Combined organic layers were dried over anhydrous sodium sulphate and evaporated to yield crude product which was purified by flash column chromatography (Biotage 10 g column) eluting with 20% MeOH in DCM. Pure compound was lyophilized from acetonitrile: water (1:3) mixture.

Example 36 was prepared from the known compound Methyl (3R)-5-bromo-7-iodo-6-[(1-naphthyl)methyl]-4-oxo-1-thia-3a-aza-3-indancarboxylate as described in J. Org. Chem (2010), 75 (3), 972-975 and/or according to Scheme 3.

Imidazole Salt

An imidazole salt was prepared as follows.

8-[4-(Hexyloxy)-3-methyl-phenyl]-5-methoxy-4-[(1-naphthyl)methyl]-2-oxo-7-thia-1-azabicyclo[4.3.0] nona-3,5,8-triene-9-carboxylic acid imidazole salt 8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, (0.11 mmol) was taken in a round bottom flask and MeOH (2 ml) was added thereby providing a suspension. Then imidazole (0.11 mmol) was added. Allowed to stir for about 2 hours. A clear reaction mixture was obtained. Solvent evaporated and the crude product was lyophilized from acetonitrile:water (3:1).

Examples 1-50

TABLE 1

| Example Number | Chemical structure. | Chemical name NMR and HRMS |
|---|---|---|
| 1 | 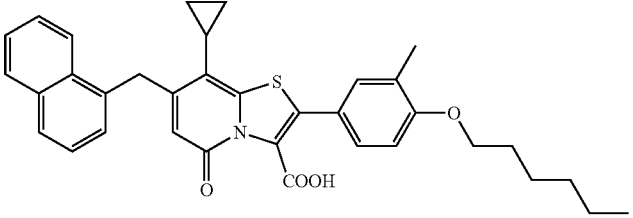 [SMILES: CCCCCCOc1ccc(-c2sc3c(C4CC4)c(Cc4cccc5ccccc45)cc(=O)n3c2C(=O)O)cc1C] | 5-Cyclopropyl-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid $^1$H-NMR (400 MHz, (CD$_3$)$_2$SO): δ 7.97 (dd, J 2.0, 7.2 Hz, 1H), 7.85-7.89 (m, 2H), 7.45-7.57 (m, 5H), 7.32 (d, J 6.8 Hz, 1H), 6.93 (d, J 8.4 Hz, 1H), 5.46 (s, 1H), 4.54 (s, 2H), 3.99 (t, J 6.4 Hz, 2H), 2.16 (s, 3H), 1.87 (bs, 1H), 1.70-1.77 (m, 2H), 1.41-1.46 (m, 2H), 1.28-1.36 (m, 4H), 1.02-1.04 (m, 2H), 0.88 (t, J 6.8 Hz, 3H), 0.74 (bs, 2H). HRMS (ESI) calcd (M + Na)$^+$ C$_{35}$H$_{35}$NNaO$_4$S$^+$ 588.2179 observed 588.2174. |
| 2 | 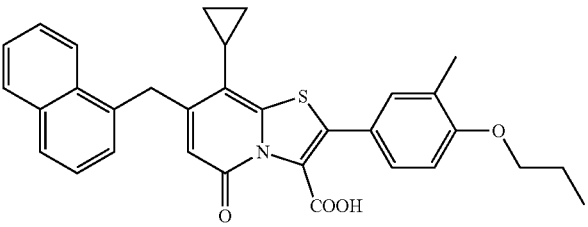 [SMILES: CCCOc1ccc(-c2sc3c(C4CC4)c(Cc4cccc5ccccc45)cc(=O)n3c2C(=O)O)cc1C] | 5-Cyclopropyl-4-[(1-naphthyl)methyl]-2-oxo-8-(4-propoxy-3-methyl-phenyl)-7-thia-1-azabicyclo[4.3.0]nona-3,5,8-triene-9-carboxylic acid $^1$H-NMR (400 MHz, (CD$_3$)$_2$SO): δ 7.98 (dd, J 2.4, 9.2 Hz, 1H), 7.86-7.90 (m, 2H), 7.46-7.61 (m, 5H), 7.34 (d, J 7.2 Hz, 1H), 6.94 (d, J 8.8 Hz, 1H), 5.46 (s, 1H), 4.55 (s, 2H), 3.97 (t, J 6.4 Hz, 2H), 2.17 (s, 3H), 1.87-1.88 (m, 1H), 1.72-1.81 (m, 2H), 0.91-1.05 (m, 5H), 0.76-0.77 (m, 2H). HRMS (ESI) calcd (M + Na)$^+$ C$_{32}$H$_{29}$NNaO$_4$S$^+$ 546.1710 observed 546.1705. |

TABLE 1-continued

| Example Number | Chemical structure. | Chemical name NMR and HRMS |
|---|---|---|
| 3 | | 5-Cyclopropyl-8-[4-(heptyloxy)-3-methyl-phenyl]4-[(1-naphthyl)methyl]-2-oxo-7-thia-1-azabicyclo[4.3.0]nona-3,5,8-triene-9-carboxylic acid<br>$^1$H-NMR (400 MHz, $(CD_3)_2SO$): δ 7.96 (dd, J 2.0, 7.2 Hz, 1H), 7.85-7.89 (m, 2H), 7.45-7.56 (m, 5H), 7.32 (d, J 6.4 Hz, 1H), 6.93(d, J<br><br>7.6 Hz, 1H), 5.46 (s, 1H), 4.55 (s, 2H) 3.99 (t, J 6.4 Hz, 2H), 2.15 (s, 3H), 1.88 (bs, 1H), 1.70-1.77 (m, 2H), 1.40-1.47 (m, 2H), 1.28-1.37 (m, 6H), 1.02-1.04 (m, 2H), 0.87 (t, J 6.4 Hz, 3H), 0.74 (bs, 2H). HRMS (ESI) calcd (M + Na)$^+$ $C_{36}H_{37}NNaO_4S^+$ 602.2336 observed 602.2328. |
| 4 | | 5-Cyclopropyl-8-(4-methoxy-3-methyl-phenyl)-4-[(1-naphthyl)methyl]-2-oxo-7-thia-1-azabicyclo[4.3.0]nona-3,5,8-triene-9-carboxylic acid<br>$^1$H-NMR (400 MHz, $(CD_3)_2SO$): δ 8.42 (bs, 1H), 7.96 (dd, J 2.0, 6.0 Hz, 1H), 7.86-7.91 (m, 2H), 7.64 (dd, J 1.6, 8.4 Hz, 1H) 7.47-7.56 (m,<br><br>4H), 7.36 (d, J 7.2 Hz, 1H), 6.97 (d, J 8.8 Hz, 1H), 5.46 (s, 1H), 4.56 (s, 2H), 3.82 (s, 3H), 2.17 (s, 3H), 1.88-1.91 (m, 1H), 1.02-1.05 (m, 2H), 0.78-0.79 (m, 2H). HRMS (ESI) calcd (M + H)$^+$ $C_{30}H_{26}NO_4S^+$ 496.1577 observed 496.1574. |
| 5 | | 5-Cyclopropyl-8-(4-ethoxy-3-methyl-phenyl)-4-[(1-naphthyl)methyl]-2-oxo-7-thia-1-azabicyclo[4.3.0]nona-3,5,8-triene-9-carboxylic acid<br>$^1$H-NMR (400 MHz, $(CD_3)_2SO$): δ 7.96 (dd, J 2.0, 9.2 Hz, 1H), 7.85-7.88 (m, 2H), 7.46-7.58 (m, 5H), 7.31 (d, J 6.8 Hz, 1H), 6.93 (d, J<br><br>8.8 Hz, 1H), 5.45 (s, 1H), 4.54 (s, 2H), 4.06 (q, J 6.8, 13.6 Hz, 2H), 2.16 (s, 3H), 1.91 (bs, 1H), 1.36 (t, J 6.8 Hz, 3H), 1.02-1.04 (m, 2H), 0.73 (bs, 2H). HRMS (ESI) calcd (M + H)$^+$ $C_{31}H_{28}NO_4S^+$ 510.1734 observed 510.1727. |
| 6 | | 5-Cyclopropyl-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid<br>$^1$H-NMR (400 MHz, $(CD_3)_2SO$): δ 7.97 (dd, J 4.4, 9.6 Hz, 1H), 7.87-7.91 (m, 2H), 7.48-7.59 (m, 5H), 7.37 |

TABLE 1-continued

| Example Number | Chemical structure. | Chemical name NMR and HRMS |
|---|---|---|
| | | (d, J 6.4 Hz, 1H), 6.96 (d, J 8.8 Hz, 1H), 5.45 (s, 1H), 4.56 (s, 2H), 4.01 (t, J 6.4 Hz, 2H), 2.17 (s, 3H), 1.89 (bs, 1H), 1.72-1.79 (m, 2H), 1.32-1.47 (m, 4H), 1.03-1.05 (m, 2H), 0.91 (t, J 7.2 Hz, 3H), 0.78 (bs, 2H). HRMS (ESI) calcd (M + Na)$^+$ C$_{34}$H$_{33}$NNaO$_4$S$^+$ 574.2023 observed 574.2019. |
| 7 | | 8-(4-Butoxy-3-methyl-phenyl)-5-cyclopropyl-4-[(1-naphthyl)methyl]-2-oxo-7-thia-1-azabicyclo[4.3.0]nona-3,5,8-triene-9-carboxylic acid $^1$H-NMR (400 MHz, (CD$_3$)$_2$SO): δ 7.98 (dd, J 3.6, 7.2 Hz, 1H), 7.88-7.92 (m, 2H), 7.49-7.55 (m, 3H), 7.3-7.46 (m, 3H), 7.0 (d, J 8.4 Hz, 1H), 5.53 (s, 1H), 4.59 (s, 2H), 4.04 (t, J 6.4 Hz, 2H), 2.19 (s, 3H), 1.88-1.94 (m, 1H), 1.70-1.77 (m, 2H), 1.43-1.52 (m, 2H), 1.03-1.05 (m, 2H), 0.95 (t, J 7.2 Hz, 3H), 0.81-0.82 (m, 2H). HRMS (ESI) calcd (M + Na)$^+$ C$_{33}$H$_{31}$NNaO$_4$S$^+$ 560.1866 observed 560.1857. |
| 8 | | 5-Methoxy-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid $^1$H-NMR (400 MHz, (CD$_3$)$_2$SO): δ 7.86-7.97 (m, 3H), 7.42-7.58 (m, 6H), 6.94 (d, J 8.8 Hz, 1H), 5.46 (s, 1H), 4.41 (s, 2H), 3.99 (t, J 6.4 Hz, 2H), 3.82 (s, 3H), 2.15 (s, 3H), 1.71-1.78 (m, 2H), 1.33-1.46 (m, 4H), 0.91 (t, J 7.2 Hz, 3H). HRMS (ESI) calcd (M + Na)$^+$ C$_{32}$H$_{31}$NNaO$_5$S$^+$ 564.1815 observed 564.1813. |
| 9 | | 8-(4-Butoxy-3-methyl-phenyl)-5-methoxy-4-[(1-naphthyl)methyl]-2-oxo-7-thia-1-azabicyclo[4.3.0]nona-3,5,8-triene-9-carboxylic acid $^1$H-NMR (400 MHz, (CD$_3$)$_2$SO): δ 7.86-7.97 (m, 3H), 7.43-7.59 (m, 6H), 6.96 (d, J 8.8 Hz, 1H), 5.47 (s, 1H), 4.41 (s, 2H), 4.01 (t, J 6.4 Hz, 2H), 3.83 (s, 3H), 2.16 (s, 3H), 1.69-1.76 (m, 2H), 1.42-1.51 (m, 2H), 0.95 (t, J 7.2 Hz, 3H). HRMS (ESI) calcd (M + Na)$^+$ C$_{31}$H$_{29}$NNaO$_5$S$^+$ 550.1659 observed 550.1649. |

TABLE 1-continued

| Example Number | Chemical structure. | Chemical name NMR and HRMS |
|---|---|---|
| 10 | | 5-Methoxy-4-[(1-naphthyl)methyl]-2-oxo-8-(4-propoxy-3-methyl-phenyl)-7-thia-1-azabicyclo[4.3.0]nona-3,5,8-triene-9-carboxylic acid<br>$^1$H-NMR (400 MHz, (CD$_3$)$_2$SO): δ 7.95-7.98 (m, 2H), 7.89 (d, J 8.0 Hz, 1H) 7.41-7.56 (m, 6H), 7.06 (d, J 8.4 Hz, 1H), 5.61 (s, 1H), 4.45 (s, 2H), 4.00 (t, J 6.4 Hz, 2H), 3.85 (s, 3H), 2.19 (s, 3H), 1.72-1.79 (m, 2H), 1.01 (t, J 7.6 Hz, 3H). HRMS (ESI) calcd (M + Na)$^+$ C$_{30}$H$_{27}$NNaO$_5$S$^+$ 536.1502 observed 536.1503. |
| 11 | | 8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid<br>$^1$H-NMR (400 MHz, (CD$_3$)$_2$SO): δ 7.95-7.98 (m, 2H), 7.89 (d, J 8.4 Hz, 1H), 7.41-7.55 (m, 6H), 7.07 (d, J 8.8 Hz, 1H), 5.61 (s, 1H), 4.45 (s, 2H), 4.03 (t, J 6.4 Hz, 2H), 3.85 (s, 3H), 2.18 (s, 3H), 1.71-1.78 (m, 2H), 1.41-1.47 (m, 2H), 1.31-1.34 (m, 4H), 0.88 (t, J 7.2 Hz, 3H). HRMS (ESI) calcd (M + Na)$^+$ C$_{33}$H$_{33}$NNaO$_5$S$^+$ 578.1972 observed 578.1964. |
| 12 | | 5-Cyclopropyl-4-[(1-naphthyl)methyl]-2-oxo-8-[p-(pentyloxy)phenyl]-7-thia-1-azabicyclo[4.3.0]nona-3,5,8-triene-9-carboxylic acid<br>$^1$H-NMR (600 MHz, (CD$_3$)$_2$SO): δ 7.97 (dd, J 1.2, 8.4 Hz, 1H), 7.87-7.90 (m, 2H), 7.69 (bs, 2H), 7.47-7.53 (m, 3H), 7.35 (d, J 5.4 Hz, 1H), 6.96 (d, J 8.4 Hz, 2H), 5.45 (s, 1H), 4.56 (s, 2H), 3.99 (t, J 6.6 Hz, 2H), 1.89 (bs, 1H), 1.70-1.75 (m, 2H), 1.32-1.43 (m, 4H), 1.04 (bs, 2H), 0.90 (t, J 7.2 Hz, 3H), 0.77 (bs, 2H). HRMS (ESI) calcd (M + Na)$^+$ C$_{33}$H$_{31}$NNaO$_4$S$^+$ 560.1866 observed 560.1861. |
| 13 | | 8-(p-Butoxyphenyl)-5-cyclopropyl-4-[(1-naphthyl)methyl]-2-oxo-7-thia-1-azabicyclo[4.3.0]nona-3,5,8-triene-9-carboxylic acid<br>$^1$H-NMR (400 MHz, (CD$_3$)$_2$SO): δ 7.88-7.98 (m, 3H), 7.49-7.58 (m, 5H), 7.38 (d, J 6.8 Hz 1H), 7.07 (d, J 8.4 Hz, 2H), 5.53 (s, 1H), 4.59 (s, 2H), 4.03 (t, J 6.0 Hz, 2H), 1.92 (bs, 1H), 1.70-1.73 (m, 2H), 1.42-1.47 (m, 2H), 1.03- |

| Example Number | Chemical structure. | Chemical name NMR and HRMS |
|---|---|---|
| | | 1.05 (m, 2H), 0.94 (t, J 7.2 Hz, 3H), 0.82 (bs, 2H). HRMS (ESI) calcd (M + Na)+ $C_{32}H_{29}NNaO_4S^+$ 546.1710 observed 546.1703. |
| 14 | 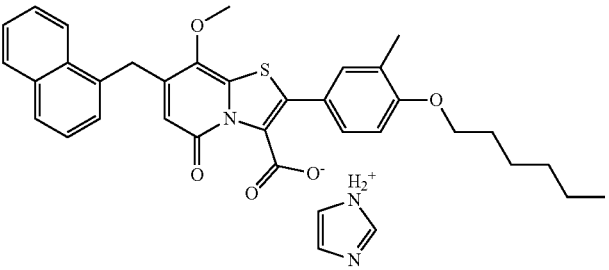 | 8[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid imidazole salt $^1$H-NMR (600 MHz, CD$_3$OD): δ 8.69 (s, 1H), 7.89-7.93 (m, 2H), 7.83 (d, J 7.8 Hz, 1H), 7.57 (d, J 6.0 Hz, 2H), 7.44-7.48 (m,6H), 6.95 (d, J 9.0 Hz, 1H), 5.76 (s, 1H), 4.48 (s, |
| | | 2H), 4.03 (t, J 6.6 Hz, 2H), 3.92 (s, 3H), 2.24 (s, 3H), 1.80-1.85 (m, 2H), 1.52-1.54 (m, 2H), 1.38-1.39 (m, 4H), 0.95 (t, J 7.2 Hz, 3H). $^{11}$H-NMR (151 MHz, CD$_3$OD): δ 167.44, 159.98, 159.81, 148.50, 141.50, 137.43, 135.69, 135.63, 133.38, 133.16, 131.54, 129.95, 129.09, 128.98, 128.63, 128.56, 127.44, 126.98, 126.73, 125.74, 125.15, 122.71, 120.81, 112.36, 110.53, 69.33, 61.12, 33.57, 32.88, 30.45, 27.08, 23.83, 16.49, 14.51. |
| 15 | 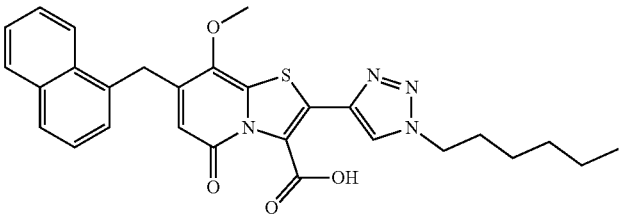 [SMILES: CCCCCCn1cc(-c2sc3c(OC)c(Cc4cccc5ccccc45)cc(=O)n3c2C(=O)O)nn1] | 8-(1-Hexyl-1H-1,2,3-triazol-4-yl)-5-methoxy-4-[(1-naphthyl)methyl]-2-oxo-7-thia-1-azabicyclo[4.3.0]nona-3,5,8-triene-9-carboxylic acid $^1$H-NMR (400 MHz, (CD$_3$)$_2$SO): δ 8.39 (s, 1H), 7.96-7.99 (m, 2H), 7.89 (d, J 8.0 Hz, 1H), 7.46-7.57 (m, 4H), 5.62 (s, 1H), 4.45-4.49 |
| | | (m, 4H), 3.87 (s, 3H) 1.81-1.84 (m, 2H), 1.26 (bs, 6H), 0.84 (t, J 6.4 Hz, 3H). HRMS (ESI) calcd (M + Na)+ $C_{28}H_{28}N_4NaO_4S^+$ 539.1723 observed 539.1722 |
| 16 | 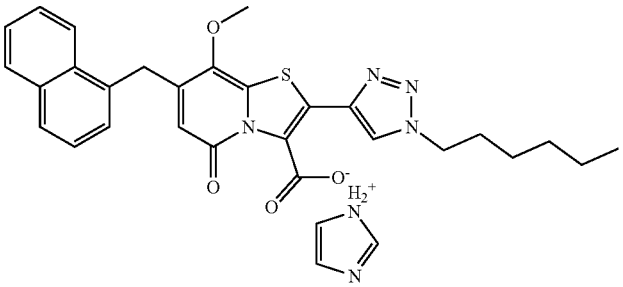 | 8-(1-Hexyl-1H-1,2,3-triazol-4-yl)-5-methoxy-4-[(1-naphthyl)methyl]-2-oxo-7-thia-1-azabicyclo[4.3.0]nona-3,5,8-triene-9-carboxylic acid imidazole salt, $^1$H-NMR (400 MHz, (CD$_3$)$_2$SO): δ 8.50 (bs, 1H), 8.32 (s, 1H), 7.86-7.93 (m, 2H), 7.82 (dd, J 1.6, 9.2 Hz, 1H), 7.42-7.49 (m, 4H), 7.40 (bs, 2H), 5.74 (s, 1H), 4.43-4.48 (m, 4H), 3.92 (s, 3H) |
| | | 1.91-1.94 (m, 2H), 1.32-133 (m, 6H), 0.90 (t, J 6.8 Hz, 3H) |

TABLE 1-continued

| Example Number | Chemical structure. | Chemical name NMR and HRMS |
|---|---|---|
| 17 | | 5-Methoxy-8-[4-(2-methoxyethoxy)-3-methyl-phenyl]-4-[(1-naphthyl)methyl]-2-oxo-7-thia-1-azabicyclo[4.3.0]nona-3,5,8-triene-9-carboxylic acid, $^1$H-NMR (600 MHz, (CD$_3$)$_2$SO): δ 7.95-7.98 (m, 2H), 7.89 (d, J 7.8 Hz, 1H), 7.40-7.56 (m, 3H), 7.42-7.47 (m, 3H), 7.95 (d, J 8.4 Hz, 1H), 5.61 (s, 1H), 4.45 (s, 2H), 4.17 (t, J 4.2 Hz, 2H), 3.85 (s, 3H), 3.70 (t, J 4.2 Hz, 2H), 3.34 (s, 3H), 2.19(s, 3H). HRMS (ESI) calcd (M + Na)$^+$ C$_{30}$H$_{27}$NNaO$_6$S$^+$ 552.1451 observed 552.1442 |
| 18 | | 5-Cyclopropyl-8-[4-(2-methoxyethoxy)-3-methyl-phenyl]-4-[(1-naphthyl)methyl]-2-oxo-7-thia-1-azabicyclo[4.3.0]nona-3,5,8-triene-9-carboxylic acid, $^1$H-NMR (400 MHz, (CD$_3$)$_2$SO): δ 7.97-7.99 (m, 1H), 7.88-7.92 (m, 2H), 7.43-7.56 (m, 5H), 7.38 (d, J 6.8 Hz, 1H), 7.90 (d, J 8.4 Hz, 1H), 5.52 (s, 1H), 4.59 (s, 2H), 4.17 (t, J 4.8 Hz, 2H), 3.70 (t, J 4.8 Hz, 2H), 3.33 (s, 3H), 2.20 (s, 3H), 1.88-1.95 (m, 1H), 1.02-1.06 (m, 2H), 0.80-0.84 (m, 2H). HRMS (ESI) calcd (M + H)$^+$ C$_{32}$H$_{30}$NO$_5$S$^+$ 540.1839 observed 540.1824 |
| 19 | | 5-Cyclopropyl-8-(4-hydroxytolyl)-4-[(1-naphthyl)methyl]-2-oxo-7-thia-1-azabicyclo[4.3.0]nona-3,5,8-triene-9-carboxylic acid |
| 20 | | 8-(4-Butoxy-3-methyl-phenyl)-5-cyclopropyl-2-oxo-4-{[m-(trifluoromethyl)phenyl]methyl}-7-thia-1-azabicyclo[4.3.0]nona-3,5,8-triene-9-carboxylic acid, $^1$H-NMR (400 MHz, (CD$_3$)$_2$SO): δ 7.50-7.61 (m, 6H), 6.95 (d, J 8.8 Hz, 1H), 5.88 (s, 1H), 4.20 (s, 2H), 4.00 (t, J 6.4 Hz, 2H), 2.15 (s, 3H), 1.69-1.76 (m, 2H), 1.56-1.58 (m, 1H), 1.44-1.51 (m, 2H), 0.99-1.01 (m, 2H), 0.95 (t, 7.2 Hz, 3H), 0.66 (bs, 2H). HRMS (ESI) calcd (M + Na)$^+$ C$_{30}$H$_{28}$F$_3$NNaO$_4$S$^+$ 578.1583 observed 578.1579 |

TABLE 1-continued

| Example Number | Chemical structure. | Chemical name NMR and HRMS |
|---|---|---|
| 21 | | 8-[4-(Allyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, $^1$H-NMR (400 MHz, CDCl$_3$): δ = 7.96 (sext, J = 4.44 Hz, 2H), 7.88 (d, J = 8.07 Hz, 1H), 7.56-7.42 (m, 6H), 7.06 (d, J = 8.59 Hz, 1H), 6.07 (tdd, J = 4.94, 10.57, 17.32 Hz, 1H), |
| | | 5.59 (s, 1H), 5.43 (qd, J = 1.75, 17.36 Hz, 1H), 5.28 (qd, J = 1.7, 10.61 Hz, 1H), 4.64 (td, J = 1.68, 5.02 Hz, 2H), 4.44 (s, 2H), 3.84 (s, 3H), 2.21 (s, 3H) |
| 22 | | 8-[4-(5-Hexynyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, $^1$H-NMR (400 MHz, CDCl$_3$): δ = 7.98-7.91 (m, 2H), 7.88 (d, J = 7.40 Hz, 1H), 7.58-7.42 (m, 6H), 6.99 (dd, J = 1.48, 8.70 Hz, 1H), 5.51 (s, 1H), 4.42 (s, 2H), 4.04 (t, J = 6.62 Hz, 2H), |
| | | 3.83 (s, 3H), 2.79 (t, J = 2.6 Hz, 1H), 2.25 (dt, J = 2.77, 6.99 Hz, 2H), 2.17 (s, 3H), 1.84 (quint, J = 7.22 Hz, 2H), 1.63 (quint, J = 7.15 Hz, 2H) ppm |
| 23 | | 8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, $^1$H-NMR (400 MHz, CDCl$_3$): = 7.96 (quint t, J = 2.39, 6.89 Hz, 2H), 7.88 (d, J = 7.64 Hz, 1H), 7.56-7.40 (m, 6H), 7.88 (d, J = 7.64 Hz, 1H), 5.58 (s, |
| | | 1H), 4.44 (s, 2H), 4.01 (t, J = 6.19 Hz, 2H), 3.84 (s, 3H), 2.18 (s, 3H), 1.79-1.70 (m, 2H), 1.66-1.53 (m, 1H), 1.33 (dqt, J = 2.3, 6.51,8.81 Hz, 2H), 0.91 (s, 3H), 0.89 (s, 3H) ppm. $^{13}$C NMR (100 MHz, CDCl$_3$): δ = 161.37, 158.09, 156.54, 146.98, 138.16, 134.63, 134.21, 133.49, 131.39, 130.02, 128.66, 127.63, 127.45, 127.11, 126.80, 126.41, 125.86, 125.69, 123.87, 111.73, 109.16, 68.05, 60.30, 34.77, 31.96, 27.20, 26.52, 22.49, 15.93 ppm |
| 24 | | 5-Methoxy-8-[4-(4-methyl-3-pentenyloxy)-3-methyl-phenyl]-4-[(1-naphthyl)methyl]-2-oxo-7-thia-1-azabicyclo[4.3.0]nona-3,5,8-triene-9-carboxylic acid, $^1$H-NMR (400 MHz, CDCl$_3$): δ = 7.96 (sext, J = Hz, 2H), 7.88 (d, J = 7.86 Hz, 1H), |

TABLE 1-continued

| Example Number | Chemical structure. | Chemical name NMR and HRMS |
|---|---|---|
| | | 7.56-7.40 (m, 6H), 7.05 (d, J = 8.49 Hz, 1H), 5.59 (s, 1H), 5.22 (tt, J = 1.79, 7.14 Hz, 1H), 4.44 (s, 2H), 5.22 (tt, J = 1.79, 7.14 Hz, 2H), 3.84 (s, 3H), 2.44 (dq, J = 1.94, 7.29 Hz, 2H), 2.17 (s, 3H), 1.69 (s, 3H), 1.63 (s, 3H) ppm. $^{13}$C NMR (100 MHZ, CDCl$_3$): δ = 161.36, 157.98, 156.52, 147.06. 138.11, 134.18, 133.48, 133.40, 131.38, 130.04, 128.65, 127.63, 127.45, 127.10, 126.87, 126.40, 125.86, 125.68, 123.86, 120.10, 111.82, 109.16, 67.58, 60.31, 31.97, 27.74, 25.58, 17.72, 15.93 ppm. |
| 25 | | 8-[4-(5-Hexenyloxy)-3-methyl-phenyl]-5-methoxy-4-[(1-naphthyl)methyl]-2-oxo-7-thia-1-azabicyclo[4.3.0]nona-3,5,8-triene-9-carboxylic acid |
| 26 | | 8-[4-(Cyclopropylmethoxy)-3-methyl-phenyl]-5-methoxy-4-[(1-naphthyl)methyl]-2-oxo-7-thia-1-azabicyclo[4.3.0]nona-3,5,8-triene-9-carboxylic acid |
| 27 | | 5-Amino-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid, $^1$H NMR (600 MHz, SO(CD$_3$)$_2$) δ 8.01-7.92 (m, 1H), 7.91-7.82 (m, 2H), 7.55-7.36 (m, 6H), 7.02 (d, J = 8.9 Hz, 1H), 5.36 (s, 1H), 4.40 (s, 2H), 4.01 (t, J = 6.4 Hz, 2H), 2.17 (s, 3H), 1.79-1.68 (m, 2H), 1.52-1.39 (m, 2H), 1.38-1.25 (m, 4H), 0.94-0.81 (m, 3H); $^{13}$C NMR (150 MHz, SO(CD$_3$)$_2$) δ 165.3, 165.2, 162.6, 133.9, 133.0, 131.1, 129.3, 128.1, 127.0, 126.8, 126.3, 125.9, 125.7, 125.3, 125.2, 123.7, 111.1, 108.9, 67.2, 33.1, 30.4, 28.1, 24.7, 21.5, 15.5, 13.4. |

TABLE 1-continued

| Example Number | Chemical structure. | Chemical name NMR and HRMS |
|---|---|---|
| 28 | | 8-Benzyl-5-cyclopropyl-4-[(1-naphthyl)methyl]-2-oxo-7-thia-1-azabicyclo[4.3.0]nona-3,5,8-triene-9-carboxylic acid |
| 29 | | 5-Cyclopropyl-4-[(1-naphthyl)methyl]-2-oxo-8-phenyl-7-thia-1-azabicyclo[4.3.0]nona-3,5,8-triene-9-carboxylic acid |
| 30 | | 5-Cyclopropyl-4-[(1-naphthyl)methyl]-2-oxo-8-(m-tolyl)-7-thia-1-azabicyclo[4.3.0]nona-3,5,8-triene-9-carboxylic acid |
| 31 | | 5-Cyclopropyl-4-[(1-naphthyl)methyl]-2-oxo-8-(p-tolyl)-7-thia-1-azabicyclo[4.3.0]nona-3,5,8-triene-9-carboxylic acid |
| 32 | | 5-Cyclopropyl-8-(1H-indol-5-yl)-4-[(1-naphthyl)methyl]-2-oxo-7-thia-1-azabicyclo[4.3.0]nona-3,5,8-triene-9-carboxylic acid |
| 33 | | 5-Cyclopropyl-8-(1,4-dioxa-2,3-dihydronaphth-6-yl)-4-[(1-naphthyl)methyl]-2-oxo-7-thia-1-azabicyclo[4.3.0]nona-3,5,8-triene-9-carboxylic acid |

TABLE 1-continued

| Example Number | Chemical structure. | Chemical name NMR and HRMS |
|---|---|---|
| 34 | | 5-Cyclopropyl-4-[(1-naphthyl)methyl]-2-oxo-8-(3-thienyl)-7-thia-1-azabicyclo[4.3.0]nona-3,5,8-triene-9-carboxylic acid, |
| 35 | | 5-Cyclopropyl-8-(2-furyl)-4-[(1-naphthyl)methyl]-2-oxo-7-thia-1-azabicyclo[4.3.0]nona-3,5,8-triene-9-carboxylic acid |
| 36 | | 5-Cyclopropyl-8-(3-furyl)-4-[(1-naphthyl)methyl]-2-oxo-7-thia-1-azabicyclo[4.3.0]nona-3,5,8-triene-9-carboxylic acid |
| 37 | | 6-[(9-Anthryl)methyl]-4-oxo-7-[m-(trifluoromethyl)phenyl]-1-thia-3a-aza-3-indancarboxylic acid |
| 38 | | 6-[(1-Naphthyl)methyl]-4-oxo-7-[m-(trifluoromethyl)phenyl]-1-thia-3a-aza-3-indancarboxylic acid |

TABLE 1-continued

| Example Number | Chemical structure. | Chemical name NMR and HRMS |
|---|---|---|
| 39 | | 6-[(1-Naphtyloxy)methyl]-4-oxo-2-phenyl-7-(1,3-Dioxa-5-indanyl)-1-thia-3a-aza-3-indancarboxylic acid |
| 40 | | (R)-7-(naphthalen-1-ylmethy)-5-oxo-2,3-dihydro-thiazolo[3,2-a]pyridine-3,8-dicarboxylic acid<br>$^1$H NMR (400 MHz, SO(CD$_3$)$_2$) δ 13.38 (brs, 1H), 13.26 (brs, 1H), 7.99-7.90 (m, 2H), 7.85 (d, J = 7.9 Hz, 1H), 7.56-7.51 (m, 2H), 7.47 (dd, J = 8.4, 7.0 Hz, 1H), 7.25 (dd, J = 7.2, 1.4 Hz, 1H), 5.50 (s, 1H), 5.45 (dd, J= 9.7, 1.8 Hz, 1H), 4.70 (d, J = 17.5 Hz, 1H), 4.60 (d, J = 17.5 Hz, 1H), 3.72 (dd, J = 12.0, 9.8 Hz, 1H), 3.42 (dd, J = 12.0, 1.8 Hz, 1H); $^{13}$C NMR (100 MHz, SO(CD$_3$)$_2$) δ 169.5, 166.7, 159.6, 159.0, 154.2, 135.1, 133.4, 131.5, 128.6, 127.7, 126.7, 126.3, 125.8, 125.7, 123.8, 114.9, 105.1, 62.5, 36.8, 30.7. |
| 41 | | 8-(dimethylamino)-2-(3-methyl-4-(pentyloxy)phenyl)-7-(naphthalen-1-ylmethyl)-5-oxo-thiazolo[3,2-a]pyridine-3-carboxylic acid<br>$^1$H NMR (400 MHz, CDCl$_3$) δ 8.77 (brs, 1H), 7.93-7.87 (m, 1H), 7.84-7.74 (m, 2H), 7.53-7.46 (m, 2H), 7.46-7.41 (m, 1H), 7.34 (dd, J = 8.4, 2.4 Hz, 1H), 7.31-7.27 (m, 2H), 6.83 (d, J = 8.6 Hz, 1H), 6.03 (s, 1H), 4.46 (s, 2H), 3.99 (t, J = 6.4 Hz, 2H), 2.92 (s, 6H), 2.23 (s, 3H), 1.88-1.75 (m, 2H), 1.52-1.35 (m,4H), 0.95 (t, J = 7.1 Hz, 3H); $^{13}$C NMR (100 MHz, CDCl$_3$) δ 159.9, 159.2, 158.8, 152.6, 148.2, 142.7, 134.1, 133.2, 131.8, 131.2, 129.1, 128.2, 128.1, 128.1, 127.9, 127.6, 127.3, 126.5, 125.9, 125.6, 123.5, 121.8, 111.8, 110.7, 68.1,42.5 (2C), 34.8, 29.0, 28.3, 22.5, 16.3, 14.1. |

TABLE 1-continued

| Example Number | Chemical structure. | Chemical name NMR and HRMS |
|---|---|---|
| 42 | | 8-(dimethylamino)-2-(4-(hexyloxy)-3-methylphenyl)-7-(naphthalen-1-ylmethyl)-5-oxo-thiazolo[3,2-a]pyridine-3-carboxylic acid<br>$^1$H NMR (400 MHz, CDCl$_3$) δ 8.77 (brs, 1H), 7.94-7.86 (m, 1H), 7.86-7.74 (m, 2H), 7.54-7.46 (m, 2H), 7.46-7.40 (m, 1H), 7.34 (dd, J = 8.4, 2.4 Hz, 1H), 7.31-7.27 (m, 2H), 6.83 (d, J = 8.6 Hz, 1H), 6.03 (s, 1H), 4.46 (s, 2H), 3.99 (t, J = 6.4 Hz, 2H), 2.92 (s, 6H), 2.23 (s, 3H), 1.88-1.75 (m, 2H), 1.56-1.43 (m, 2H), 1.41-1.30 (m, 4H), 0.93 (t, J = 7.1 Hz, 3H); $^{13}$C NMR (100 MHz, CDCl$_3$) δ 160.0, 159.3, 158.9, 152.7, 148.3, 142.7, 134.2, 133.3, 131.9, 131.3, 129.2, 128.2, 128.2, 128.2, 128.0, 127.7, 127.4, 126.6, 126.0, 125.7, 123.6, 121.9, 111.9, 110.8, 68.2, 42.6 (2C), 34.9, 31.7, 29.3, 25.9, 22.8, 16.4, 14.2. |
| 43 | | 8-(dimethylamino)-2-(4-(heptyloxy)-3-methylphenyl)-7-(naphthalen-1-ylmethyl)-5-oxo-thiazolo[3,2-a]pyridine-3-carboxylic acid<br>$^1$H NMR (400 MHz, CDCl$_3$) δ 9.30 (brs, 1H), 7.94-7.86 (m, 1H), 7.86-7.74 (m, 2H), 7.54-7.46 (m, 2H), 7.46-7.40 (m, 1H), 7.35 (dd, J = 8.4, 2.4 Hz, 1H), 7.32-7.27 (m, 2H), 6.82 (d, J = 8.6 Hz, 1H), 6.02 (s, 1H), 4.45 (s, 2H), 3.98 (t, J = 6.4 Hz, 2H), 2.92 (s, 6H), 2.23 (s, 3H), 1.87-1.75 (m, 2H), 1.55-1.43 (m, 2H), 1.43-1.24 (m, 6H), 0.91 (t, J = 7.1 Hz, 3H); $^{13}$C NMR (100 MHz, CDCl$_3$) δ 159.9, 159.5, 158.9, 152.7, 148.1, 141.9, 134.2, 133.4, 131.9, 131.3, 129.1, 128.2, 128.2, 128.1, 128.0, 127.6, 127.4, 126.6, 126.0, 125.7, 123.7, 121.8, 111.9, 110.8, 68.2, 42.6 (2C), 34.9, 31.9, 29.4, 29.2, 26.2, 22.8, 16.4, 14.3. |
| 44 | | 8-(dimethylamino)-2-(3-methyl-4-((4-methylpentyl)oxy)phenyl)-7-(naphthalen-1-ylmethyl)-5-oxo-thiazolo[3,2-a]pyridine-3-carboxylic acid<br>$^1$H NMR (400 MHz, CDCl$_3$) δ 13.45 (brs, 1H), 7.92-7.86 (m, 1H), 7.84-7.76 (m, 2H), 7.53-7.45 (m, 2H), 7.45-7.40 (m, 1H), 7.36 (dd, J = 8.4, 2.4 Hz, 1H), 7.33-7.26 (m, 2H), 6.81 (d, J = 8.6 Hz, 1H), 6.02 (s, 1H), 4.45 (S, 2H), 3.97 (t, J = 6.4 Hz, 2H), 2.90 (s, 6H), 2.23 (s, 3H), 1.87-1.76 (m, 2H), 1.71-1.57 (m, 1H), 1.41-1.33 |

TABLE 1-continued

| Example Number | Chemical structure. | Chemical name NMR and HRMS |
|---|---|---|
| | | (m,2H), 0.95 (d, J = 6.6 Hz, 6H); $^{13}$C NMR (100 MHz, CDCl$_3$) δ 159.7, 159.6, 158.9, 152.6, 147.9, 140.4, 134.1, 133.5, 131.9, 131.2, 129.1, 128.1, 128.1, 128.0, 127.9, 127.4, 127.4, 126.5, 126.0, 125.6, 123.7, 121.6, 111.8, 110.9, 68.5, 42.6 (2C), 35.4, 34.8, 27.9, 27.2, 22.7 (2C), 16.4 |
| 45 | | 8-amino-2-(3-methyl-4-(pentyloxy)phenyl)-7-(naphthalen-1-ylmethyl)-5-oxo-thiazolo[3,2-a]pyridine-3-carboxylic acid<br>$^1$H NMR (600 MHz, SO(CD$_3$)$_2$) δ 8.00-7.94 (m, 1H), 7.89 (d, J = 8.4 Hz, 1H), 7.88-7.83 (m, 1H), 7.57-7.47 (m, 3H), 7.44-7.39 (m, 2H), 7.39-7.35 (m, 1H), 7.06 (d, J = 8.6 Hz, 1H), 5.40 (s, 1H), 4.41 (s, 2H), 4.03 (t, J = 6.4 Hz, 2H), 2.18 (s, 3H), 1.78-1.71 (m, 2H), 1.46-1.39 (m, 2H), 1.39-1.31 (m, 2H), 0.90 (d, J = 7.2 Hz, 3H); $^{13}$C NMR (150 MHz, SO(CD$_3$)$_2$) δ 161.6, 157.9, 155.9, 144.7, 134.2, 133.5, 131.5, 131.2, 129.9, 128.6, 127.6, 127.4, 127.1, 126.8, 126.3, 126.2, 126.1, 125.8, 125.8, 124.2, 121.2, 120.4, 111.7, 109.5, 67.7, 33.7, 28.3, 27.8, 21.8, 16.0, 13.9. |
| 46 | | 8-amino-2-(4-(hexyloxy)-3-methylphenyl)-7-(naphthalen-1-ylmethyl)-5-oxo-thiazolo[3,2-a]pyridine-3-carboxylic acid<br>$^1$H NMR (600 MHz, SO(CD$_3$)$_2$) δ 8.02-7.93 (m, 1H), 7.89 (d, J = 8.4 Hz, 1H), 7.88-7.83 (m, 1H), 7.56-7.47 (m, 3H), 7.45-7.39 (m, 2H), 7.39-7.35 (m, 1H), 7.06 (d, J = 8.6 Hz, 1H), 5.40 (s, 1H), 4.41 (s, 2H), 4.03 (t, J = 6.4 Hz, 2H), 2.18 (s, 3H), 1.78-1.69 (m, 2H), 1.49-1.39 (m, 2H), 1.37-1.26 (m, 4H), 0.88 (d, J = 7.2 Hz, 3H); $^{13}$C NMR (150 MHz, SO(CD$_3$)$_2$) δ 161.6, 157.9, 155.9, 144.7, 134.2, 133.5, 131.5, 131.2, 129.9, 128.6, 127.6, 127.4, 127.1, 126.8, 126.3, 126.2, 126.0, 125.8, 125.8, 124.2, 121.2, 120.4, 111.7, 109.5, 67.7, 33.7, 30.9, 28.6, 25.2, 22.1, 16.0, 13.9. |

TABLE 1-continued

| Example Number | Chemical structure. | Chemical name NMR and HRMS |
|---|---|---|
| 47 | | 8-amino-2-(4-(heptyloxy)-3-methylphenyl)-7-(naphthalen-1-ylmethyl)-5-oxo-thiazolo[3,2-a]pyridine-3-carboxylic acid<br>$^1$H NMR (600 MHz, SO(CD$_3$)$_2$) δ 8.03-7.94 (m, 1H), 7.89 (d, J = 8.4 Hz, 1H), 7.88-7.83 (m, 1H), 7.56-7.47 (m, 3H), 7.45-7.39 (m, 2H), 7.39-7.35 (m, 1H), 7.06 (d, J = 8.6 Hz, 1H),<br><br>5.40 (s, 1H), 4.41 (s, 2H), 4.03 (t, J = 6.4 Hz, 2H), 2.18 (s, 3H), 1.79-1.68 (m, 2H), 1.49-1.38 (m, 2H), 1.38-1.18 (m, 6H), 0.87 (d, J = 7.2 Hz, 3H); $^{13}$C NMR (150 MHz, SO(CD$_3$)$_2$) δ 161.6, 158.0, 155.9, 144.7, 134.2, 133.5, 131.5, 131.2, 129.9, 128.6, 127.6, 127.4, 127.1, 126.8, 126.3, 126.2, 126.1, 125.8, 125.8, 124.2, 121.2, 120.4, 111.7, 109.5, 67.8, 33.7, 31.3, 28.6, 28.4, 25.5, 22.1, 16.0, 14.0.0 |
| 48 | | 7-(anthracen-9-ylmethyl)-8-methoxy-5-oxo-2,3-dihydro-thiazolo[3,2-a]pyridine-3-carboxylic acid<br>$^1$H-NMR (400 MHz, SO(CD$_3$)$_2$): δ 13.4 (bs 1H), 8.65 (s, 1H), 8.15-8.17 (m, 4H), 7.53-7.65 (m, 4H), 5.29 (dd, J = 1.6, 8.8 Hz, 1H), 4.81-4.93 (m, 2H), 4.78 (s, 1H), 3.98 (s, 3H), 3.91 (dd, J =<br><br>8.9, 11.9 Hz, 1H), 3.61 (dd, J = 1.6, 11.9 Hz, 1H); $^{13}$C-NMR (100 MHz, SO(CD$_3$)$_2$): δ 169.2, 158.7, 151.1, 139.8, 135.2, 131.0, 129.9, 129.4, 129.1, 126.8, 126.5, 125.2, 124.2, 112.3, 62.7, 60.6, 32.0, 26.5. |
| 49 | | 7-(anthracen-9-ylmethyl)-8-methoxy-2-(3-methyl-4-(pentyloxy)phenyl)-5-oxo-thiazolo[3,2-a]pyridine-3-carboxylic acid<br>$^1$H-NMR (600 MHz, SO(CD$_3$)$_2$): δ 13.7 (bs, 1H), 8.66 (s, 1H), 8.16-8.21 (m, 4H), 7.54-7.59 (m, 4H), 7.42-7.45 (m, 2H), 7.05 (d, J = 8.4<br><br>Hz, 1H), 5.01 (s, 2H), 4.97 (s, 1H), 4.07 (s, 3H), 4.03 (t, J = 6.2 Hz, 2H), 2.18 (s, 3H), 1.73-1.77 (m, 2H), 1.34-1.45 (m, 4H), 0.90 (t, J = 7.1 Hz, 3H); $^{13}$C-NMR (150 MHz, SO(CD$_3$)$_2$) δ 161.2, 158.1, 156.3, 138.0, 134.5, 131.1, 130.0, 129.5, 129.1, 127.1, 126.9, 126.8, 126.5, 125.2, 124.2, 111.7, 108.0, 67.7, 60.5, 28.2, 27.7, 26.5, 21.8, 15.8, 13.9. |

TABLE 1-continued

| Example Number | Chemical structure. | Chemical name NMR and HRMS |
|---|---|---|
| 50 | (structure) | 1H-imidazol-1-ium 8-methoxy-2-(3-methyl-4((4-methylpentyl)oxy)phenyl)-7-(naphtalen-1-ylmethyl)-5-oxo-thiazolo[3,2-a]pyridine-3-carboxylate $^1$H NMR (600 MHz, SO(CD$_3$)$_2$) δ 7.99-7.901 (m, 3H), 7.88 (d, J = 8.1 Hz, 1H), 7.56-7.41 (m, 6H), 7.14 (s, 2H), 7.02 (d, J = 8.5 Hz, 1H), 5.58 (s, 1H), 4.43 (s, 2H), 4.00 (t, J = 6.4 Hz, 2H), 3.83 (s, 3H), 2.17 (s, 3H), 1.78-1.70 (m, 2H), 1.63-1.55 (m, 1H), 1.36-1.29 (m, 2H), 0.89 (d, J = 6.6 Hz, 6H); $^{13}$C NMR (150 MHz, SO(CD$_3$)$_2$) δ 161.6, 157.9, 156.6, 146.8, 138.3, 135.0, 134.6, 134.2, 133.5, 131.4, 130.0, 128.7, 128.3, 127.6, 127.4, 127.1, 126.7, 126.4, 125.8, 125.7, 124.7, 123.9, 121.2, 120.2, 111.7, 109.1, 68.0, 60.3, 34.8, 32.0, 27.2, 26.5, 22.5 (2C), 15.9. |

Examples 28-36 are described in J. Med Chem (2010), 53 (15), 5690-5695, example 37 and 39 are described in Bioorg. Med Chem (2012), 20 (9), 3128-3142, example 38 is described in Chem&Biol (2013), 20, (10), 1245-1254.

Biology

Minimum Inhibitory Concentration (MIC) and Minimum Bactericidal Concentration (MBC) Assays To define the MIC, bacterial cultures at starting OD=0.001 at OD$_{600}$ were incubated in the presence of different increasing concentrations of each compound of Examples 1-39 as described herein, or a combination of each compound of Examples 1-39 as described herein with an antibiotic overnight (18 hrs). MIC was defined by the lowest concentration of the test compound that inhibits visible growth of pathogen of interest. The optical density of the pathogen of interest culture was measured by OD$_{600}$.

The MBC was defined by the lowest concentration of each compound of Examples 1-39, or a combination of each compound of Example 1-36 with an antibiotic that results in pathogen of interest death from the same cultures as MIC assay. MBC was determined colony forming units (CFUs) enumeration by serially diluting and plating bacterial cultures on BHI plates.

MIC and MBC data for each compound of examples 1-39 is provided in Table 2. The values provided in Table 2 result from the use of the compounds of Examples 1-39 alone. Thus, no antibiotic was used in Table 2.

TABLE 2

| | Pathogen | | | | | | |
|---|---|---|---|---|---|---|---|
| Example | MRSA MIC/MBC uM | Staph. aureus MIC/MBC uM | E. faecalis MIC/MBC uM | Strep. pyogenes MIC/MBC uM | Staph. saphyticus MIC/MBC uM | C. diff MIC/MBC uM | Streptococcus MIC/MBC uM |
| 1 | 20/25 | | 67/25 | | | | nd/9 |
| 2 | 27/50+ | | 250/nd | | | | nd/5 |
| 3 | 167/nd | | 183/100 | | | | nd/50 |
| 4 | 200/nd | | 250/nd | | | | nd/9 |
| 5 | 150/nd | | 250/nd | | | | nd/10 |
| 6 | 69/37 | | 200/100 | | | | nd/23 |
| 7 | 25/32 | | 95/19 | | | | nd/7 |
| 8 | 12/13 | | 25/12.5 | | | | nd/7 |
| 9 | 17/37 | | 39/12.5 | | | | nd/8 |
| 10 | 17/17 | | 188/50 | | | | nd/5 |
| 11 | 10/6 | | 49/50 | | | | nd/2.5 |
| 12 | 70/25 | | 300/nd | | | | nd/2 |
| 13 | 31/25 | | 300/nd | | | | nd/3 |
| 14 | 3/nd | | 6/nd | | | | |
| 15 | 100/nd | | | | | | |
| 16 | 200/nd | | | | | | |
| 17 | >25/nd | | | | | | |
| 18 | >25/nd | | | | | | |
| 20 | 10/nd | | | | | | |
| 21 | 19/nd | | >100/nd | | | | |

TABLE 2-continued

| Example | MRSA MIC/MBC uM | Staph. aureus MIC/MBC uM | E. faecalis MIC/MBC uM | Strep. pyogenes MIC/MBC uM | Staph. saphyticus MIC/MBC uM | C. diff MIC/MBC uM | Streptococcus MIC/MBC uM |
|---|---|---|---|---|---|---|---|
| 22 | 6/nd | | >100/nd | | | | |
| 23 | 45/nd | | >100/nd | | | | |
| 24 | 45/nd | | >100/nd | | | | |
| 25 | 45/nd | | >100/nd | | | | |
| 26 | 12/nd | | >100/nd | | | | |
| 27 | 25/nd | | | | | | |
| 28 | 25/50 | 25/50 | 25/100 | 12.5/25 | 100/25 | 50/50 | |
| 29 | 250/200 | 100/200 | | 25/25 | | | |
| 30 | 25/50 | 50/50 | 50/100 | 25/12.5 | 100/12.5 | 50/50 | nd/19 |
| 31 | 50/100 | 50/100 | | nd/50 | | | |
| 32 | 200/>400 | | nd/>400 | nd/50 | | | |
| 33 | | nd/400 | >400/nd | nd/20 | | | |
| 34 | nd/250 | nd/400 | | nd/25 | | | |
| 35 | | | | nd/50 | | | |
| 36 | | | | nd/25 | | | |
| 37 | 25/25 | 50/50 | 100/400 | 12.5/12.5 | >500/25 | 50/50 | |
| 38 | 200/250 | 200/250 | 200/250 | 50/50 | 250/50 | 200/200 | |
| 39 | 50/50 | 50/200 | 400/900 | 12.5/25 | >500/25 | 100/100 | |

Method for Determining the Effect of Each Compound of Examples 8, 9 and 11 on MRSA, and Also the Effect on MRSA of a Combination of Oxacillin with Each Compound of Examples 8, 9 and 11 on MRSA The test compound of interest, i.e. the compound of Example 8, 9 or 11, was added to the bacterial inoculum MRSA (190 µl) with an OD 1, 0.1 or 0.001. The mixture (200 µL) was incubated at 37° C. for 18 h. A control without the test compound was performed in the same way. The results are shown in Table 3a.

The test compound of interest, i.e. the compound of Example 8, 9 or 11, (25 µM, 5 µL in DMSO) was added to the bacterial inoculum MRSA (190 µl) with an OD 1, 0.1 or 0.001 along with Oxacillin (9 µM, 5 µL in water). The mixture (200 µL) was incubated at 37° C. for 18 h. A control without the test compound was performed in the same way. The results are shown in Table 3b.

The effect was determined by CFU counts and is summarized in Tables 3a and 3b, respectively.

Table 3a shows the results obtained for each compound of Examples 8, 9 and 11 described herein compared with a DMSO control.

Table 3b shows the results obtained for the combination of Oxacillin with each of compound of Examples 8, 9 and 11 compared with a DMSO control also containing oxacillin.

TABLE 3a

| MRSA OD | DMSO CFUs/ml | Example 8 25 µM CFUs/ml | Example 9 25 µM CFUs/ml | Example 11 25 µM CFUs/ml |
|---|---|---|---|---|
| 1 | 6.0E+09 | 6.0E+07 | 5.0E+07 | 2.0E+09 |
| 0.1 | 2.0E+09 | 6.0E+06 | 4.4E+06 | 3.3E+06 |
| 0.001 | 3.7E+09 | 4.0E+05 | 8.0E+04 | 5.0E+05 |

TABLE 3b

| | | Oxacillin 9 µM and | | |
|---|---|---|---|---|
| MRSA OD | DMSO CFUs/ml | Example 8 25 µM CFUs/ml | Example 9 25 µM CFUs/ml | Example 11 25 µM CFUs/ml |
| 1 | 2.2E+09 | 1E+06 | 3E+06 | 1.3E+06 |
| 0.1 | 1.6E+10 | 1.7E+04 | 2.6E+04 | 0 |
| 0.001 | 600 | 0 | 0 | 0 |

Table 3a shows that for each OD value use of the compound of Examples 8, Example 9 and Example 11, respectively, resulted in a decrease of the number of CFUs/ml as compared to the DMSO control.

Table 3b shows that for each OD value use of a combination of oxacillin and the compound of Example 8, Example 9 or Example 11 resulted in a larger decrease in the number of CFUs/ml as compared to the control containing DMSO and oxacillin. No CFUs/ml were detected when a combination of oxacillin and the compound of Example 11 was used at OD 0.1. Further, no CFUs/ml were detected at OD 0.001 when oxacillin was used in combination with the compounds of Examples 8, 9 and 11, respectively.

A comparison of the results of Tables 3a and 3b reveals that a larger decrease in the number of detected CFUs/ml was observed for the combination of oxacillin with the compounds of Examples 8, 9 and 11, respectively, as compared to use of each of these compounds alone or use of oxacillin alone.

In this document, E+n stands for 10n. For instance, E+6 means $10^6$.

Method for Determining the Effect of a Combination of Example 11 and Vancomycin on VRE (V583)

Compound of Example 11 (2.5 µM, 5 µL in DMSO) was added to the bacterial inoculum (190 µl) with OD 0.001 along with increasing doses of Vancomycin (in water) at increasing concentrations of the Vancomycin ranging from 1-64 µg/ml. The mixture (200 µL) was incubated at 37° C. for 18 h Controls were performed without bacteria-vehicle (DMSO), Vancomycin vehicle (water) and BHI controls that use those as treatment to the inoculum, to ensure no previous bacterial contamination in the reagents. Bacterial CFU were counted as standard methods using serial dilution plated on BHI plates to determine the effect of each treatment. Additionally, the initial bacterial inoculum was counted to determine whether the treatment had a bacteriostatic or a bacteriocidal effect. Bacterial CFU of each treatment were summarized in Table 4

Table 4 shows the results obtained for a combination of Example 11 with Vancomycin for eradication of a Vancomycin Resistant Enterococcus (VRE) strain V583.

TABLE 4

| Treatment Vancomycin conc. µg/ml | Experiment 1 | | Experiment 2 | |
|---|---|---|---|---|
| | Control avg. CFU | Example 11 2.5 µM avg. CFU | Control avg. CFU | Example 11 2.5 µM avg. CFU |
| 0 (DMSO) | 1.65E+09 | 5.00E+08 | 1.20E+09 | 7.50E+08 |
| 1 | 1.20E+09 | 5.50E+08 | 1.70E+09 | 3.50E+08 |
| 2 | 1.35E+09 | 2.50E+08 | 1.40E+09 | 5.65E+05 |
| 4 | 5.00E+08 | 5.65E+06 | 8.50E+08 | 4.50E+03 |
| 8 | 4.00E+08 | 6.00E+05 | 8.50E+08 | 2.15E+04 |
| 16 | 3.00E+08 | 3.15E+05 | 4.50E+08 | 1.75E+04 |
| 32 | 5.50E+08 | 3.50E+05 | 1.95E+06 | 8.00E+03 |
| 64 | 4.00E+07 | 1.09E+05 | 6.00E+04 | 4.50E+03 |
| Control BHI | 1.35E+09 | | 1.35E+09 | |
| Control H$_2$O | 1.55E+09 | | 1.50E+09 | |
| Initial bacteria Inoculum | 6.50E+05 | | 4.00E+05 | |

It was observed that use of Vancomycin at a concentration below 64 µg/ml had no or no substantial effect on the bacterial growth and nor the use of only the compound of Example 11 at 2.5 µM. However, the combination of Example 11 (2.5 µM) and Vancomycin had a large effect on the number of CFU's from 2 µg/mL of Vancomycin and above.

Figure 7:
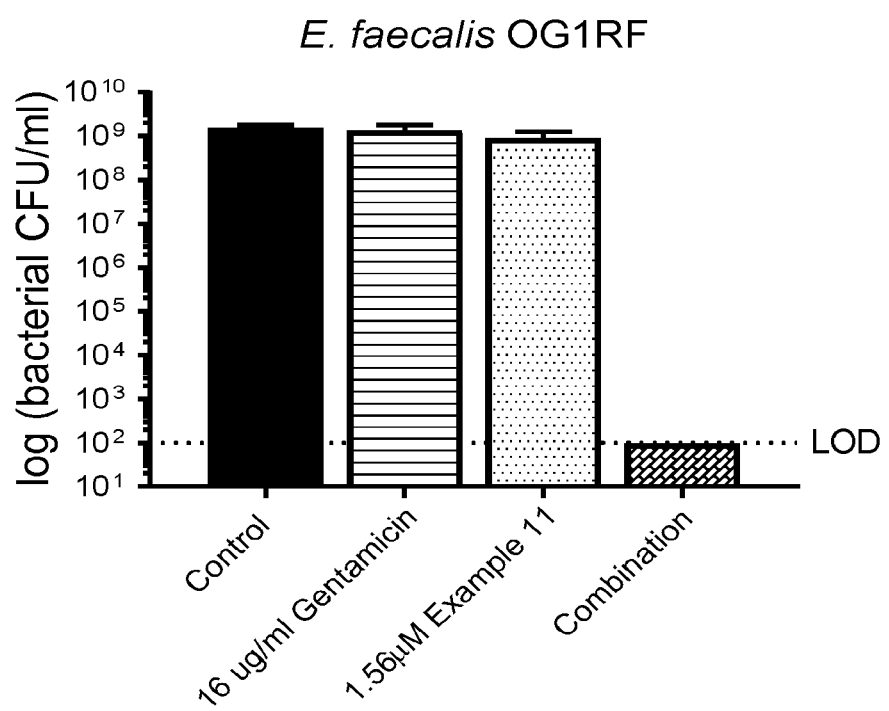
FIG. 7 shows the effect of a combination of gentamicin and the compound of Example 11 described herein on *E. faecalis* OG1RF in vitro.

Effect of a Combination of Gentamicin and the Compound of Example 11 on *E. faecalis* OG1RF In this example, gentamicin was used in combination with the compound of Example 11, i.e. 8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid. FIG. 7 shows that use of Gentamicin alone or the compound of Example 11 alone did not result in a decrease of the number of observed bacterial CFUs/ml. However, use of a combination of Gentamicin and the compound of Example 11 resulted in a large decrease of the number of counted CFUs/ml up to the bacterial limit of detection (LOD). Thus, there is a synergistic effect when Gentamicin and the compound of Example 11 are combined."

Stand Alone Activity In Vivo Against *Enterococcus faecalis* in a Mouse Model of Catheter-Associated Urinary Tract Infection (CAUTI)

Figure 8B:
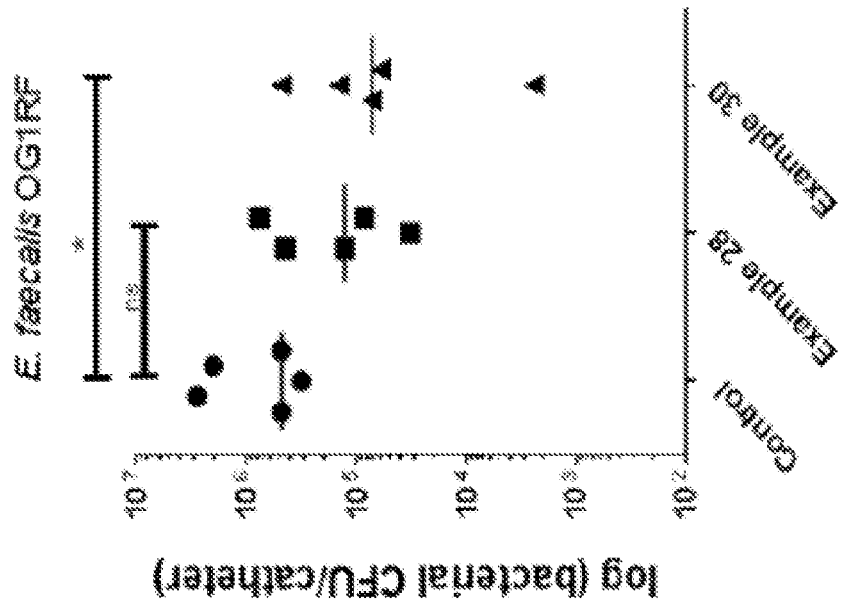
FIG. 8B shows the effect of the compounds of Example 28 and Example 30 against *E. faecalis* OG1RF catheter colonization in a mouse model of CAUTI.
Figure 8A:
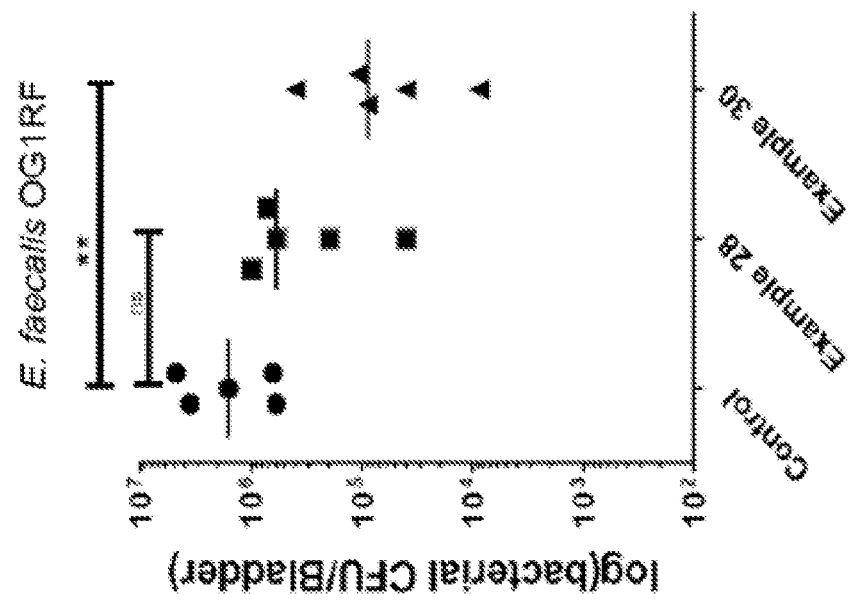
FIG. 8A shows the effect of the compounds of Example 28 and Example 30 against *E. faecalis* OG1RF bladder colonization in a mouse model of catheter-associated urinary tract infection (CAUTI).

Mice used in this study were six-week-old female wild-type C57BL/6Ncr mice. Mice were anesthetized by inhalation of isoflurane and implanted with a 5-mm length of platinum-cured silicone catheter. Then, mice were infected immediately following catheter implantation with 50 µl of ~2×10$^7$ CFU of *E. faecalis* OG1RF in PBS (1 mL) was introduced in the bladder lumen by transurethral inoculation. 24 hours post-infection, 100 µL, 10 mg/kg of 5-Cyclopropyl-4-[(1-naphthyl)methyl]-2-oxo-8-(m-tolyl)-7-thia-1-azabicyclo[4.3.0]nona-3,5,8-triene-9-carboxylic acid (Example 30) or 8-Benzyl-5-cyclopropyl-4-[(1-naphthyl)methyl]-2-oxo-7-thia-1-azabicyclo[4.3.0]nona-3,5,8-triene-9-carboxylic acid (Example 28) in DMSO was administrated via intraperitoneally injection. Mice were sacrificed at 48 hours post-infection by cervical dislocation after anaesthesia inhalation, and the bladders were aseptically harvested. Subsequently, the silicone implant was retrieved from the bladder. Catheters were placed in 1×PBS (1 mL), sonicated for 10 min, to detach *E. faecalis* and bladders were homogenized in 1×PBS (1 mL). For bacterial enumeration on catheters and bladders, samples were serially diluted and plated on BHI for CFU enumeration FIG. 8A shows that 5-Cyclopropyl-4-[(1-naphthyl)methyl]-2-oxo-8-(m-tolyl)-7-thia-1-.azabicyclo[4.3.0]nona-3,5,8-triene-9-carboxylic acid was able to reduce bacterial titers about 1.5 log units in the bladder. 8-Benzyl-5-cyclopropyl-4-[(1-naphthyl) methyl]-2-oxo-7-thia-1-azabicyclo[4.3.0]nona-3,5,8-triene-9-carboxylic acid was able to reduce bacterial titers about 0.5 log units (FIG. 8A). On the catheters, 5-Cyclopropyl-4-[(1-naphthyl)methyl]-2-oxo-8-(m-tolyl)-7-thia-1-azabicyclo[4.3.0]nona-3,5,8-triene-9-carboxylic acid (EC305) reduced bacterial titers about 1 log unit and 8-Benzyl-5-cyclopropyl-4-[(1-naphthyl)methyl]-2-oxo-7-thia-1-azabicyclo[4.3.0] nona-3,5,8-triene-9-carboxylic acid reduced about 0.4 log unit (FIG. 8B)

Figures 9A, 9B:
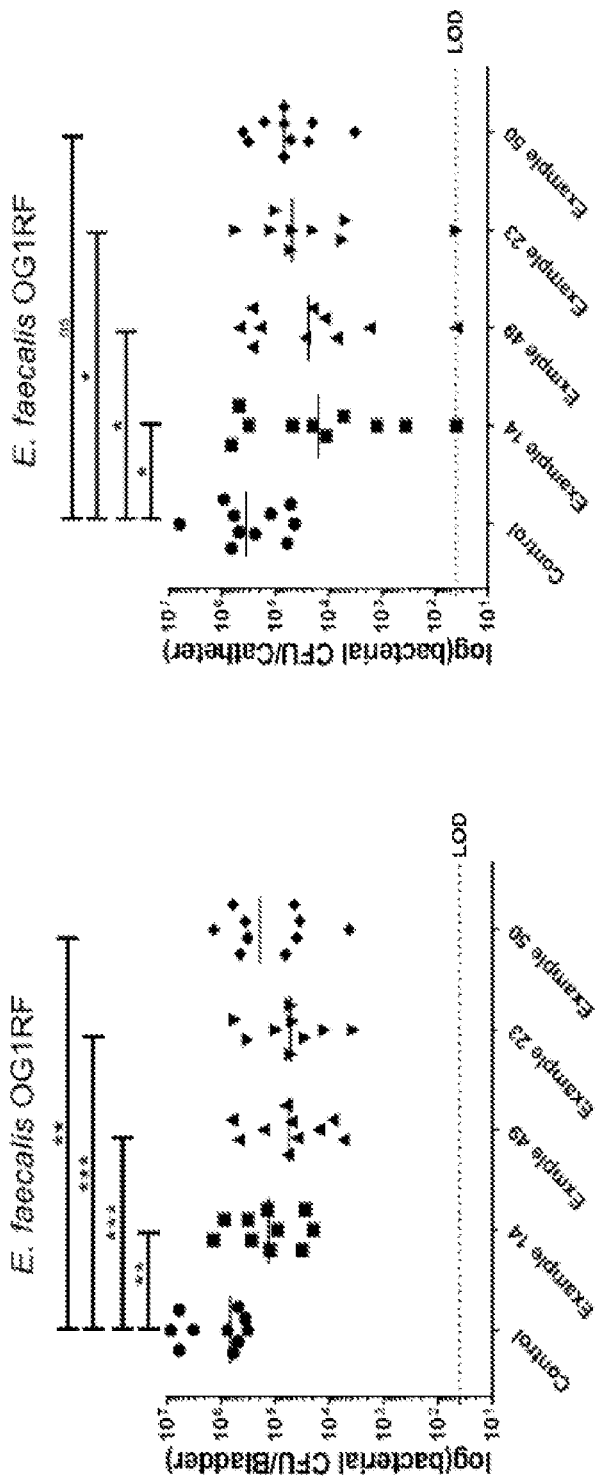
FIG. 9A shows the effect of the compounds of Example 14, Example 49, Example 23, and Example 50 against *E. faecalis* OG1RF bladder colonization in a mouse model of catheter-associated urinary tract infection (CAUTI).
FIG. 9B shows the effect of the compounds of Example 14, Example 49, Example 23, and Example 50 against *E. faecalis* OG1RF catheter colonization in a mouse model of CAUTI.

Additionally, the compounds of Example 14, Example 49, Example 23, and Example 50 were tested in the mouse model of *E. faecalis* CAUTI (FIG. 9A and FIG. 9B). Mice used in this study were six-week-old female wild-type C57BL/6Ncr mice. Mice were anesthetized by inhalation of isoflurane and implanted with a 5-mm length of platinum-cured silicone catheter. Then, mice were infected immediately following catheter implantation with 50 µl of ~2×10$^7$ CFU of *E. faecalis* OG1RF in PBS (1 mL) was introduced in the bladder lumen by transurethral inoculation. 24 hours post-infection, 100 µL, 10 mg/kg of 8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid imidazole salt (Example 14); 7-(anthracen-9-ylmethyl)-8-methoxy-2-(3-methyl-4-(pentyloxy)phenyl)-5-oxo-thiazolo[3,2-a]pyridine-3-carboxylic acid (Example 49); 8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid (Example 23), or 8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid imidazole salt (Example 50) in DMSO was administrated via intraperitoneally injection.

Mice were sacrificed at 48 hours post-infection by cervical dislocation after anaesthesia inhalation, and the bladders were aseptically harvested. Subsequently, the silicone implant was retrieved from the bladder. Catheters were placed in 1×PBS (1 mL), sonicated for 10 min, to detach *E. faecalis* and bladders were homogenized in 1×PBS (1 mL). For bacterial enumeration on catheters and bladder, samples were serially diluted and plated on BHI for CFU enumeration. It was found that compounds of Example 49 and Example 23 were able to reduce bacterial titers about 1.5 log units in the bladder (FIG. 9A). Compounds of Example 14 and Example 50 were able to reduce bacterial titers about 0.5 log units (bladders). On the catheters, compounds of Example 14 and Example 49 reduced bacterial titers about 1.5 log units and compound of Example 23 and Example 50 reduced about 0.4 log unit (FIG. 9B).

Activity of a Combination of Vancomycin and the Compound of Example 49 In Vivo Against Two *Enterococcus faecalis* Strains OG1RF (Vancomycin Sensitive) and V583 (Vancomycin Resistant) in a Mouse Model of Catheter-Associated Urinary Tract Infection (CAUTI)

Mice used in this study were six-week-old female wild-type C57BL/6Ncr mice. Mice were anesthetized by inhalation of isoflurane and implanted with a 5-mm length of platinum-cured silicone catheter. Then, mice were infected immediately following catheter implantation with 50 µl of ~2×10$^7$ CFU of *E. faecalis* OG1RF (FIG. 10A and FIG. 10B) or V583 (FIG. 11A and FIG. 11B) in PBS (1 mL) was introduced in the bladder lumen by transurethral inoculation. 24 hours post-infection, 100 µL, 3 mg/kg of Vancomycin or 7-(anthracen-9-ylmethyl)-8-methoxy-2-(3-methyl-4-(pentyloxy)phenyl)-5-oxo-thiazolo[3,2-a]pyridine-3-carboxylic acid (Example 49) or in combination in DMSO was administrated via intraperitoneally injection. Mice were sacrificed at 48 hours post-infection by cervical dislocation after anaesthesia inhalation, and the bladders were aseptically harvested. Subsequently, the silicone implant was retrieved from the bladder. Catheters were placed in 1×PBS (1 mL), sonicated for 10 min, to detach *E. faecalis* and bladders were homogenized in 1×PBS (1 mL). For bacterial enumeration on catheters and bladder, samples were serially diluted and plated on BHI for CFU enumeration.

Figure 10A:
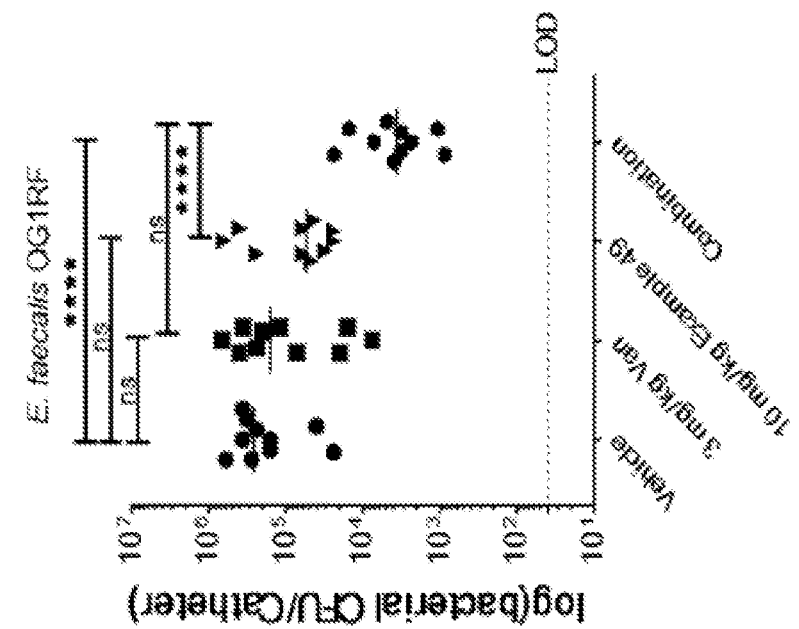
FIG. 10A shows the effect of a combination of vancomycin and the compound of Example 49 against *E. faecalis* OG1RF bladder colonization in a mouse model of CAUTI.
Figure 10B:
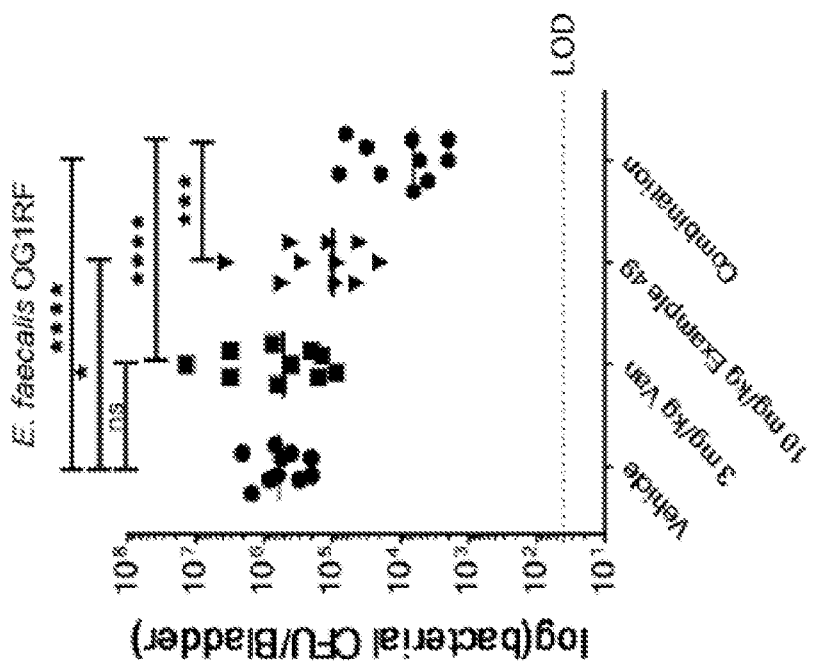
FIG. 10B shows the effect of a combination of vancomycin and the compound of Example 49 against *E. faecalis* OG1RF catheter colonization in a mouse model of CAUTI.

FIG. 10A shows that Vancomycin alone did not result in reduction of the number of *E. faecalis* OG1RF bacterial titers on the bladders and catheters. Compound of Example 49 alone was able to reduce about 1 log unit in the bladders and catheters. However, use of a combination of Vancomycin and compound of Example 49 resulted in about 2 log units in the bladder and catheters. Thus, there is a synergistic effect when Vancomycin and the compound of Example 49 are combined in vivo.

Figure 11A:
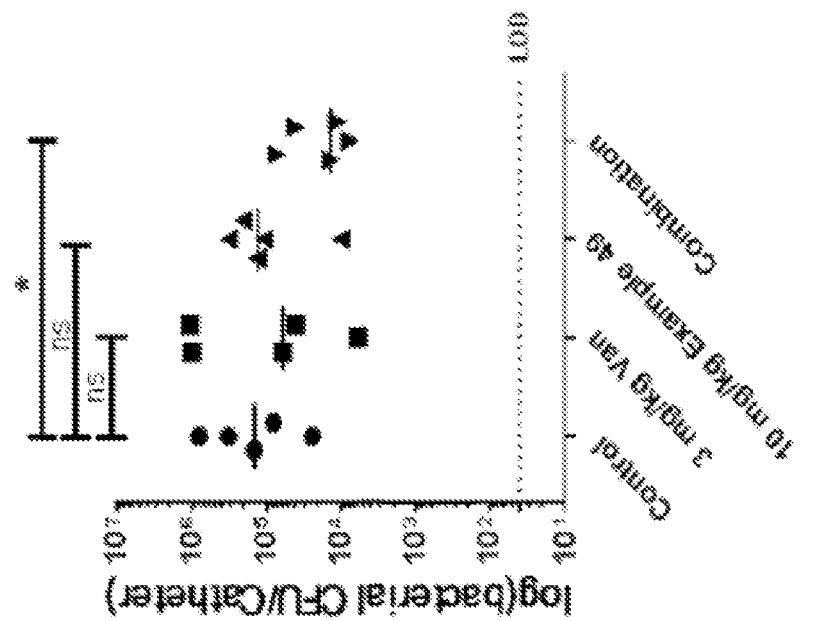
FIG. 11A shows the effect of a combination of vancomycin and the compound of Example 49 against vancomycin-resistant *E. faecalis* V583 bladder colonization in a mouse model of CAUTI.
Figure 11B:
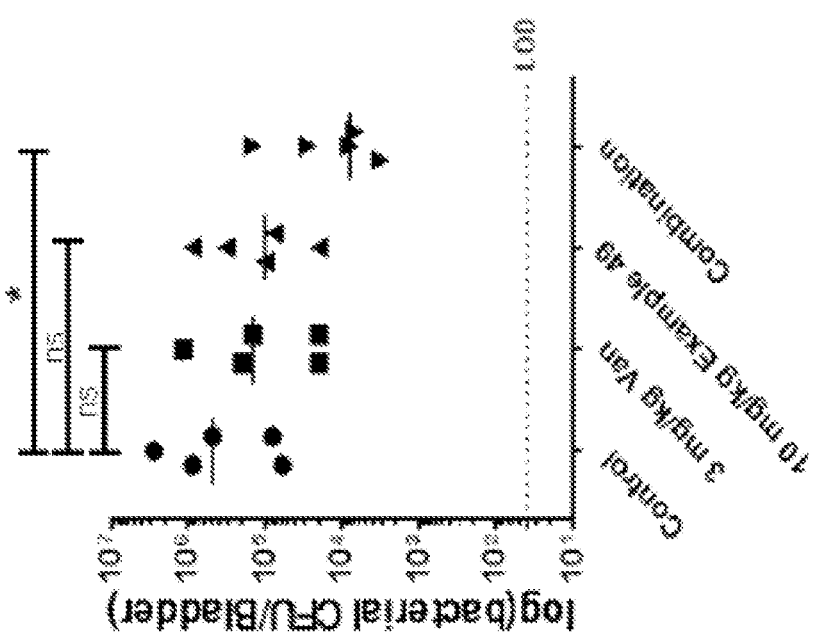
FIG. 11B shows the effect of a combination of vancomycin and the compound of Example 49 against vancomycin-resistant *E. faecalis* V583 catheter colonization in a mouse model of CAUTI.

FIG. 11A and FIG. 11B shows that Vancomycin alone resulted in reduction of the vancomycin resistant *E. faecalis* V583 bacterial titers of 0.3 log units in the bladder and no effect on the catheter. The compound of Example 49 alone did resulted in reduction of bacterial titers of about 0.5 log units on bladders and no effect on catheters. However, use of a combination of Vancomycin and compound of Example 49 against the vancomycin resistant *E. faecalis* V583 resulted in reduction of bacterial titers of about 2 log units in the bladder (FIG. 11A) and about 1 log unit on the catheter (FIG. 11B). Thus, there is a synergistic effect when Vancomycin and the compound of Example 49 are combined against a vancomycin resistant strain in vivo.

Activity of a Combination of Gentamicin and the Compound of Example 49 In Vivo Against *Enterococcus faecalis* Strains OG1RF in a Mouse Model of Catheter-Associated Urinary Tract Infection (CAUTI)

Mice used in this study were six-week-old female wild-type C57BL/6Ncr mice. Mice were anesthetized by inhalation of isoflurane and implanted with a 5-mm length of platinum-cured silicone catheter. Then, mice were infected immediately following catheter implantation with 50 µl of ~2×10$^7$ CFU of *E. faecalis* OG1RF in PBS (1 mL) was introduced in the bladder lumen by transurethral inoculation. 24 hours post-infection, 100 µL, 2 mg/kg of Vancomycin or Example 49 (7-(anthracen-9-ylmethyl)-8-methoxy-2-(3-methyl-4-(pentyloxy)phenyl)-5-oxo-thiazolo[3,2-a]pyridine-3-carboxylic acid) or in combination in DMSO was administrated via intraperitoneally injection. Mice were sacrificed at 48 hours post-infection by cervical dislocation after anaesthesia inhalation, and the bladders were aseptically harvested. Subsequently, the silicone implant was retrieved from the bladder. Catheters were placed in 1×PBS (1 mL), sonicated for 10 min, to detach *E. faecalis* and bladders were homogenized in 1×PBS (1 mL). For bacterial enumeration on catheters and bladder, samples were serially diluted and plated on BHI for CFU enumeration.

Figure 12B:
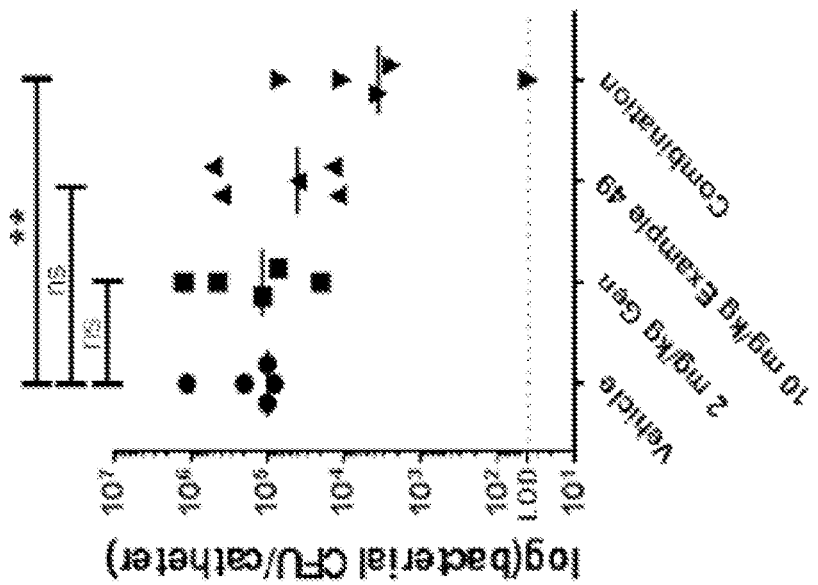
FIG. 12B shows the effect of a combination of gentamicin and the compound of Example 49 against *E. faecalis* OG1RF catheter colonization in a mouse model of CAUTI.
Figure 12A:
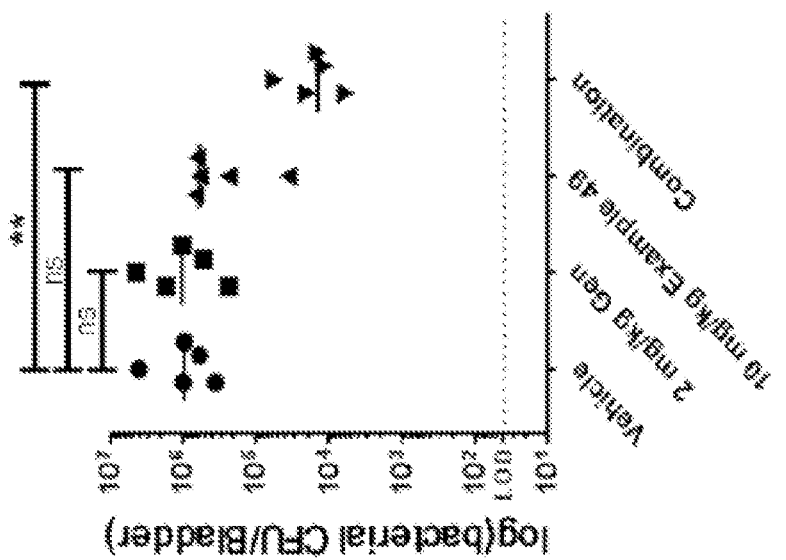
FIG. 12A shows the effect of a combination of gentamicin and the compound of Example 49 against *E. faecalis* OG1RF bladder colonization in a mouse model of CAUTI.

FIG. 12A and FIG. 12B shows that Gentamicin alone did not result in reduction of the number of *E. faecalis* OG1RF bacterial titers on the bladders and catheters. Compound of Example 49 alone was able to reduce about 0.2 log units in the bladders and 0.5 log units on catheters. However, use of a combination of Gentamicin and compound of Example 49 resulted in reduction of bacterial titers of about 2 log units in the bladder and about 1.5 log units on catheters. Thus, there is a synergistic effect when Gentamicin and the compound of Example 49 are combined in vivo.

In this document, to evaluate significance the .Mann-Whitney U test was used for mouse experiments, p<0.05 was considered statistically significant.*, p<0.05; , p<0.005; *, p<0.0005; ns, values were not statistically different.

The invention claimed is:

1. A compound of Formula III:

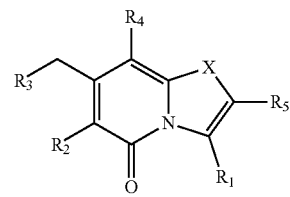

Formula III or a pharmaceutically acceptable salt thereof, wherein:

$R_1$ is selected from the group consisting of:
  a) C(O)OH,
  b) tetrazolyl,
  c) C(O)NHSO$_2$R$_6$,
  d) NH$_2$,
  e) H,

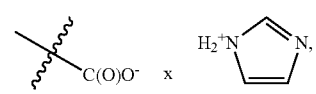

f)

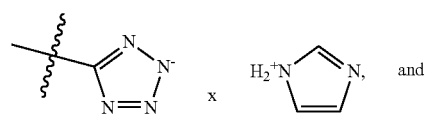

g)

and

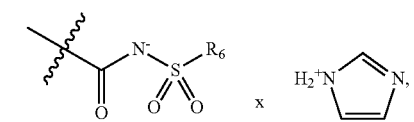

h)

$R_2$ is H, $R_3$ is selected from the group consisting of:
  a) 1-naphthyl, 2-naphthyl, 1-naphthyloxy, 9-anthryl and 9-anthryloxy each independently substituted with 0, 1, 2 or 3 substituents selected from the group consisting of methyl, fluoro, chloro, bromo, cyano and methoxy,
  b) $C_1$-$C_4$alkyl substituted with 0, 1, 2, 3 or 4 fluoro,
  c) phenyl substituted with 0, 1, 2 or 3 substituents independently selected from the group consisting of methyl, fluoro, chloro, cyano and trifluoromethyl,
  d) aminophenyl substituted with 0, 1, 2 or 3 substituents independently selected from the group consisting of methyl, fluoro, chloro and trifluoromethyl, e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-naphth-5-yl, $R_4$ is selected from the group consisting of:
  a) $C_1$-$C_4$alkyl substituted with 0, 1, 2, 3 or 4 fluoro;
  b) $C_3$-$C_6$cycloalkyl,
  c) $C_1$-$C_4$alkoxy substituted with 0, 1, 2, 3 or 4 fluoro,
  d) $C_3$-$C_6$cycloalkoxy,
  e) a 3-, 4-, 5-, or 6-membered heterocycle,
  f) $NZ_1Z_2$,
  g) $CH_2NZ_1Z_2$,
  i) C(O)OH, and
  j) C(O)H, $R_5$ is selected from the group consisting of:

a)
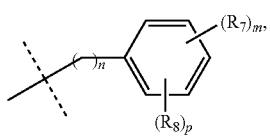

b)
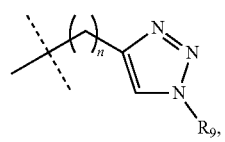

c)
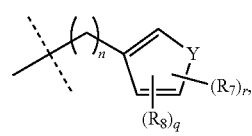

d)
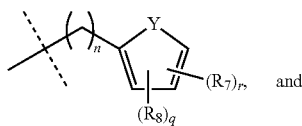 and e)
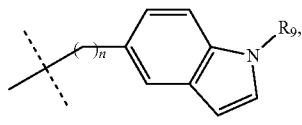

and in the above definitions:
  $R_6$ is $C_1$-$C_4$alkyl or phenyl,
  $R_7$ is selected from the group consisting of F, Cl, Br, and $C_1$-$C_4$alkyl,
  $R_8$ is selected from the group consisting of OH, butoxy, pentoxy, hexoxy, heptoxy, octoxy, nonoxy, decoxy, $C_1$-$C_{10}$alkenoxy, $C_1$-$C_{10}$alkynoxy and $O(CH_2)_2OCH_3$, or
  $R_7$ and $R_8$ together form $O(CH_2)20$,
  $R_9$ represents $C_2$-$C_{10}$ alkyl,
  $R_{10}$ represents $C_1$-$C_4$alkyl,
  $R_{11}$ represents $C_1$-$C_4$alkyl, or
  $R_{10}$ and $R_{11}$ together form $CH_2(CH_2)_mCH_2$,
  Y is O, S or N,
  $Z_1$ and $Z_2$ each independently represents hydrogen, methyl, $CH_3S(O)_2$, $C(O)OR_{10}$, $C(O)NR_{10}R_{11}$ or $C(O)R_{10}$, or $Z_1$ and $Z_2$ together form $CH_2CH_2CH_2CH_2$, $CH_2CH_2CH_2$, or $CH_2CH_2CH_2CH_2CH_2$,
n is 0 or 1,
m is 1,
p is 1 or 2,
q is 0 or 1,
r is 1, and
X is S, SO or $SO_2$, with the proviso that the compound of Formula I is not:
  8-Benzyl-5-cyclopropyl-4-[(1-naphthyl)methyl]-2-oxo-7-thia-1-azabicyclo[4.3.0]nona-3,5,8-triene-9-carboxylic acid,
  5-Cyclopropyl-4-[(1-naphthyl)methyl]-2-oxo-8-phenyl-7-thia-1-azabicyclo[4.3.0]nona-3,5,8-triene-9-carboxylic acid,
  5-Cyclopropyl-4-[(1-naphthyl)methyl]-2-oxo-8-(m-tolyl)-7-thia-1-azabicyclo[4.3.0]nona-3,5,8-triene-9-carboxylic acid,
  5-Cyclopropyl-4-[(1-naphthyl)methyl]-2-oxo-8-(p-tolyl)-7-thia-1-azabicyclo[4.3.0]nona-3,5,8-triene-9-carboxylic acid, or
  5-Cyclopropyl-8-(1,4-dioxa-2,3-dihydronaphth-6-yl)-4-[(1-naphthyl)methyl]-2-oxo-7-thia-1-azabicyclo[4.3.0]nona-3,5,8-triene-9-carboxylic acid.

2. The compound according to claim 1, wherein $R_1$ is C(O)OH or tetrazolyl, or a pharmaceutically acceptable salt thereof.

3. The compound according to claim 1, wherein $R_1$ is f)

g)
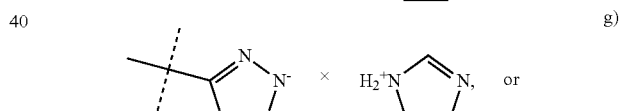, or h)
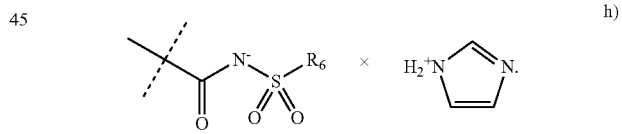

4. The compound according to according to claim 1, wherein $R_3$ is 1-naphtyl, 9-anthryl, or trifluoromethylphenyl, or a pharmaceutically acceptable salt thereof.

5. The compound according to claim 1, wherein $R_4$ is
  $C_3$-$C_6$cycloalkyl,
  $C_1$-$C_4$alkoxy substituted with 0, 1, 2, 3 or 4 fluoro, or
  $NZ_1Z_2$,
or a pharmaceutically acceptable salt thereof.

6. The compound according to claim 5, wherein $R_4$ is cyclopropyl or methoxy, or a pharmaceutically acceptable salt thereof.

7. The compound according to claim 1, wherein X is S or SO, or a pharmaceutically acceptable salt thereof.

8. The compound according to claim 1, wherein R₅ is

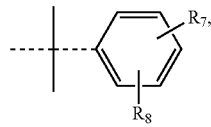

or a pharmaceutically acceptable salt thereof.

9. The compound according to claim 1, wherein R₅ is

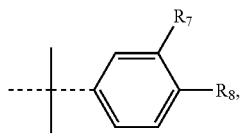

or a pharmaceutically acceptable salt thereof.

10. The compound according to claim 1, wherein R₇ is methyl
or a pharmaceutically acceptable salt thereof.

11. The compound according to claim 1 selected from the group consisting of:

8-(4-Butoxy-3-methyl-phenyl)-5-methoxy-4-[(1-naphthyl)methyl]-2-oxo-7-thia-1-azabicyclo[4.3.0]nona-3,5,8-triene-9-carboxylic acid, 5-Methoxy-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid, 8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Methoxy-8-[4-(2-methoxyethoxy)-3-methyl-phenyl]-4-[(1-naphthyl)methyl]-2-oxo-7-thia-1-azabicyclo[4.3.0]nona-3,5,8-triene-9-carboxylic acid, 8-[4-(Allyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-[4-(5-Hexynyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Methoxy-8-[4-(4-methyl-3-pentenyloxy)-3-methyl-phenyl]-4-[(1-naphthyl)methyl]-2-oxo-7-thia-1-azabicyclo[4.3.0]nona-3,5,8-triene-9-carboxylic acid, 8-[4-(5-Hexenyloxy)-3-methyl-phenyl]-5-methoxy-4-[(1-naphthyl)methyl]-2-oxo-7-thia-1-azabicyclo[4.3.0]nona-3,5,8-triene-9-carboxylic acid, 8-(1-Hexyl-1H-1,2,3-triazol-4-yl)-5-methoxy-4-[(1-naphthyl)methyl]-2-oxo-7-thia-1-azabicyclo[4.3.0]nona-3,5,8-triene-9-carboxylic acid, 8-(4-Butoxy-3-methyl-phenyl)-5-cyclopropyl-4-[(1-naphthyl)methyl]-2-oxo-7-thia-1-azabicyclo[4.3.0]nona-3,5,8-triene-9-carboxylic acid, 5-Cyclopropyl-4-[(1-naphthyl)methyl]-2-oxo-8-[4-(pentyloxy)-3-methyl-phenyl]-7-thia-1-azabicyclo[4.3.0]nona-3,5,8-triene-9-carboxylic acid, 5-Cyclopropyl-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid, 5-Cyclopropyl-8-[4-(heptyloxy)-3-methyl-phenyl]-4-[(1-naphthyl)methyl]-2-oxo-7-thia-1-azabicyclo[4.3.0]nona-3,5,8-triene-9-carboxylic acid, 5-Cyclopropyl-8-[4-(2-methoxyethoxy)-3-methyl-phenyl]-4-[(1-naphthyl)methyl]-2-oxo-7-thia-1-azabicyclo[4.3.0]nona-3,5,8-triene-9-carboxylic acid, 8-(4-Butoxy-3-methyl-phenyl)-5-cyclopropyl-2-oxo-4-{[m-(trifluoromethyl)phenyl]methyl}-7-thia-1-azabicyclo[4.3.0]nona-3,5,8-triene-9-carboxylic acid, 8-[4-(Cyclopropylmethoxy)-3-methyl-phenyl]-5-methoxy-4-[(1-naphthyl)methyl]-2-oxo-7-thia-1-azabicyclo[4.3.0]nona-3,5,8-triene-9-carboxylic acid, 5-Amino-8-[4-(hexyloxy)-3-methyl-phenyl]-4-[(1-naphthyl)methyl]-2-oxo-7-thia-1-azabicyclo[4.3.0]nona-3,5,8-triene-9-carboxylic acid, 8-[4-(Hexyloxy)-3-methyl-phenyl]-5-methoxy-4-[(1-naphtyl)methyl]-2-oxo-7-thia-1-azabicyclo[4.3.0]nona-3,5,8-triene-9-carboxylic acid imidazole salt, 8-(1-Hexyl-1H-1,2,3-triazol-4-yl)-5-methoxy-4-[(1-naphtyl)methyl]-2-oxo-7-thia-1-azabicyclo[4,3,0]nona-3,5,8-triene-9-carboxylic acid imidazole salt, 5-Cyclopropyl-8-(4-hydroxytolyl)-4-[(1-naphtyl)methyl]-2-oxo-7-thia-1-azabicyclo[4,3,0]nona-3,5,8-triene-9-carboxylic acid, 8-(dimethylamino)-2-(3-methyl-4-(pentyloxy)phenyl)-7-(naphtalen-1ylmethyl)-5-oxo-thiazolo[3,2-a]pyridine-3-carboxylic acid, 8-(dimethylamino)-2-(4-(hexyloxy)-3-methylphenyl)-7-(naphthalen-1-ylmethyl)-5-oxo-thiazolo[3,2-a]pyridine-3-carboxylic acid, 8-(dimethylamino)-2-(4-(heptyloxy)-3-methylphenyl)-7-(naphtalen-1-ylmethyl)-5-oxo-thiazolo[3,2-a]pyridine-3-carboxylic acid, 8-(dimethylamino)-2-(3-methyl-4-((4-methylpentyl)oxy)phenyl)-7-(naphtalen-1ylmethyl)-5-oxo-thiazolo[3,2-a]pyridine-3-carboxylic acid, 8-amino-2-(3-methyl-4-(pentyloxyphenyl)-7-naphtalen-1ylmethyl)-5-oxo-thiazolo[3,2-a]pyridine-3-carboxylic acid, 8-amino-2-(4-(hexyloxy)-3-methylphenyl)-7-(naphtalen-1-ylmethyl)-5-oxo-thiazolo[3,2-a]pyridine-3-carboxylic acid, 8-amino-2-(4-(heptyloxy)-3-methylphenyl)-7-(naphtalen-1-ylmethyl)-5-oxo-thiazolo[3,2-a]pyridine-3-carboxylic acid, 7-(anthracen-9-ylmethyl)-8-methoxy-2-(3-methyl-4-(pentyloxy)phenyl)-5-oxo-thiazolo[3,2-a]pyridine-3-carboxylic acid, 1H-imidazol-1-ium 8-methoxy-2-(3-methyl-4 ((4-methylpentyl)oxy)phenyl)-7-(naphtalen-1-ylmethyl)-5-oxo-thiazolo[3,2-a]pyridine-3-carboxylate, and 8-(dimethylamino)-2-(3-methyl-4-(pentyloxy)phenyl)-7-(naphthalen-1-ylmethyl)-5-oxo-thiazolo[3,2-a]pyridine-3-carboxylic acid, or a pharmaceutically acceptable salt thereof.

12. The compound according to claim 1, wherein
$R_1$ is selected from the group consisting of carboxylic acid and 1H-imidazol-1-ium carboxylate,
$R_3$ is selected from the group consisting of naphthalen-1-yl, 3-(trifluoromethyl)phenyl, anthracen-9-yl and naphthalen-1-yloxy,
$R_4$ is selected from the group consisting of: cyclopropyl, methoxy, amino, dimethylamino, 3-(trifluoromethyl)phenyl, benzo[d][1,3]dioxol-5-yl, and carboxylic acid, and
$R_5$ is selected from the group consisting of 4-(hexyloxy)-3-methylphenyl, 3-methyl-4-propoxyphenyl, 4-(heptyloxy)-3-methylphenyl, 4-methoxy-3-methylphenyl, 4-ethoxy-3-methylphenyl, 3-methyl-4-(pentyloxy)phenyl, 4-butoxy-3-methylphenyl, 4-(pentyloxy)phenyl, 4-butoxyphenyl, 1-hexyl-1H-1,2,3-triazol-4-yl, 4-(2-methoxyethoxy)-3-methylphenyl, 4-hydroxy-3-methylphenyl, 4-(allyloxy)-3-methylphenyl, 4-(hex-5-yn-1-yloxy)-3-methylphenyl, 3-methyl-4-((4-methylpentyl)oxy)phenyl, 3-methyl-4-((4-methylpent-3-en-1-yl)oxy)phenyl, 4-(hex-5-en-1-yloxy)-3-methylphenyl, 4-(cyclopropylmethoxy)-3-methylphenyl, 2-(m-tolyl), 2-(p-tolyl), and 2,3-dihydrobenzo[b][1,4]dioxin-6-yl, or a pharmaceutically acceptable salt thereof.

13. A pharmaceutical composition comprising the compound according to claim 1, or a pharmaceutically acceptable salt thereof, in admixture with a pharmaceutically acceptable adjuvant, carrier or excipient.

14. The compound according to claim 1, wherein $R_8$ is selected from the group consisting of hexoxy, heptoxy, octoxy, nonoxy, decoxy, $C_1$-$C_{10}$alkenoxy, $C_1$-$C_{10}$alkynoxy, and $O(CH_2)_2OCH_3$.

15. The compound according to claim 1, wherein the compound is:

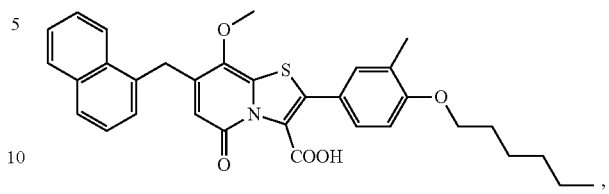

or a pharmaceutically acceptable salt thereof.

16. A compound selected from the group consisting of:
8-(4-Butoxy-3-methyl-phenyl)-5-cyclopropyl-4-[(1-naphthyl)methyl]-2-oxo-7-thia-1-azabicyclo[4.3.0]nona-3,5,8-triene-9-carboxylic acid,
8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid,
8-[4-(Hexyloxy)-3-methyl-phenyl]-5-methoxy-4-[(1-naphtyl)methyl]-2-oxo-7-thia-1-azabicyclo[4.3.0]nona-3,5,8-triene-9-carboxylic acid imidazole salt,
8-[4-(Isohexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid,
8-(dimethylamino)-2-(3-methyl-4-(pentyloxy)phenyl)-7-(naphthalen-1-ylmethyl)-5-oxo-thiazolo[3,2-a]pyridine-3-carboxylic acid,
8-(dimethylamino)-2-(4-(hexyloxy)-3-methylphenyl)-7-(naphthalen-1-ylmethyl)-5-oxo-thiazolo[3,2-a]pyridine-3-carboxylic acid, and
7-(anthracen-9-ylmethyl)-8-methoxy-2-(3-methyl-4-(pentyloxy)phenyl)-5-oxo-thiazolo[3,2-a]pyridine-3-carboxylic acid, or a pharmaceutically acceptable salt thereof.

* * * * *